US012675215B2

(12) United States Patent
Alonso et al.

(10) Patent No.: US 12,675,215 B2
(45) Date of Patent: Jul. 7, 2026

(54) INTERACTIONS BETWEEN AN INPUT DEVICE AND AN ELECTRONIC DEVICE

(71) Applicant: Apple Inc., Cupertino, CA (US)

(72) Inventors: Marcos Alonso, Oakland, CA (US);
Daniel T. Preston, San Jose, CA (US);
Peder Blekken, Morgan Hill, CA (US);
Christopher D. Soli, San Francisco,
CA (US)

(73) Assignee: Apple Inc., Cupertino, CA (US)

( * ) Notice: Subject to any disclaimer, the term of this
patent is extended or adjusted under 35
U.S.C. 154(b) by 0 days.

(21) Appl. No.: 18/952,761

(22) Filed: Nov. 19, 2024

(65) Prior Publication Data

US 2025/0244866 A1 Jul. 31, 2025

Related U.S. Application Data

(60) Provisional application No. 63/564,309, filed on Mar.
12, 2024, provisional application No. 63/559,801,
filed on Feb. 29, 2024, provisional application No.
63/625,238, filed on Jan. 25, 2024.

(51) Int. Cl.
G06F 3/0488 (2022.01)
G06F 3/04815 (2022.01)
G06T 11/20 (2006.01)

(52) U.S. Cl.
CPC ........ G06F 3/0488 (2013.01); G06F 3/04815
(2013.01); G06T 11/20 (2013.01); *G06T*
*2200/24* (2013.01)

(58) Field of Classification Search
CPC .... G06F 3/0488; G06F 3/04815; G06T 11/20;
G06T 2200/24
See application file for complete search history.

(56) References Cited

U.S. PATENT DOCUMENTS

| | | | | |
|---|---|---|---|---|
| 5,959,617 A | * | 9/1999 | Bird | G06F 3/042 |
| | | | | 345/184 |
| 6,323,846 B1 | | 11/2001 | Westerman et al. | |
| 6,570,557 B1 | | 5/2003 | Westerman et al. | |
| 6,677,932 B1 | | 1/2004 | Westerman | |
| 7,614,008 B2 | | 11/2009 | Ording | |

(Continued)

FOREIGN PATENT DOCUMENTS

| | | |
|---|---|---|
| WO | 2013169849 A2 | 11/2013 |
| WO | 2014105276 A1 | 7/2014 |

*Primary Examiner* — Rodney Amadiz
(74) *Attorney, Agent, or Firm* — Kubota & Basol LLP

(57) ABSTRACT

Some embodiments are directed to providing feedback about
the pose and/or orientation of an input device relative to a
surface, such as feedback about a change in an orientation of
the input device relative to the surface due to rotational
movement of the input device about a first axis associated
with the input device, while the pose of the input device
relative to the surface is maintained during the change in
orientation of the input device relative to the surface. Some
embodiments are directed to providing feedback about
whether the orientation of the selected drawing implement
for an input device is permitted to change or not in response
to changes in the orientation of the input device. Some
embodiments are directed to providing feedback corre-
sponding to a setting or resetting of an orientation of the
selected drawing implement for the input device in response
to detection of an event.

45 Claims, 61 Drawing Sheets

(56) References Cited

U.S. PATENT DOCUMENTS

| | | | |
|---|---|---|---|
| 7,633,076 B2 | 12/2009 | Huppi et al. | |
| 7,653,883 B2 | 1/2010 | Hotelling et al. | |
| 7,657,849 B2 | 2/2010 | Chaudhri et al. | |
| 7,663,607 B2 | 2/2010 | Hotelling et al. | |
| 7,844,914 B2 | 11/2010 | Andre et al. | |
| 7,957,762 B2 | 6/2011 | Herz et al. | |
| 8,006,002 B2 | 8/2011 | Kalayjian et al. | |
| 8,239,784 B2 | 8/2012 | Hotelling et al. | |
| 8,279,180 B2 | 10/2012 | Hotelling et al. | |
| 8,381,135 B2 | 2/2013 | Hotelling et al. | |
| 8,479,122 B2 | 7/2013 | Hotelling et al. | |
| 9,348,458 B2 | 5/2016 | Hotelling et al. | |
| 9,933,937 B2 | 4/2018 | Lemay et al. | |
| 2002/0015024 A1 | 2/2002 | Westerman et al. | |
| 2005/0190059 A1 | 9/2005 | Wehrenberg | |
| 2006/0017692 A1 | 1/2006 | Wehrenberg et al. | |
| 2006/0033724 A1 | 2/2006 | Chaudhri et al. | |
| 2006/0197753 A1 | 9/2006 | Hotelling | |
| 2019/0235648 A1* | 8/2019 | Ligameri | G06F 3/04842 |
| 2024/0004532 A1* | 1/2024 | Soli | G06F 3/04812 |
| 2025/0251851 A1* | 8/2025 | Alonso | G06F 3/04883 |

* cited by examiner

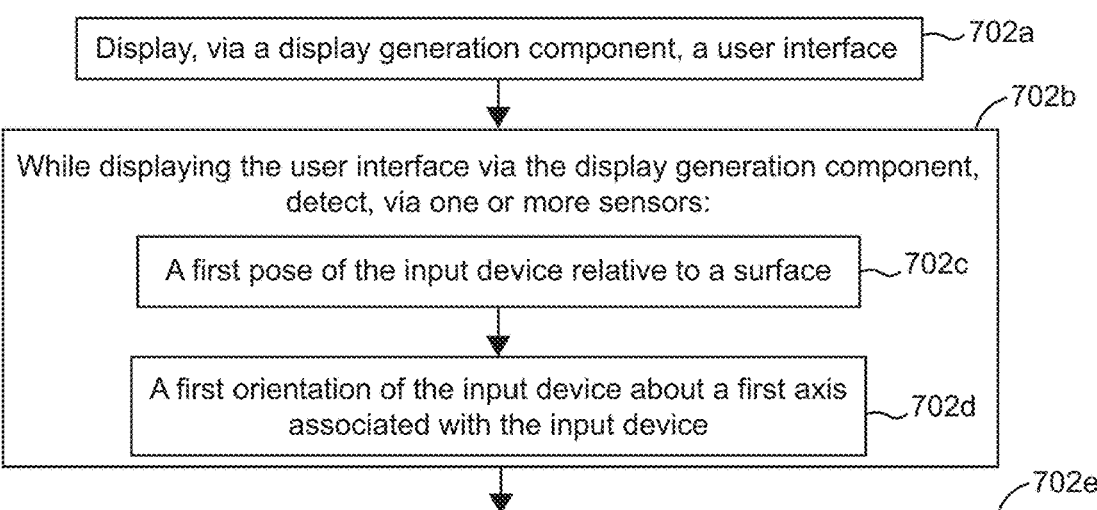

Display, via a display generation component, a user interface ⌐702a

While displaying the user interface via the display generation component, detect, via one or more sensors: ⌐702b A first pose of the input device relative to a surface ⌐702c A first orientation of the input device about a first axis associated with the input device ⌐702d In response to detecting the first pose of the input device relative to the surface and the first orientation of the input device about the first axis associated with the input device, in accordance with a determination that the first pose of the input device relative to the surface includes the input device being within a first threshold distance of the surface and that a currently selected drawing implement for the input device is a first drawing implement, update display, via the display generation component, of the user interface to include a preview mark of the first drawing implement, wherein the preview mark has a first visual appearance in the user interface based on the first pose of the input device relative to the surface and based on the first orientation of the input device about the first axis associated with the input device ⌐702e While displaying, via the display generation component, the user interface including the preview mark of the first drawing implement having the first visual appearance, and while the input device has the first pose relative to the surface, detect, via the one or more sensors, rotational movement of the input device about the first axis associated with the input device, the rotational movement of the input device corresponding to a change in orientation of the input device about the first axis associated with the input device from the first orientation to a second orientation, different from the first orientation ⌐702f In response to detecting the rotational movement of the input device about the first axis associated with the input device, update display, via the display generation component, of the user interface to include the preview mark of the first drawing implement having a second visual appearance, different from the first visual appearance, based on the first pose of the input device and based on the second orientation of the input device about the first axis associated with the input device ⌐702g

FIG. 7

INTERACTIONS BETWEEN AN INPUT DEVICE AND AN ELECTRONIC DEVICE

CROSS REFERENCE TO RELATED APPLICATIONS

This application claims the benefit of U.S. Provisional Application No. 63/625,238, filed Jan. 25, 2024, U.S. Provisional Application No. 63/559,801, filed Feb. 29, 2024, and U.S. Provisional Application No. 63/564,309, filed Mar. 12, 2024, the contents of which are herein incorporated by reference in their entireties for all purposes.

FIELD OF THE DISCLOSURE

This relates generally to electronic devices that interact with input devices, and user interactions with such devices.

BACKGROUND

User interaction with electronic devices has increased significantly in recent years. These devices can be devices such as computers, tablet computers, televisions, multimedia devices, mobile devices, and the like.

In some circumstances, users wish to interact with an electronic device with an input device such as a stylus. Enhancing these interactions improves the user's experience with the device and decreases user interaction time, which is particularly important where input devices are battery-operated.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

SUMMARY

Some embodiments described in this disclosure are directed to providing feedback about the pose and orientation of an input device relative to a surface, such as feedback about changes in the orientation of an input device relative to the surface while the pose of the input device relative to the surface is constant or changing. Some embodiments described in this disclosure are directed to providing feedback about the orientation of a selected drawing implement for the input device, such as feedback about whether the orientation of the selected drawing implement for the input device is permitted to change or not in response to changes in the orientation of an input device relative to the surface while the pose of the input device relative to the surface is constant or changing and/or such as feedback corresponding to a setting or resetting of an orientation of the selected drawing implement for the input device in response to detection of an event.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

FIG. 7 is a flowchart illustrating a method for providing feedback about the pose and/or orientation of an input device relative to a surface in accordance with some embodiments.

DETAILED DESCRIPTION

Figure 1A:
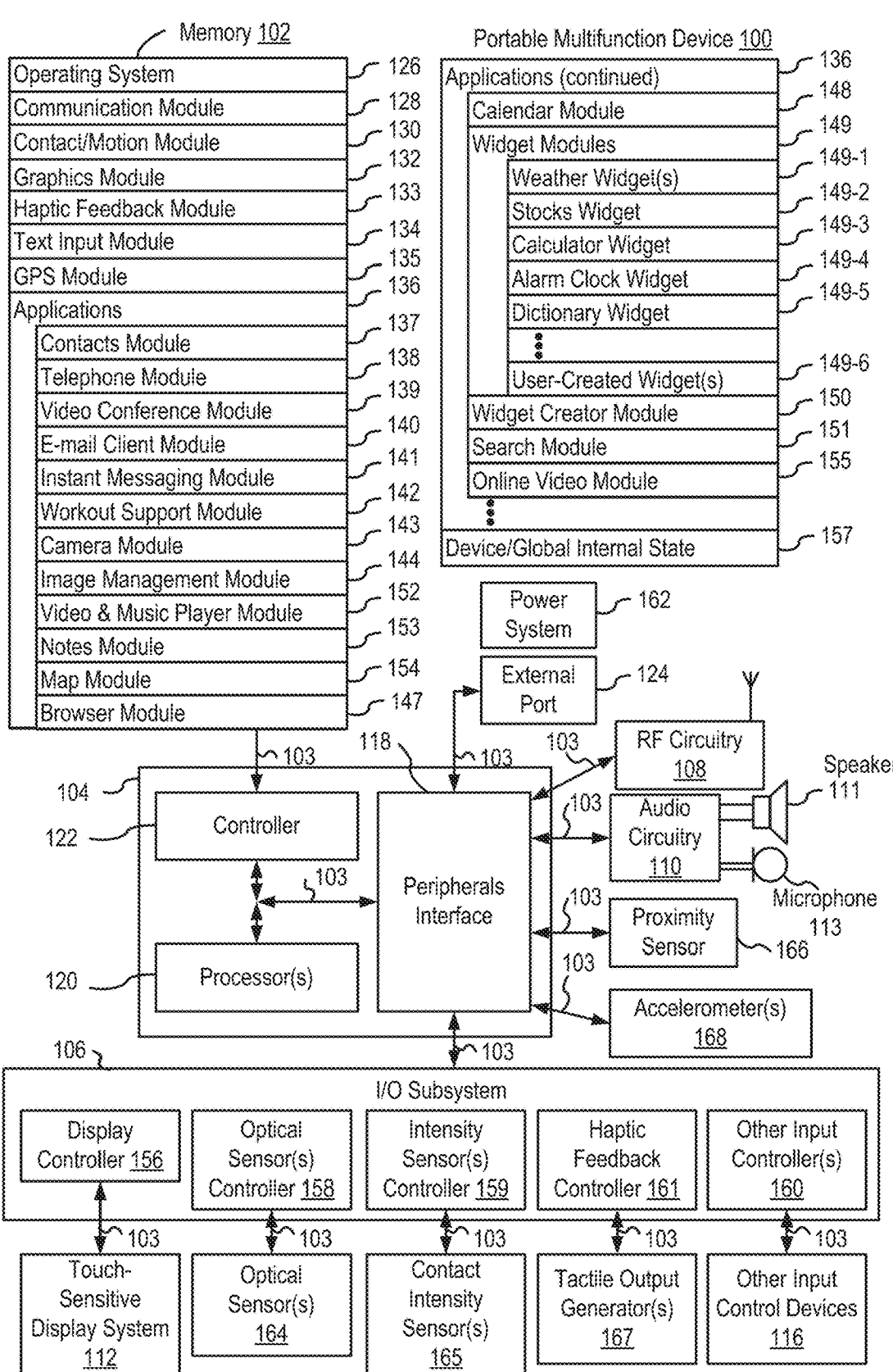
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods for interaction between the electronic device and an input device (e.g., from a stylus or other input device). Such techniques can reduce the cognitive burden on a user who uses such devices. Further, such techniques can reduce processor and battery power otherwise wasted on redundant user inputs.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touch-pads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, and/or rocker buttons), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touch-screen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, device 100 is a portable computing system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system (e.g., an integrated display, and/or touch screen 112). In some embodiments, the display generation component is separate from the computer system (e.g., an external monitor, and/or a projection system). As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
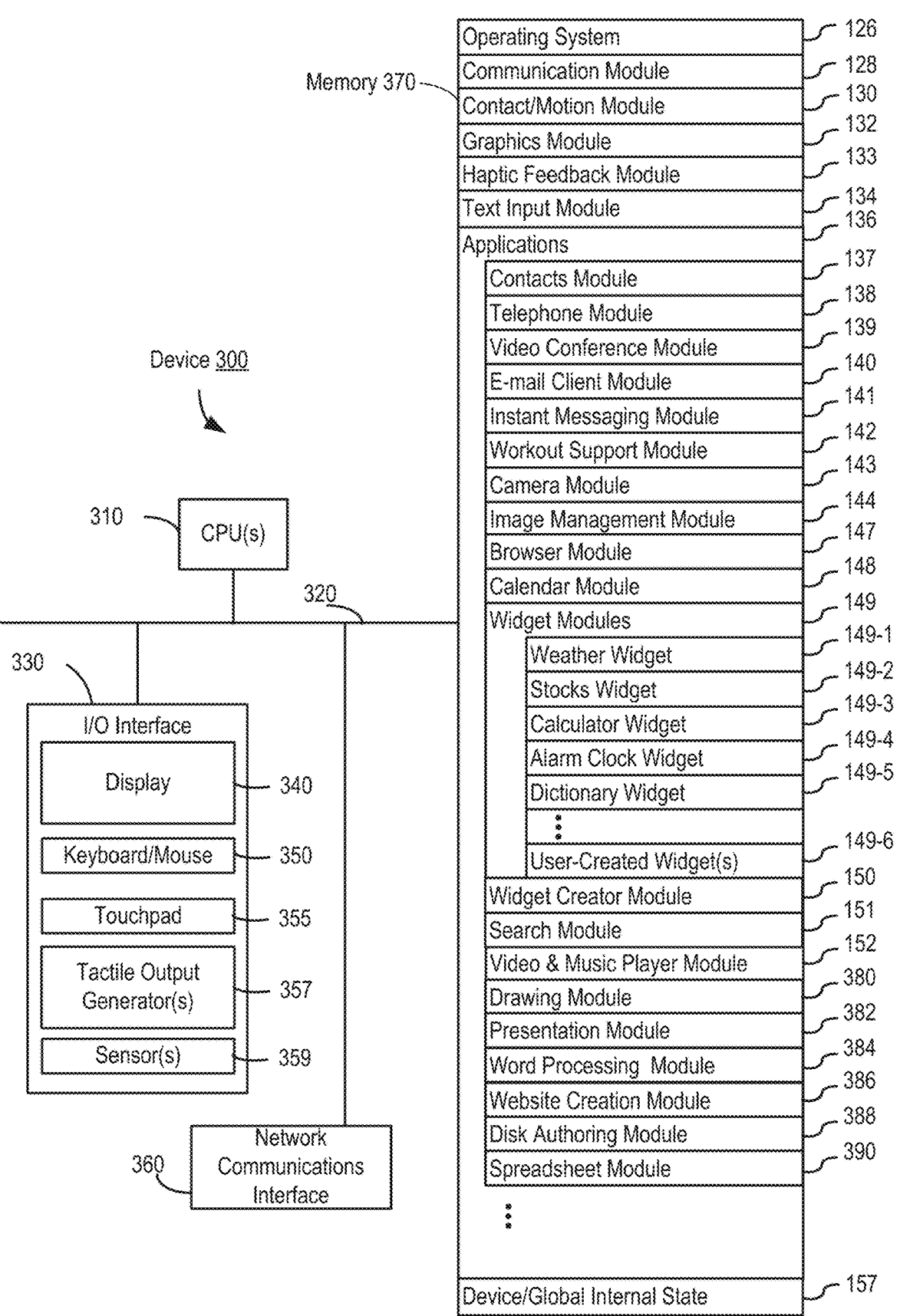
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, and/or power management) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), and/or FIREWIRE) is adapted for coupling directly to other devices or indirectly over a network (e.g., the Internet, and/or wireless LAN). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications, one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail client module 140, IM 141, browser 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:

- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, and/or to-do lists) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
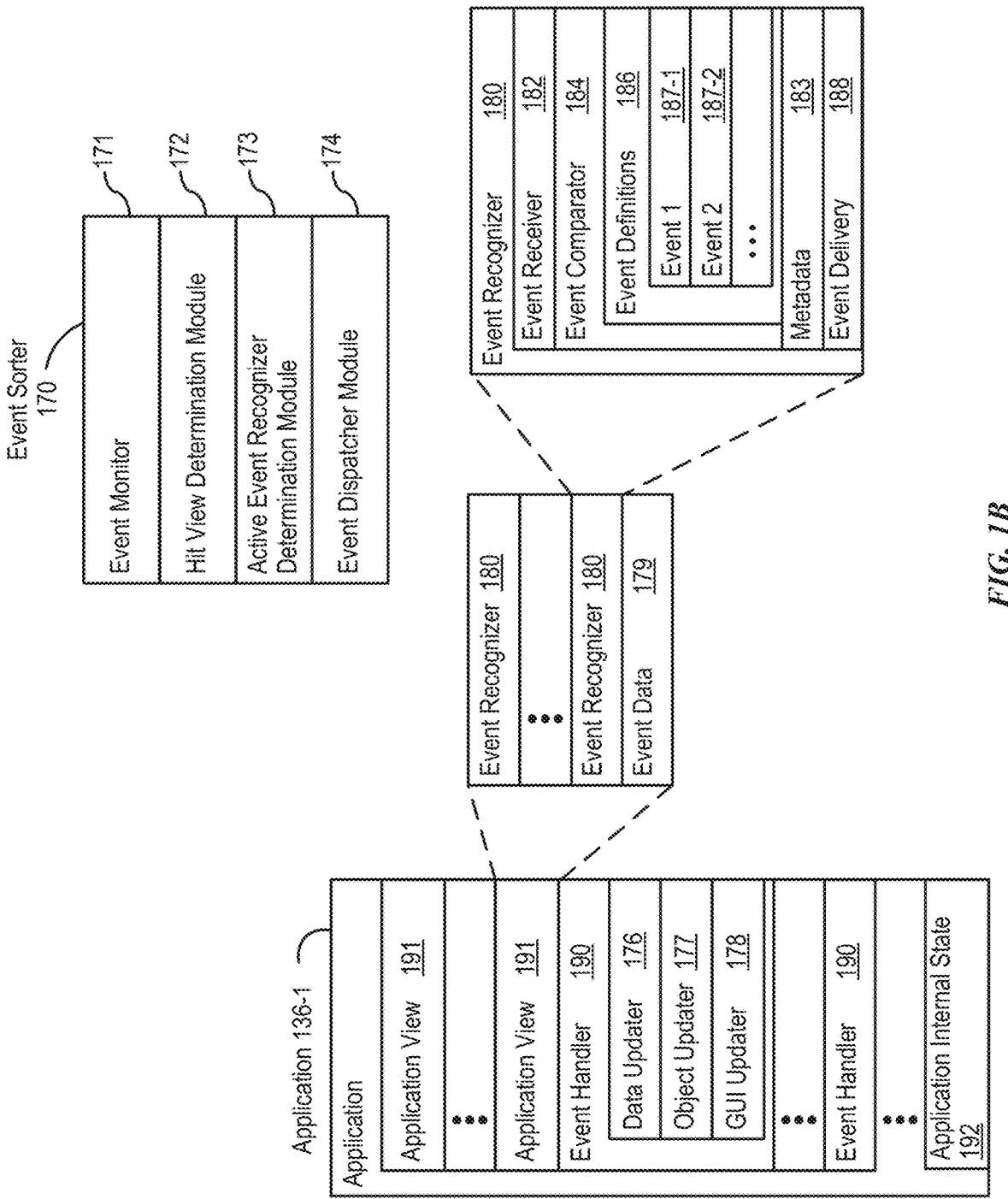
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, and/or scrolls on touchpads; pen stylus inputs; movement of the device; oral instructions; detected eye movements; biometric inputs; and/or any combination thereof are optionally utilized as inputs corresponding to sub-events which define an event to be recognized.

Figure 2:
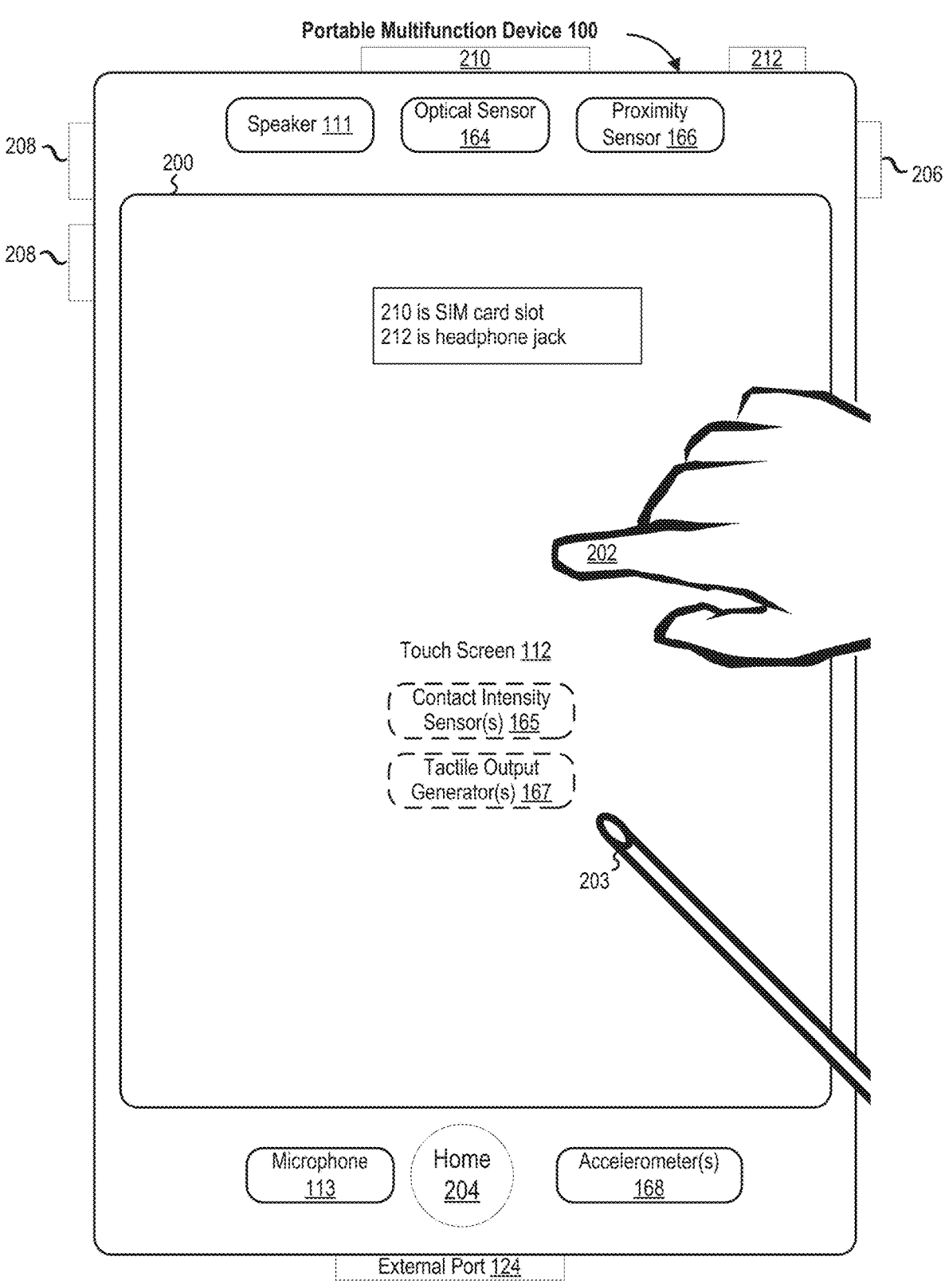
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

In some embodiments, stylus 203 is an active device and includes one or more electronic circuitry. For example, stylus 203 includes one or more sensors, and one or more communication circuitry (such as communication module 128 and/or RF circuitry 108). In some embodiments, stylus 203 includes one or more processors and power systems (e.g., similar to power system 162). In some embodiments, stylus 203 includes an accelerometer (such as accelerometer 168), magnetometer, and/or gyroscope that is able to determine the position, angle, location, and/or other physical characteristics of stylus 203 (e.g., such as whether the stylus is placed down, angled toward or away from a device, and/or near or far from a device). In some embodiments, stylus 203 is in communication with an electronic device (e.g., via communication circuitry, over a wireless communication protocol such as Bluetooth) and transmits sensor data to the electronic device. In some embodiments, stylus 203 is able to determine (e.g., via the accelerometer or other sensors) whether the user is holding the device. In some embodiments, stylus 203 can accept tap inputs (e.g., single tap or double tap) on stylus 203 (e.g., received by the accelerometer or other sensors) from the user and interpret the input as a command or request to perform a function or change to a different input mode.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
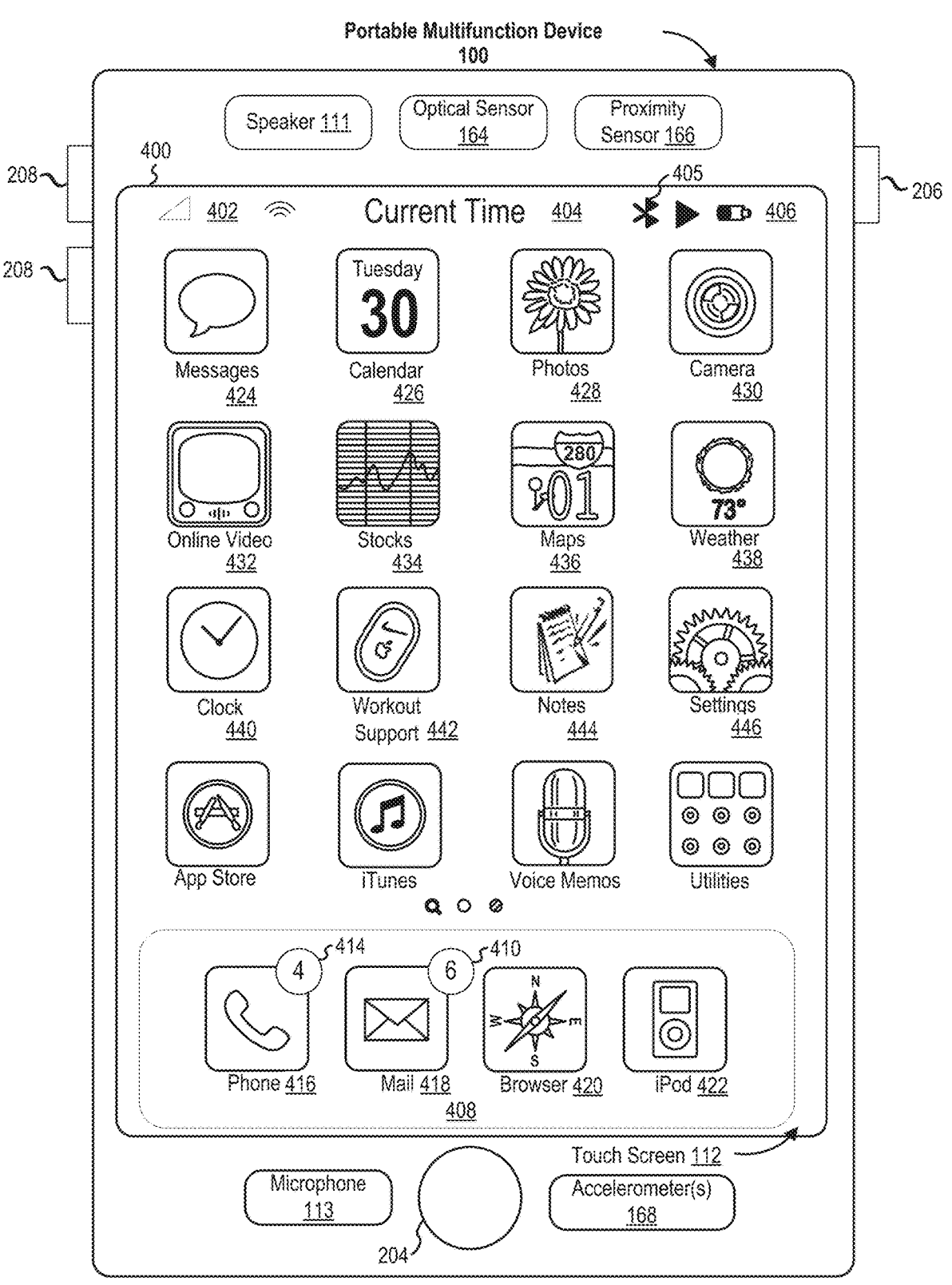
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;

Time 404;

Bluetooth indicator 405;

Battery status indicator 406;

Tray 408 with icons for frequently used applications, such as:

Icon 416 for telephone module 138, labeled "Phone," which optionally includes an indicator 414 of the number of missed calls or voicemail messages;

Icon 418 for e-mail client module 140, labeled "Mail," which optionally includes an indicator 410 of the number of unread e-mails;

Icon 420 for browser module 147, labeled "Browser;" and

Icon 422 for video and music player module 152, also referred to as iPod (trademark of Apple Inc.) module 152, labeled "iPod;" and Icons for other applications, such as:

Icon 424 for IM module 141, labeled "Messages;"

Icon 426 for calendar module 148, labeled "Calendar;"

Icon 428 for image management module 144, labeled "Photos;"

Icon 430 for camera module 143, labeled "Camera;"

Icon 432 for online video module 155, labeled "Online Video;"

Icon 434 for stocks widget 149-2, labeled "Stocks;"

Icon 436 for map module 154, labeled "Maps;"

Icon 438 for weather widget 149-1, labeled "Weather;"

Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
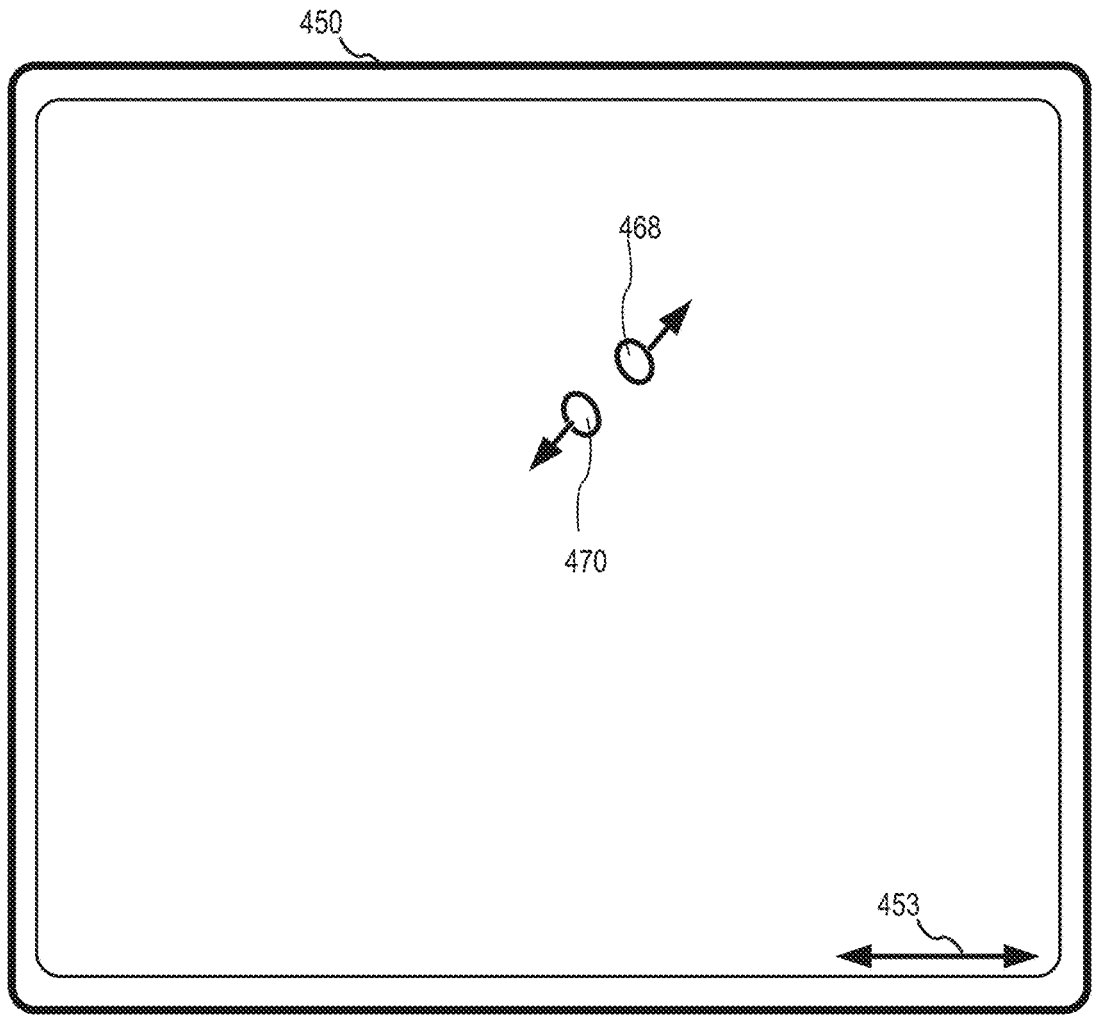
FIG. 4B illustrates an exemplary user interface for a multifunction device with a touch-sensitive surface that is separate from the display in accordance with some embodiments.
Figure 4B:
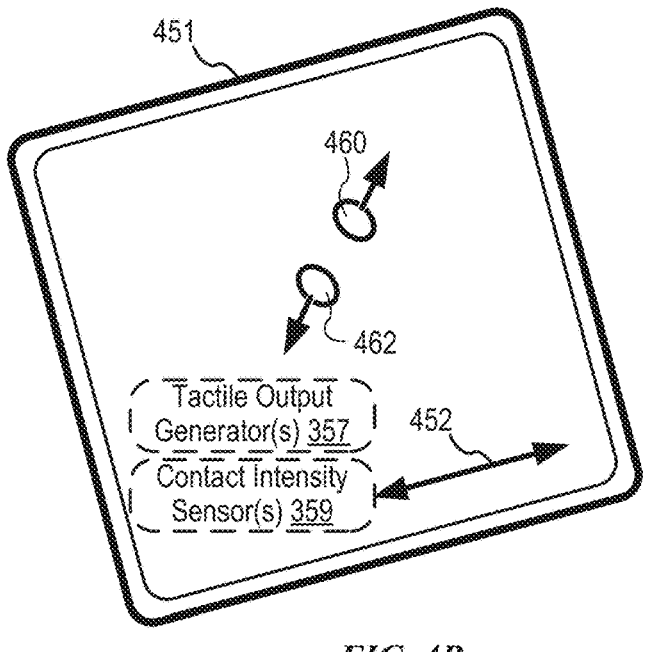

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
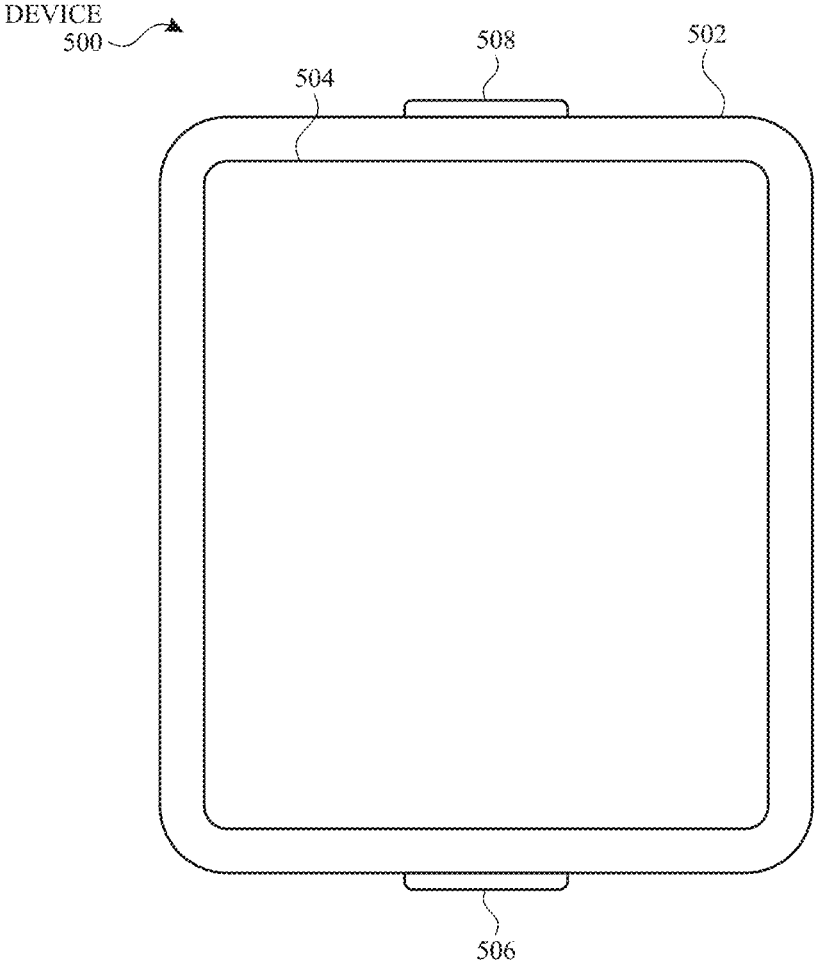
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
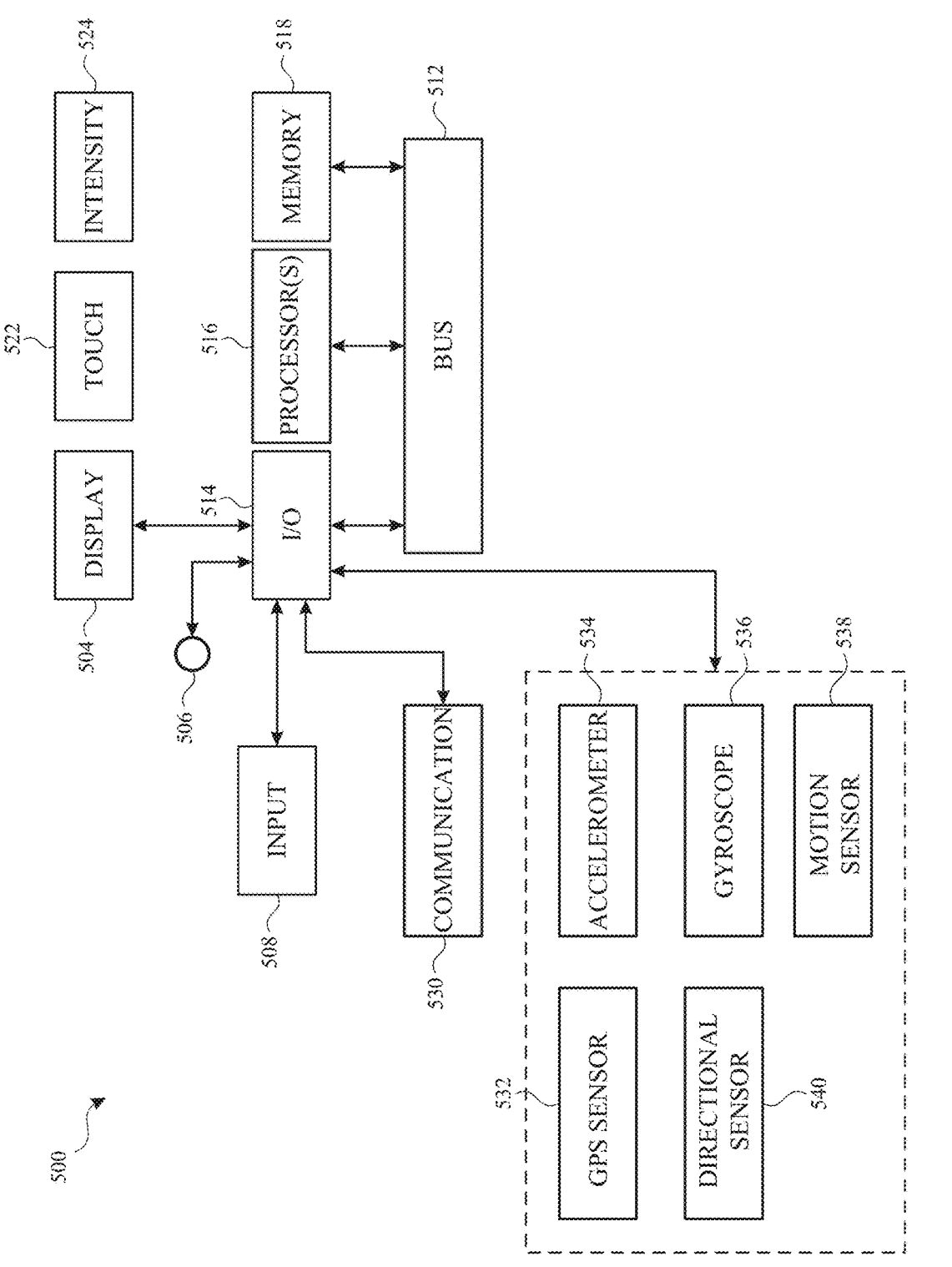
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including process 700 (FIG. 7). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
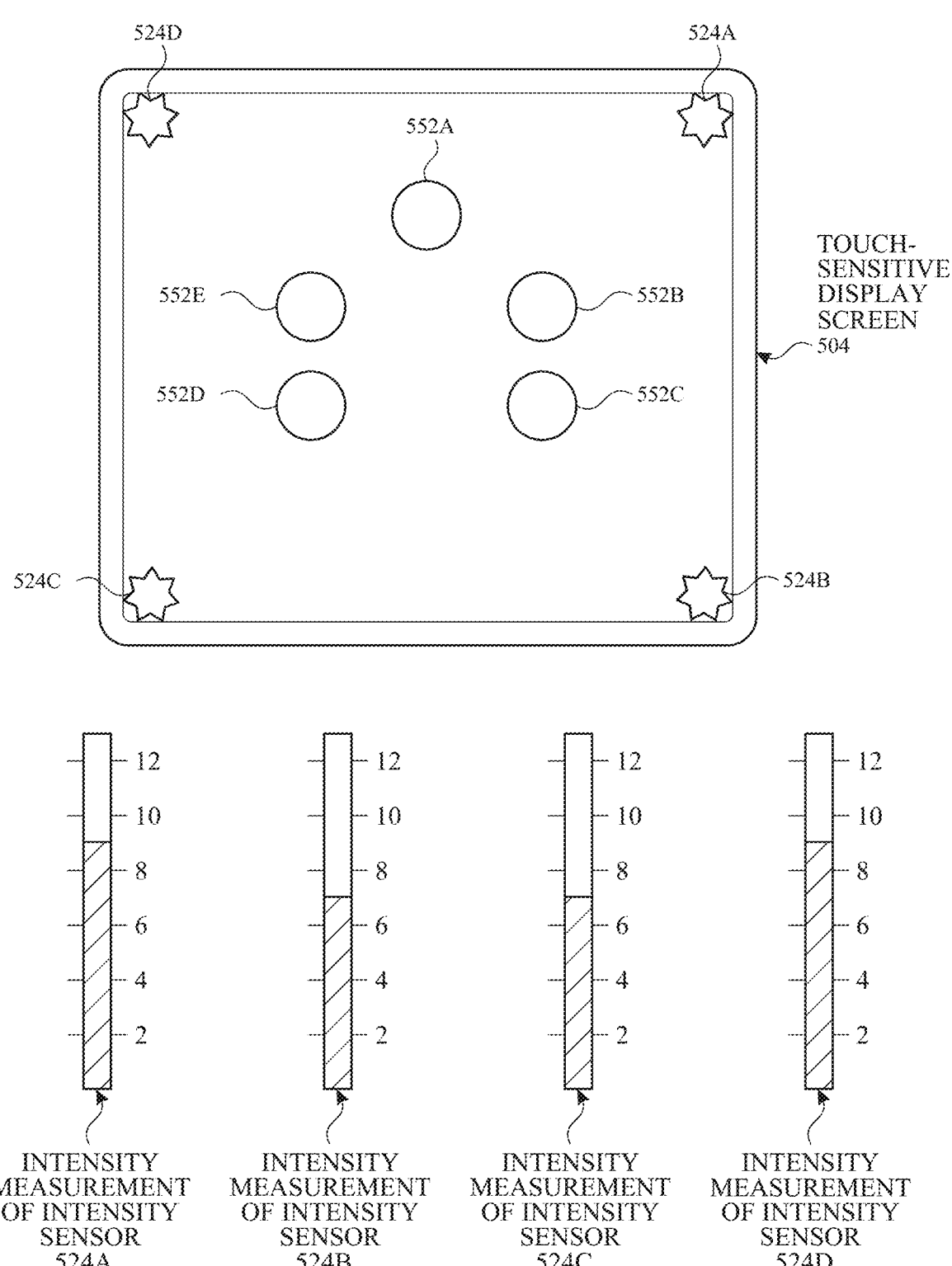
FIGS. 5C-5D illustrate exemplary components of a personal electronic device having a touch-sensitive display and intensity sensors in accordance with some embodiments.
Figure 5D:
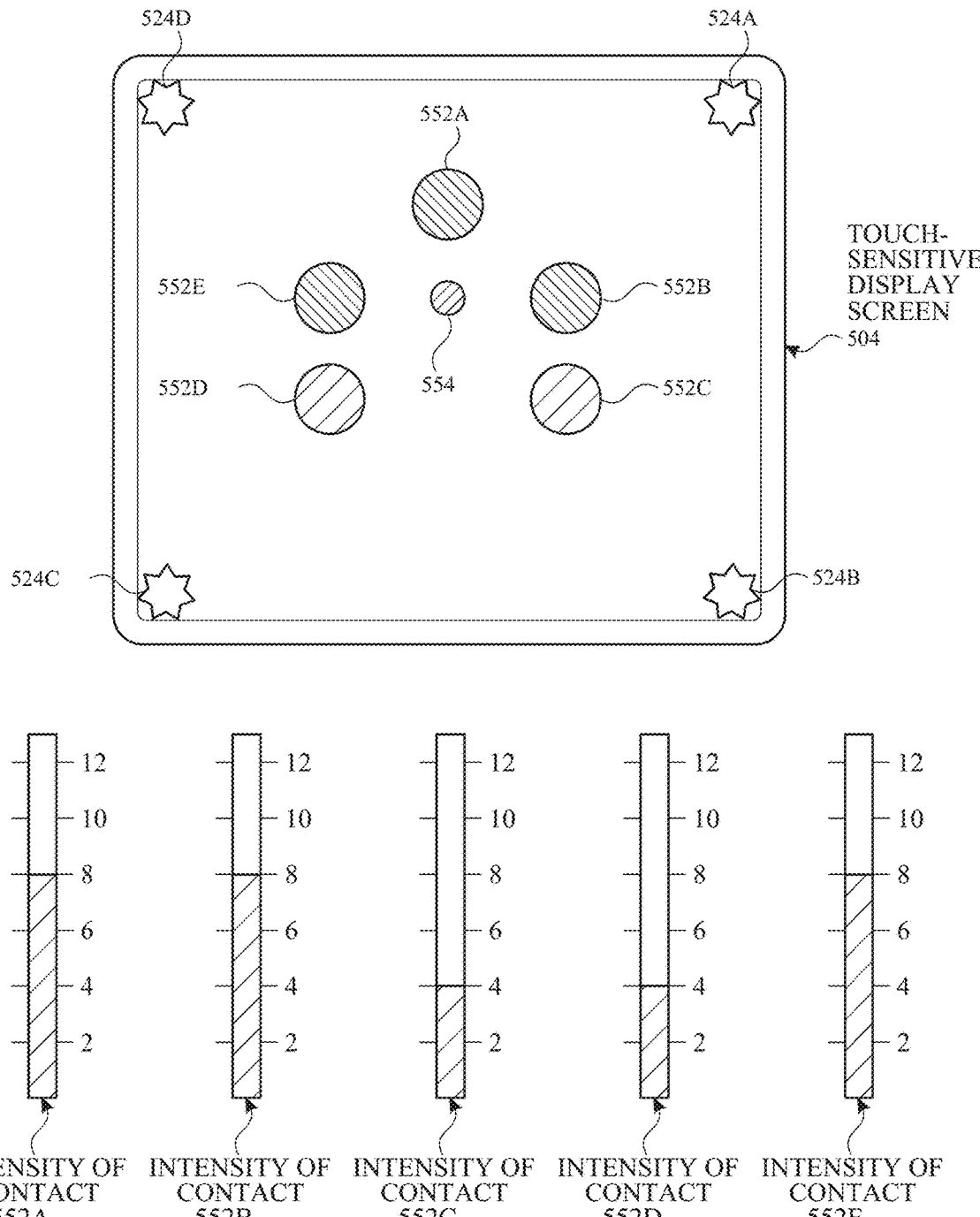

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, Ij=A·(Dj/ΣDi), where Dj is the distance of the respective contact j to the center of force, and ΣDi is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5E:
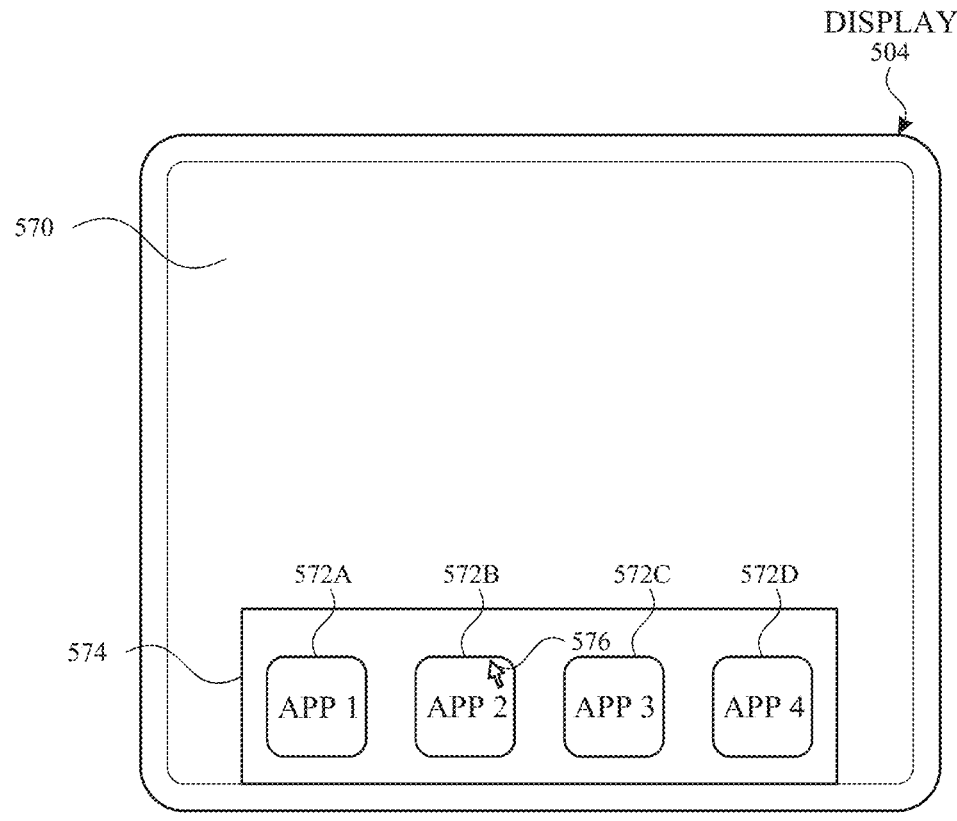
FIGS. 5E-5H illustrate exemplary components and user interfaces of a personal electronic device in accordance with some embodiments.
Figure 5E:
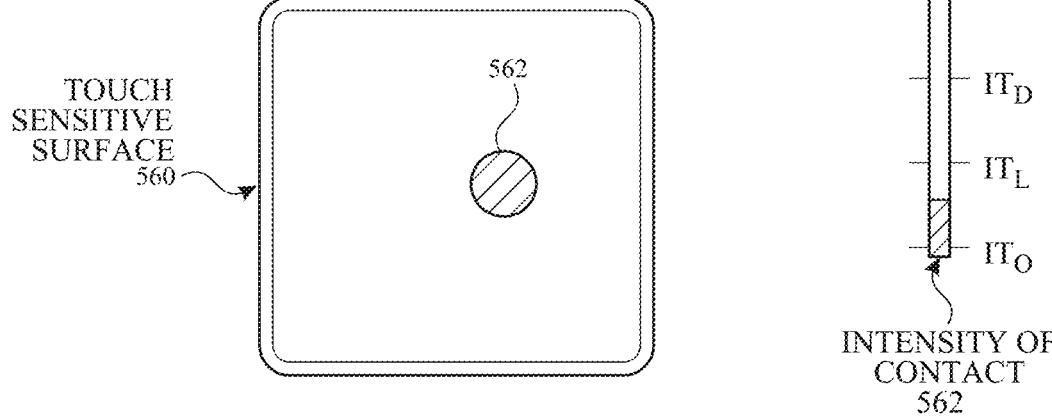
Figure 5F:
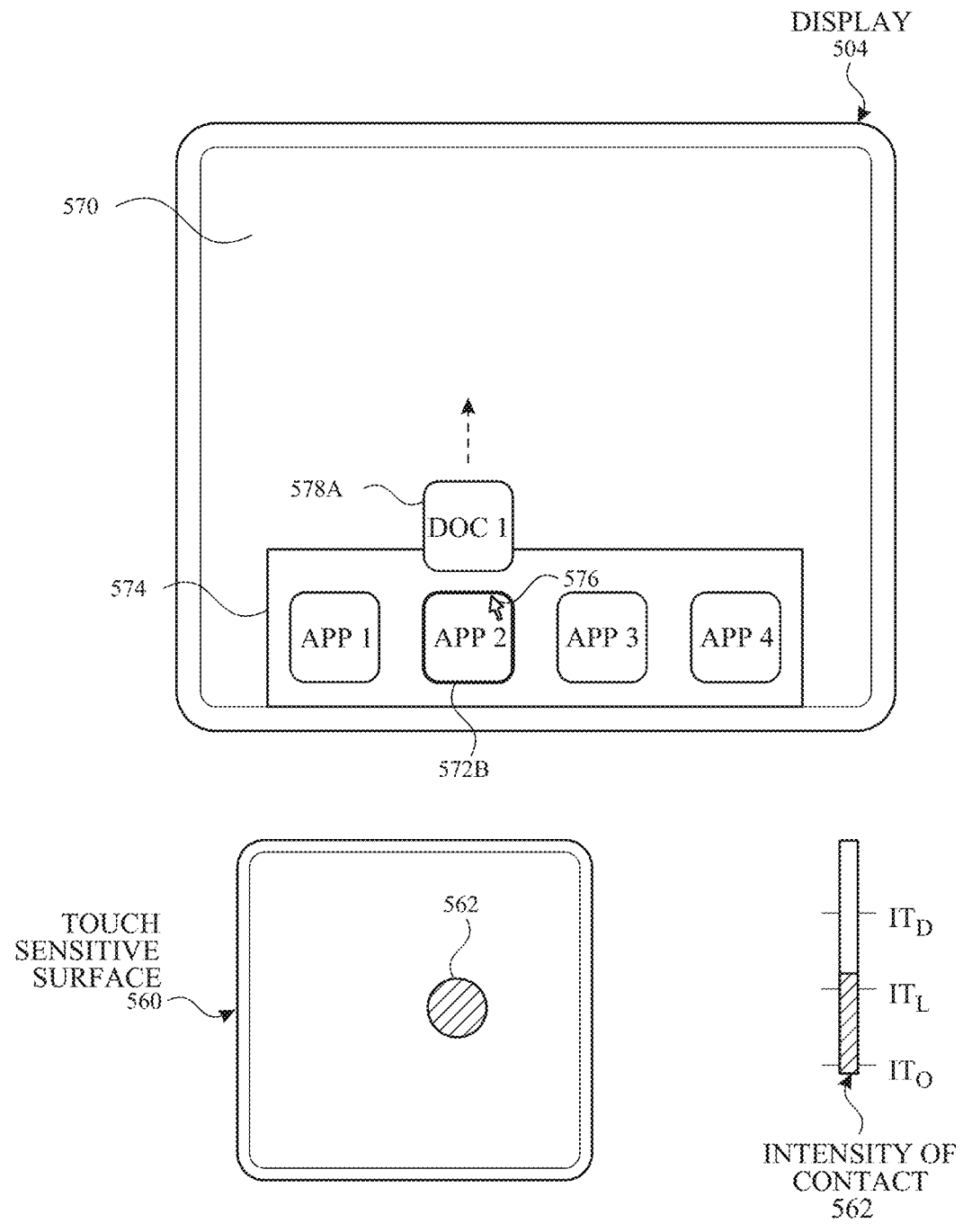
Figure 5G:
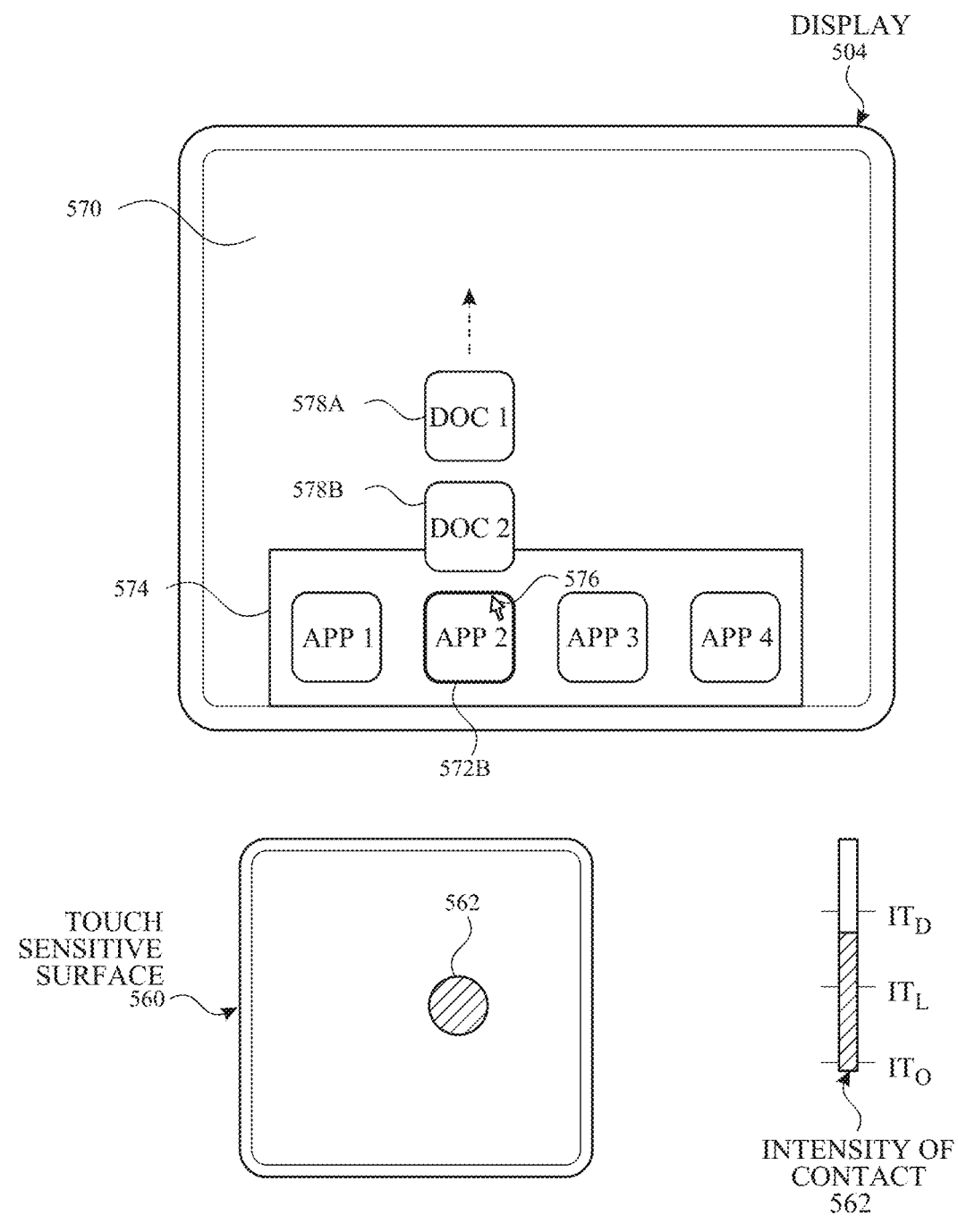
Figure 5H:
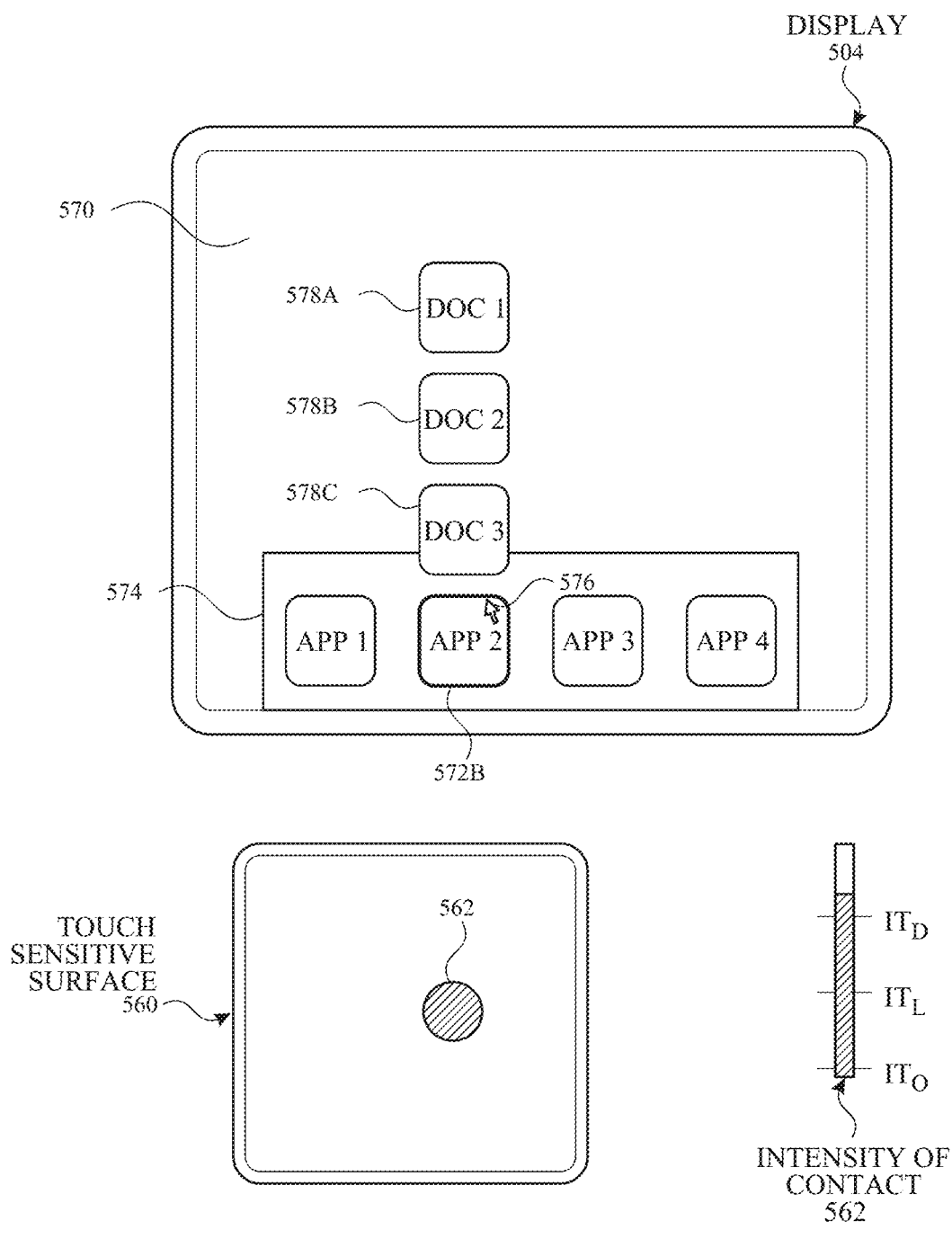

FIGS. 5E-5H illustrate detection of a gesture that includes a press input that corresponds to an increase in intensity of a contact 562 from an intensity below a light press intensity threshold (e.g., "IT$_L$") in FIG. 5E, to an intensity above a deep press intensity threshold (e.g., "IT$_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "IT$_D$"). Contact 562 is maintained on touch-sensitive surface 560. In response to the detection of the gesture, and in accordance with contact 562 having an intensity that goes above the deep press intensity threshold (e.g., "IT$_D$") during the gesture, reduced-scale representations 578A-578C (e.g., thumbnails) of recently opened documents for App 2 are displayed, as shown in FIGS. 5F-5I. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "IT$_D$"). In some embodiments, the intensity, on which the progress of the animation is based, is the characteristic intensity of the contact. The operations described with reference to FIGS. 5E-5H can be performed using an electronic device similar or identical to device 100, 300, or 500.

Figure 5I:
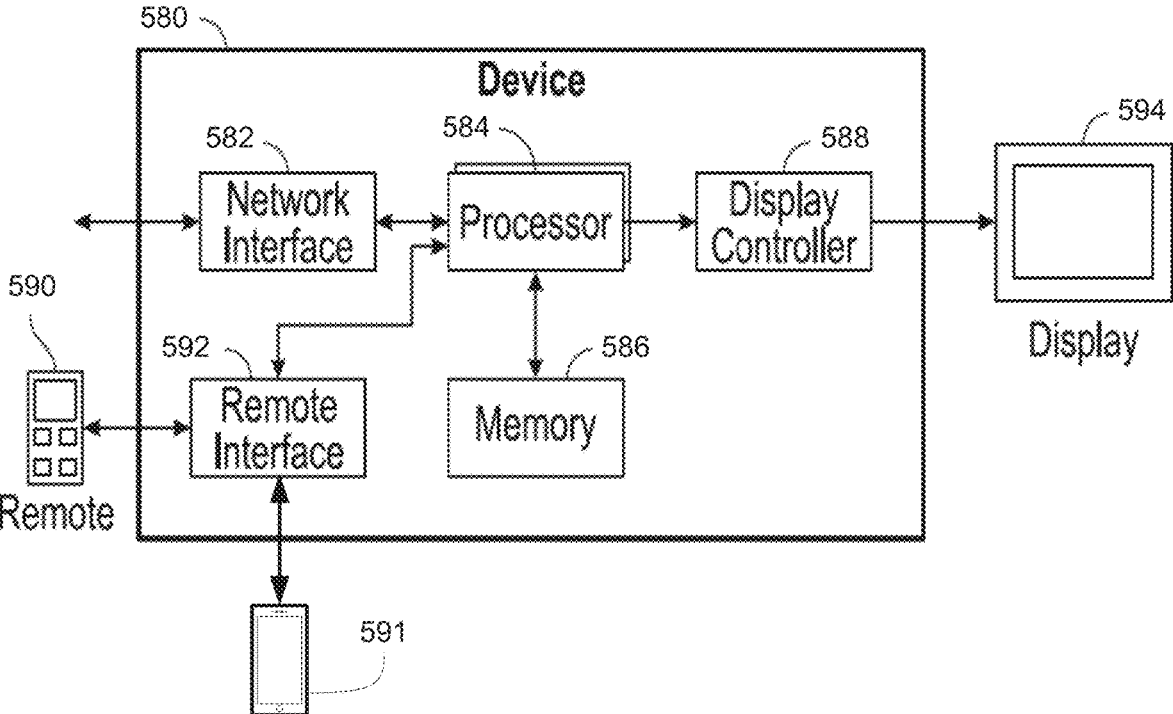
FIG. 5I illustrates a block diagram of an exemplary architectures for devices in accordance with some embodiments.

FIG. 5I illustrates a block diagram of an exemplary architecture for the device 580 according to some embodiments of the disclosure. In the embodiment of FIG. 5I, media or other content is optionally received by device 580 via network interface 582, which is optionally a wireless or wired connection. The one or more processors 584 optionally execute any number of programs stored in memory 586 or storage, which optionally includes instructions to perform one or more of the methods and/or processes described herein (e.g., methods 700, 900, 1100, 1300, 1500, and 1700).

In some embodiments, display controller 588 causes the various user interfaces of the disclosure to be displayed on display 594. Further, input to device 580 is optionally provided by remote 590 via remote interface 592, which is optionally a wireless or a wired connection. In some embodiments, input to device 580 is provided by a multi-function device 591 (e.g., a smartphone) on which a remote control application is running that configures the multifunction device to simulate remote control functionality, as will be described in more detail below. In some embodiments, multifunction device 591 corresponds to one or more of device 100 in FIGS. 1A and 2, device 300 in FIG. 3, and device 500 in FIG. 5A. It is understood that the embodiment of FIG. 5I is not meant to limit the features of the device of the disclosure, and that other components to facilitate other features described in the disclosure are optionally included in the architecture of FIG. 5I as well. In some embodiments, device 580 optionally corresponds to one or more of multifunction device 100 in FIGS. 1A and 2, device 300 in FIG. 3, and device 500 in FIG. 5A; network interface 582 optionally corresponds to one or more of RF circuitry 108, external port 124, and peripherals interface 118 in FIGS. 1A and 2, and network communications interface 360 in FIG. 3; processor 584 optionally corresponds to one or more of processor(s) 120 in FIG. 1A and CPU(s) 310 in FIG. 3; display controller 588 optionally corresponds to one or more of display controller 156 in FIG. 1A and I/O interface 330 in FIG. 3; memory 586 optionally corresponds to one or more of memory 102 in FIG. 1A and memory 370 in FIG. 3; remote interface 592 optionally corresponds to one or more of peripherals interface 118, and I/O subsystem 106 (and/or its components) in FIG. 1A, and I/O interface 330 in FIG. 3; remote 590 optionally corresponds to and or includes one or more of speaker 111, touch-sensitive display system 112, microphone 113, optical sensor(s) 164, contact intensity sensor(s) 165, tactile output generator(s) 167, other input control devices 116, accelerometer(s) 168, proximity sensor 166, and I/O subsystem 106 in FIG. 1A, and keyboard/ mouse 350, touchpad 355, tactile output generator(s) 357, and contact intensity sensor(s) 359 in FIG. 3, and touch-sensitive surface 451 in FIG. 4; and, display 594 optionally corresponds to one or more of touch-sensitive display system 112 in FIGS. 1A and 2, and display 340 in FIG. 3.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

an active application, which is currently displayed on a display screen of the device that the application is being used on;

a background application (or background processes), which is not currently displayed, but one or more processes for the application are being processed by one or more processors; and a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

User Interfaces and Associated Processes

Hover Events and Controls

Users interact with electronic devices in many different manners, including using peripheral devices in communication with such devices. In some embodiments, an electronic device receives indications of a peripheral device (e.g., a stylus) proximate to, but not contacting a surface, such as a touch-sensitive surface in communication with the electronic device. The embodiments described herein provide ways in which the electronic device responds to such indications and, for example, providing a visual preview or other indication of an interaction with the electronic device based on a current position of the input device relative to the surface, thus enhancing interactions with the device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 6B:
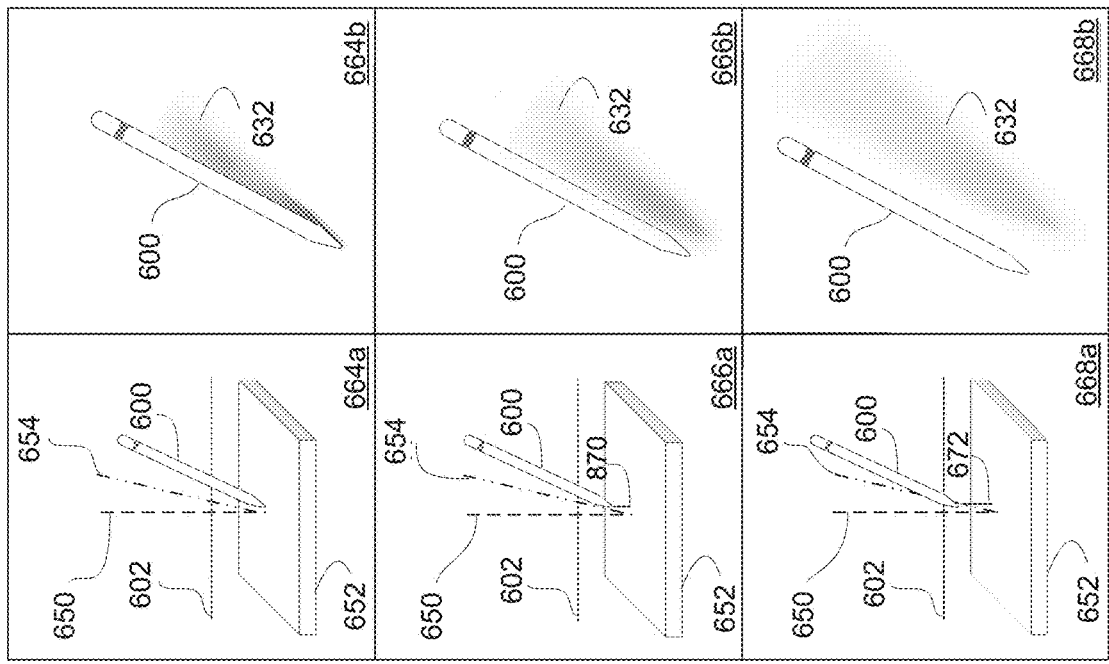
FIGS. 6A-6BB illustrate exemplary ways in which an electronic device displays indications of a pose and/or orientation of an input device relative to a surface in accordance with some embodiments.
Figure 6A:
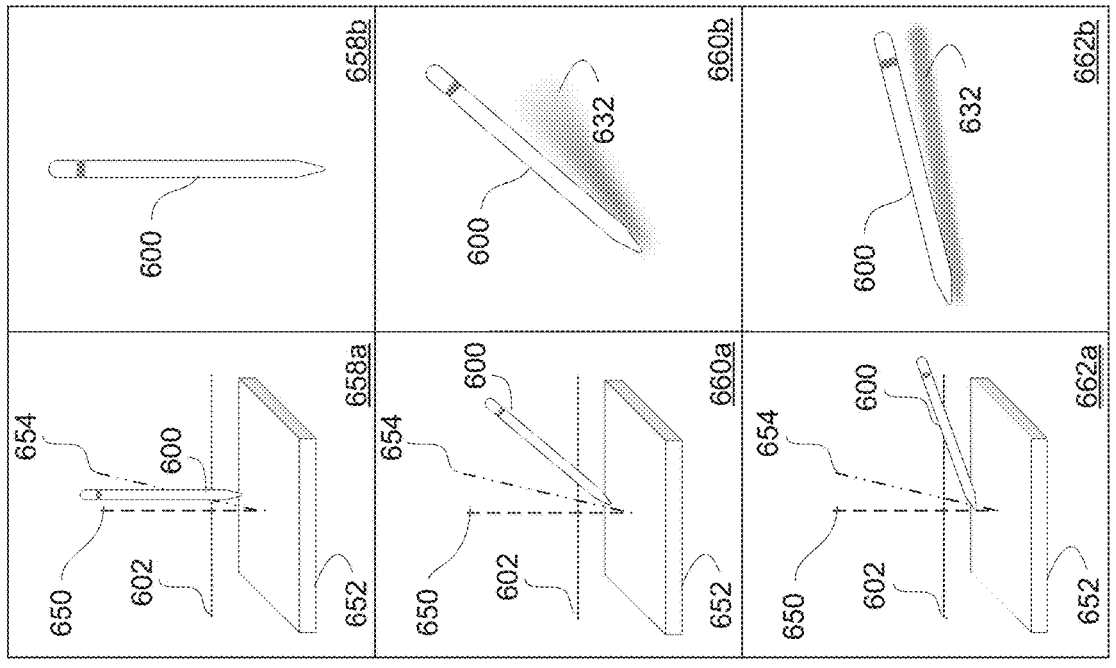

FIGS. 6A through 6BB illustrate exemplary ways in which an electronic device displays indications of a pose and/or orientation of an input device relative to a surface in accordance with some embodiments. The embodiments in these figures are used to illustrate the processes described below, including the processes described with reference to FIG. 7.

FIG. 6A illustrates a first exemplary set of simulated shadows 632 displayed by an electronic device that correspond to input device 600 (e.g., for an assumed virtual light source located above the surface 652) for different poses of the input device 600 relative to the surface. Surface 652 optionally corresponds to a touch screen of the electronic device, but other surfaces are possible such as described with reference to method 700. In sections 658a, 660a and 662a, a z-axis or normal 650 points out of the surface 652 (e.g., in a direction normal to a plane of the surface 652), an x-axis is parallel to the surface 652, and a y-axis is perpendicular to the x-axis and also parallel to the surface 652. Sections 658a, 660a and 662a correspond to different poses of input device 600 relative to surface 652, and corresponding sections 658b, 660b and 662b, respectively, illustrate example simulated shadows 632 displayed by the electronic device in response to detecting the input device 600 at those poses. In some embodiments, the simulated shadow 632 displayed by the electronic device is characterized relative to one or more thresholds, such as thresholds 602 and 654. For example, the electronic device optionally does not display a simulated shadow if input device 600 (or the tip of input device 600) is further than threshold distance 602 from surface 652. If input device 600 (or the tip of input device 600) is closer than threshold distance 602 from surface 652, the electronic device optionally displays a simulated shadow for input device 600 based on the location and/or orientation of input device 600 relative to surface 652.

For example, in section 658a of FIG. 6A, input device 600 is normal to the surface (e.g., within threshold angle 654 of normal). When input device 600 is normal to the surface and/or within threshold angle 654 of the normal, the electronic device optionally does not display a simulated shadow for the input device, such as shown in section 658b. In contrast, in section 660a, the tilt of input device 600 is a first amount greater than the threshold angle 654 relative to the normal to surface 652 such as 15, 20, 25, 30 or 35 degrees. In response, the electronic device displays simulated shadow 632 for input device 600 with a first degree of intensity (e.g., first degree of blurriness, first degree of shadow spread, and/or first degree of opacity) such as shown in section 660b. In section 662a, the tilt of the input device 600 relative to normal 650 is greater than the tilt of input device 600 in section 660a. The degree of intensity of the simulated shadow 632 in corresponding section 662 is less blurry, includes less shadow spread, and includes an increased degree of opacity compared to the simulated shadow 632 in section 660b corresponding to the tilt of the input device 600 found in section 660a. In some embodiments, the intensity of the visual representation of the simulated shadow 632 changes in response to a change in tilt of the input device 600. For example, the tilt of the input device 600 in section 662a is greater than the tilt of input device 600 in section 660a and its corresponding simulated shadow 632 in 662b is more intense (e.g., darker and/or more defined) than the simulated shadow 632 in 660b, which includes a simulated shadow 632 that is lighter and blurrier (e.g., has a larger radius of blur). Further, in some embodiments, the length of simulated shadow 632 gets shorter as the tilt of input device 600 relative to normal 650 decreases, such as shown in sections 660b and 662b in FIG. 6A.

FIG. 6B illustrates a second exemplary set of simulated shadows 632 changing in visual appearance in response to a change in distance (e.g., a change in pose) of the input device 600 from the surface. In FIG. 6B, tilt of the input device 600 relative to normal 650 remains constant while the distance of the input device 600 relative to the surface 652 changes (e.g., from no distance (or contact with the surface), to distance 670 to distance 672) as the input device 600 moves away from the surface. In some embodiments, if the input device 600 (e.g., tip of the stylus) moves above (or is beyond) the predefined threshold distance 602, the simulated shadow 632 is not displayed (e.g., not included in the user interface), similar to as shown in section 658b in FIG. 6A. As shown in FIG. 6B, the visual appearance of the simulated shadow 632 in response to the change in distance of input device 600 changes in intensity. For example, in section 664a, the input device 600 is in contact with the surface 652 (e.g., very little to no distance between the tip of input device 600 and the surface 652). When input device 600 is in contact with the surface 652, the electronic device displays the simulated shadow for the input device with a first degree of intensity (e.g., first degree of blurriness, first degree of shadow spread, and/or first degree of opacity), such as shown in section 664*b*. In contrast, in section 666*a*, there is a first distance between the tip of input device 600 and the surface 652, such as 0.1, 0.2, 0.5, 0.8, 1, 3, or 5 cm. In response, the electronic device displays simulated shadow 632 for input device 600 with a second degree blurriness greater than the first degree of blurriness, a second degree of shadow spread greater than the first degree of shadow spread, and/or a second degree of opacity greater than the first degree of opacity, such as shown in section 666*b*. In section 668*a*, the distance 672 between the tip of the input device 600 and the surface 652 is greater than the distance 670 in section 666*a*. The degree of intensity of the simulated shadow 632 corresponding to section 668*a* includes a third degree of blurriness greater than the second degree of blurriness, a third degree of shadow spread greater than the second degree of shadow spread, and/or a third degree of opacity greater than the second degree of opacity, such as shown in section 668*b*. For example, in section 668*b* the simulated shadow 632 is less opaque when the tip of the input device 600 is distance 672 away from the surface 652, and in section 666*b*, the simulated shadow 632 is more opaque when the tip of the input device 600 is distance 670 away from the surface 652. Compared to sections 668*b* and 666*b*, the simulated shadow 632 is even more opaque when the input device 600 is in contact with the surface 652 (e.g., having no distance between the tip of the input device and the surface), as shown in section 664*b*.

Figure 6C:
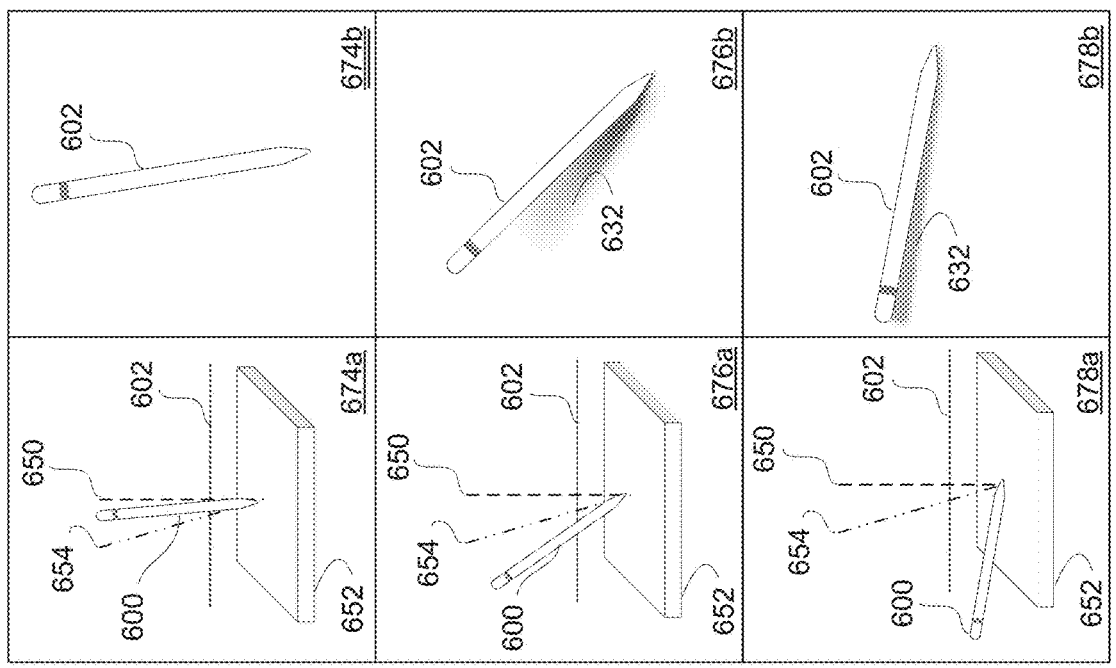
FIGS. 6CC-6TT illustrate exemplary ways in which an electronic device displays indications of an orientation of a selected drawing implement for the input device in accordance with some embodiments.

As shown in FIGS. 6A, 6B and/or 6C, the direction and/or orientation of the simulated shadow 632 changes as the orientation of the input device 600 changes relative to surface 652. FIG. 6C illustrates a third exemplary set of simulated shadows 632 for input device 600 in contact with the surface 652 and positioned in an orientation downward and rightward, distinct from the orientation shown in FIG. 6B, which is downward and leftward. As shown in FIGS. 6B and 6C, the orientation of the simulated shadow 632 changes correspondingly as the orientation of the input device 600 changes relative to the surface 652 (e.g., when the tip of the input device 600 is oriented downward and rightward, the tip of simulated shadow 632 is oriented downward and rightward, and when the tip of the input device 600 is oriented downward and leftward, the tip of simulated shadow 632 is oriented downward and leftward).

FIG. 6C further, illustrates the simulated shadow 632 changing as the tilt of the input device 600 relative to normal 650 changes (e.g., a change in pose). For example, in section 674*a*, input device 600 is within threshold angle 654 of normal, though different from the tilt of input device 600 in section 658*a* of FIG. 6A. When input device 600 is within threshold angle 654 of the normal 650, the electronic device optionally does not display a simulated shadow 632 for the input device, such as shown in section 674*b*. In contrast, in section 676*a*, the tilt of input device 600 is a first amount greater than the threshold angle 654 relative to the normal 650 to surface 652 such as 15, 20, 25, 30 or 35 degrees. In response, the electronic device displays simulated shadow 632 for input device 600 with a first degree of intensity (e.g., first degree of blurriness, first degree of shadow spread, and/or first degree of opacity) such as shown in section 676*b*. In section 678*a*, the tilt of the input device 600 is greater than the tilt of input device 600 in section 676*a*. The degree of intensity of the simulated shadow 632 corresponding to section 678*a* in section 678*b* is less blurry, includes less shadow spread, and/or includes an increased degree of opacity compared to the simulated shadow 632 in section 676*b* corresponding to the tilt of the input device 600 shown in section 676*a*. As shown in the examples of FIGS. 6A-6C, in some embodiments, the simulated shadow changes in blurriness, length, intensity, opacity, size, and/or color in response to one or more of the tilt, orientation, and/or distance of the input device 600 relative to the surface 652.

In some embodiments, the details of the simulated shadow 632 displayed by the electronic device for input device 600 as described and illustrated in FIGS. 6A-6C optionally apply to one or more or all of the simulated shadows illustrated and described with reference to method 700. As described and illustrated in FIGS. 6A-6C, an electronic device optionally associates a pose of an input device relative to a surface with a virtual pose of a selected drawing implement for the input device relative to the surface (e.g., the device optionally causes the pose to be the same as or generally to correspond to the pose of the input device relative to the surface). In addition, as described and illustrated in FIGS. 6D-6BB, an electronic device optionally associates a pose of an input device relative to a surface with a virtual pose of a selected drawing implement for the input device relative to the surface (e.g., the device optionally causes the pose of the selected drawing implement for the input device to be the same as or generally to correspond to the pose of the input device relative to the surface).

An electronic device optionally displays a virtual shadow and/or a preview mark of a selected drawing implement for the input device, each of which optionally visually indicating the pose and/or orientation of the selected drawing implement for the input device. An electronic device optionally changes the pose and/or orientation of the selected drawing implement for the input device in response to a change in the pose and/or orientation of the input device in order to maintain correspondence of the pose and orientation of the selected drawing implement for the input device to the pose and/or orientation of the input device relative to the surface to. Displaying such indications assists a user in determining a pose and orientation of a currently selected drawing implement (e.g., a virtual drawing implement) for the input device and in determining how a mark of the currently selected drawing implement for the input device would appear on a user interface in response to a marking input based on a current pose and orientation of the input device relative to the surface, and notifies the user whether changes to the pose and orientation of the input device would be needed to see a desired marking input on the user interface. These features, in addition to other features, are generally illustrated in FIGS. 6D-6BB and described further in FIG. 7.

Figure 6D:
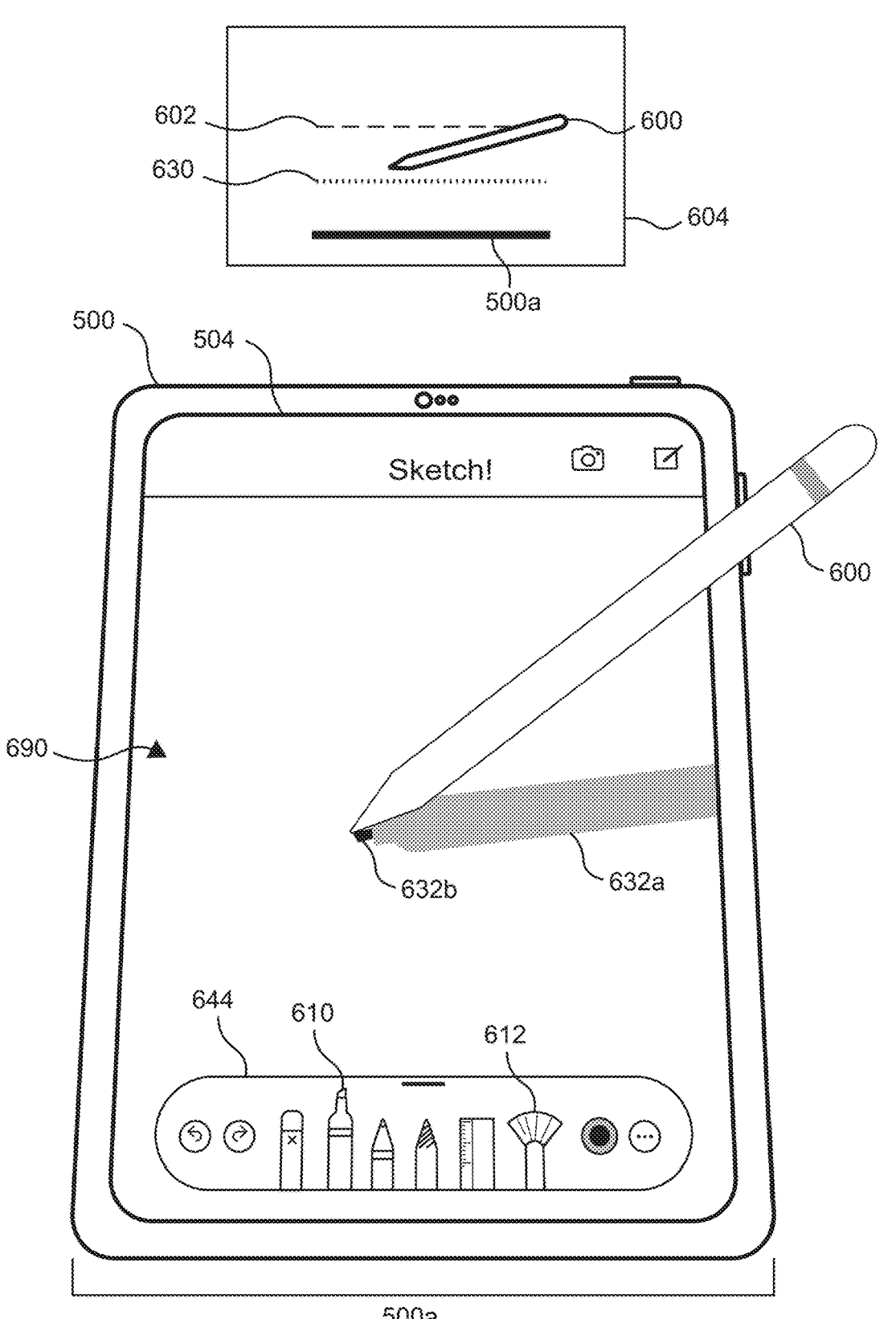

FIG. 6D illustrates an exemplary device 500 (e.g., corresponding to object 500 of glyph 604) that includes a touch screen 504, displaying a user interface 690 including a shadow of a currently selected drawing implement for an input device in a user interface of an application (e.g., a drawing application) having a visual appearance based on a pose and orientation of the input device in accordance with some embodiments. Device 500 is optionally the electronic device referenced in the description of FIGS. 6A-6C.

In some embodiments, the user interface 690 is a user interface of a drawing application or a user interface in which content drafting is performed using input device 600. In some embodiments, the drawing application is an application installed on device 500. As shown in FIGS. 6A-6BB, the user interface 690 optionally includes one or more virtual objects (e.g., content entry palette 644). Content entry palette 644 includes one or more selectable options associated with content. For example, content entry palette 644 optionally includes options for selecting the drawing implement (e.g., content entry tool) being emulated by the input device 600, options for undoing a recent content-entry related action or redoing (e.g., performing again) the recent content-entry relation action, options for changing a color of content, and/or options for selecting a virtual keyboard for entering text. In some embodiments, the possible drawing implements for input device 600 include a text entry tool, a pen entry tool, a highlighter (or marker) entry tool (e.g., highlighter 610), a pencil entry tool, an eraser tool, a fan brush 612, and/or a content selection tool, among other possibilities.

In FIG. 6D, the currently selected drawing implement for the input device is highlighter 610 (e.g., a chisel tip highlighter) and input device 600 has a respective pose (e.g., a respective position and/or tilt) and orientation relative to the touch screen 504 (e.g., surface) of device 500. In FIG. 6D, device 500 displays a simulated shadow, including a first shadow portion 632a corresponding to a barrel of the currently selected drawing implement for the input device 600 and a second shadow portion 632b corresponding to a tip of the currently selected drawing implement for the input device 600, that is based on the respective pose and orientation of input device 600 relative to the surface. First portion 632a optionally has a visual appearance of a barrel of the highlighter 610 and second portion 632b has a visual appearance of a chisel tip of the highlighter 610 optionally because the currently selected drawing implement for the input device is highlighter 610 (e.g., a virtual chisel tip highlighter). It should be noted that shadow portions 632a/632b are optionally the same color or are different in color. It should be noted that in FIG. 6D, the virtual light source that is virtually cast onto the surface of touch screen 504 is orthogonal to the surface (which is optionally different than what's shown in FIGS. 6A through 6C). In some embodiments, the virtual light source that is simulated as cast onto the surface of touch screen 504 is observable via a simulated shadow, without being observable on the user interface without the simulated shadow.

As shown in glyph 604 (e.g., side view glyph) in FIG. 6D, the input device 600 is at a first vertical location relative to edge 500a of device 500) and is within distance 602 from surface of the device 500, but is not within distance 630 of the surface of device 500. Distance 602 optionally represents a threshold maximum distance between device 500 and input device 600 for device 500 to display a simulated shadow associated with input device 600 (e.g., simulated shadow of a currently selected drawing implement for the input device). Threshold distance 630 optionally represents a threshold maximum distance between device 500 and input device 600 for device 500 to display a preview mark associated with input device 600 (e.g., a preview mark of a currently selected drawing implement for the input device). In FIG. 6D, device 500 displays shadow portions 632a/632b of the highlighter 610 without displaying a preview mark of the highlighter 610 optionally because the distance between device 500 and input device 600 in FIG. 6D is beyond threshold distance 630. In some embodiments, device 500 displays a simulated shadow of the currently selected implement for the input device without displaying a preview mark of the currently selected implement for the input device optionally due to user input (e.g., settings set to display a simulated shadow of the currently selected implement for the input device without displaying a preview mark of the currently selected implement for the input device based on user-defined settings), such as described with reference to FIG. 7.

Figure 6E:
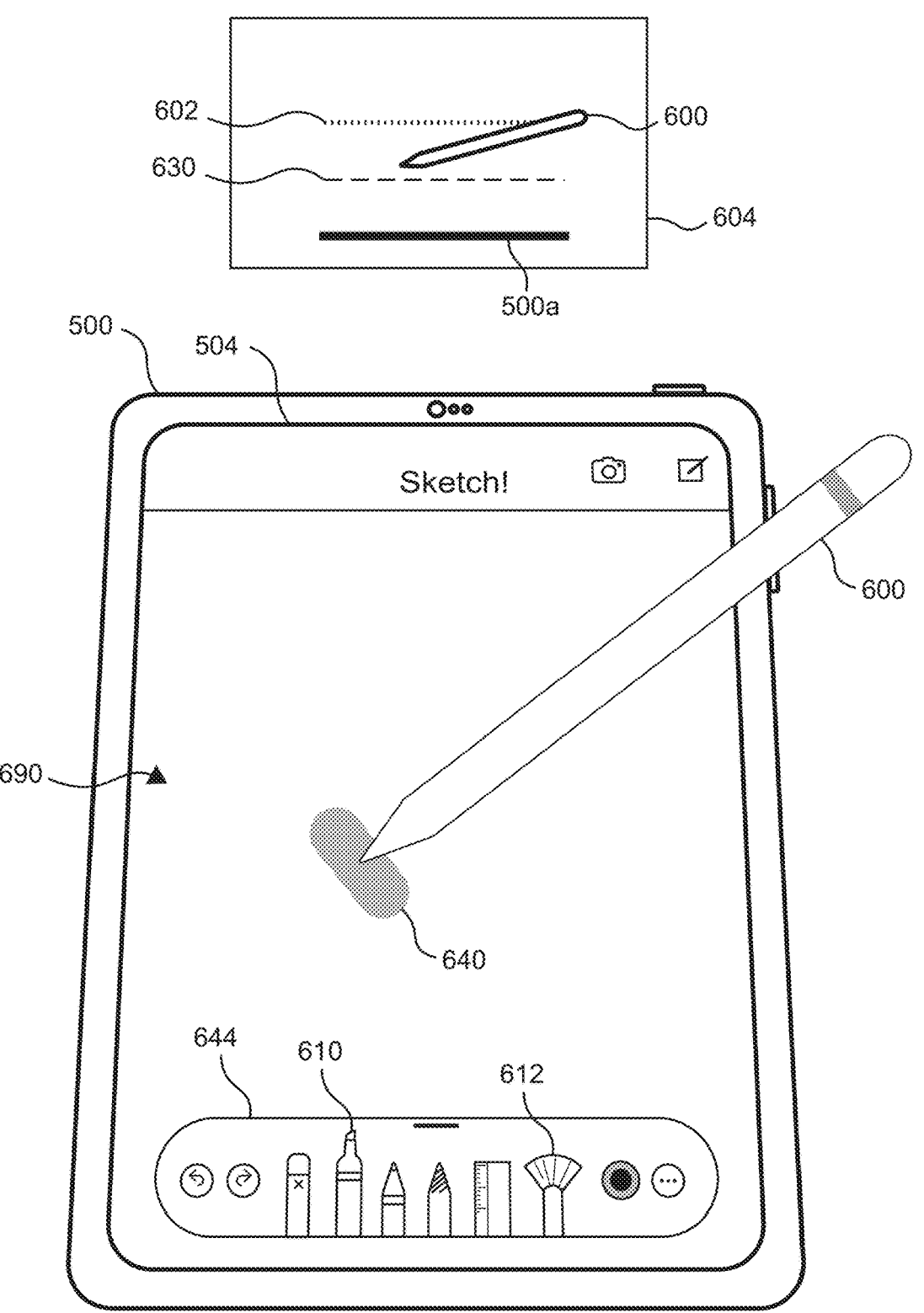

FIG. 6E illustrates device 500 displaying a preview mark 640 of the highlighter 610 based on a pose and orientation of the input device in accordance with some embodiments. Preview mark 640 of the highlighter 610 does not have radial symmetry in the user interface optionally because it corresponds to the highlighter 610, which is a chisel tip highlighter, and a chisel tip of a highlighter does not have radial symmetry. In some embodiments, preview mark 640 of the highlighter 610 has a visual appearance that is of the same color as the highlighter 610 (e.g., as the selected color of highlighter 610). Preview marks of drawing implements are described further with reference to FIG. 7. In FIG. 6E, device 500 displays preview mark 640 of the highlighter 610 without displaying a simulated shadow optionally because as shown in glyph 604, input device 600 is within threshold distance 602, but not within threshold distance 630.

It should be noted that in FIGS. 6D and 6E, the virtual light source by which the simulated shadow is cast, is optionally above the surface and incident normal to the touch screen 504. As such, in FIGS. 6D and 6E, the virtual shadow is optionally cast (e.g., displayed on device 500), directly below (e.g., a center of the virtual shadow is directly below the input device 600).

Figure 6F:
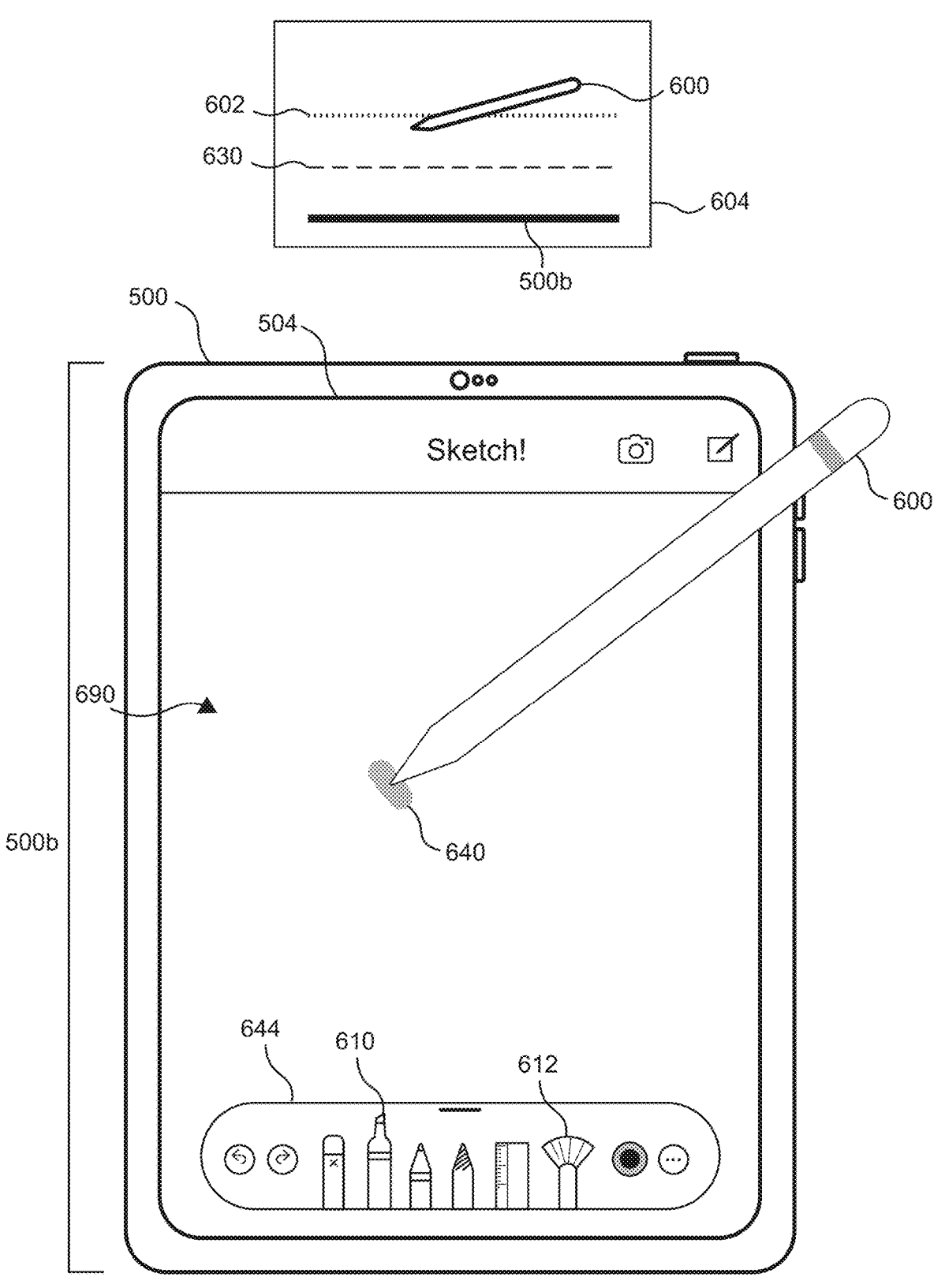

From FIG. 6E to FIG. 6F, the distance between the input device 600 and the surface of touch screen 504 has increased while remaining within threshold distance 602 (such as shown in glyph 604 with input device 600 being at a second vertical location relative to edge 500b (which is the same as the vertical location relative to edge 500a) while remaining within threshold distance 602) and while input device has the first orientation relative to the surface (e.g., the variable that has changed from FIG. 6E to FIG. 6F is the distance between the input device 600 and the surface corresponding to device 500 optionally without another position or orientation variable of input device changing). In response, device 500 decreases a size of the preview mark 640 of the highlighter 610, such as shown from FIG. 6E to FIG. 6F. As such, in some embodiments, an electronic device displays a preview mark of a currently selected drawing implement for an input device and changes one or more visual characteristics of the preview mark based on a change in distance between input device 600 and surface of touch screen 504. Differences in visual characteristics of preview marks based on differences in distances between surface and input device 600 are described further with reference to FIG. 7.

It should be noted that, in FIGS. 6F through 6BB, the virtual light source that is virtually incident on the user interface 690 so as to cause device 500 to display a simulated shadow on user interface 690 is optionally incident on the user interface 690 at the same angle throughout FIGS. 6F through 6BB.

Figure 6G:
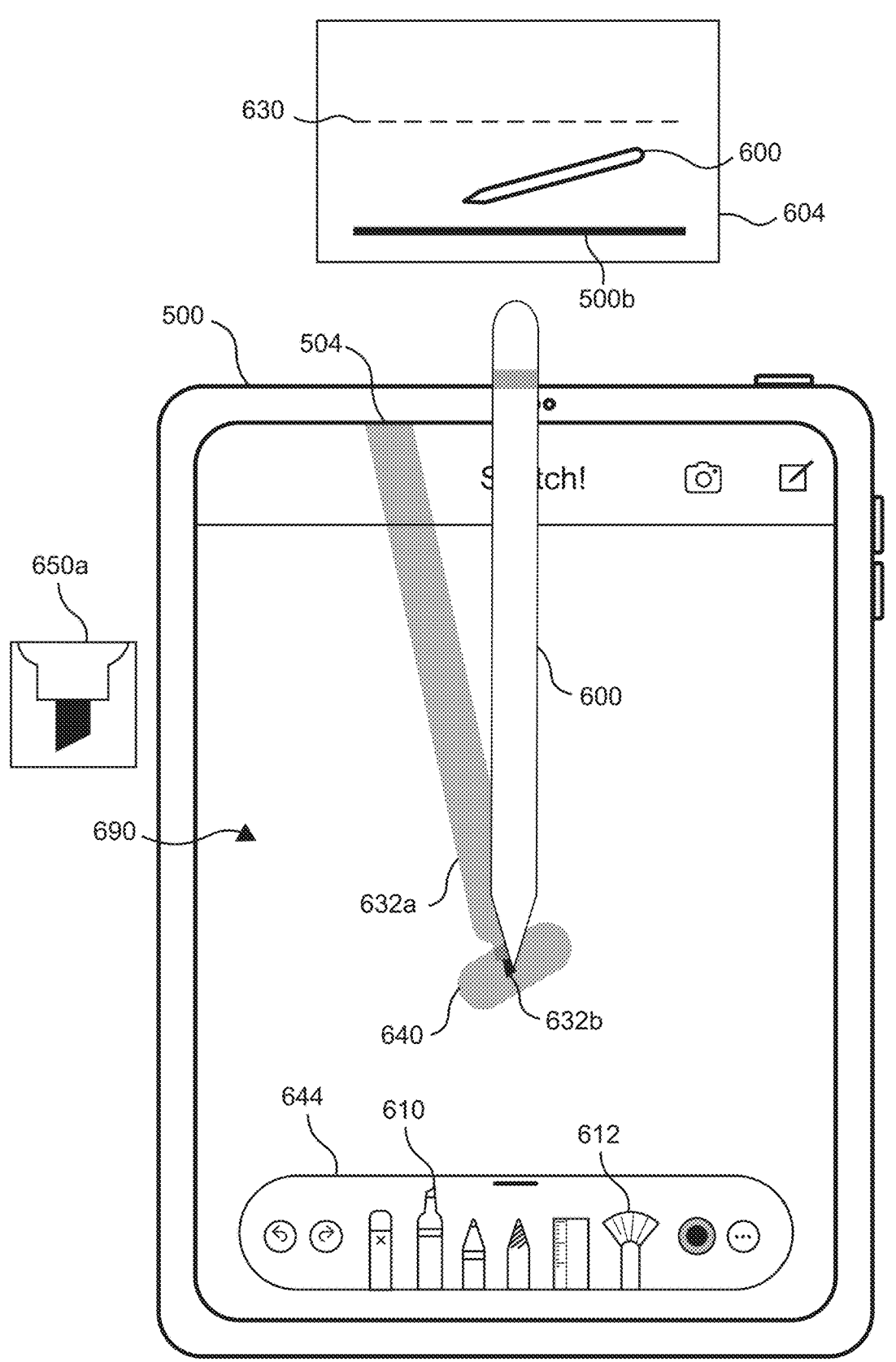

FIG. 6G illustrates an electronic device concurrently displaying a preview mark 640 of highlighter 610 and shadow portions 632a/632b of highlighter 610 based on a first pose and orientation of input device relative to surface (e.g., touch screen) of device 500, in accordance with some embodiments. Glyphs 650a through 650i, 650m through 650u, and 650v through 650jj provide respective magnified views of how shadow portion 632b of highlighter 610 is displayed (e.g., the shape of shadow portion 632b of highlighter 610 and the shape of the edge of the barrel closest to the tip of highlighter 610) on the user interface 690 based on the orientation of input device 600 in the respective figure in which the respective glyph appears. It should be noted that, in FIGS. 6G through 6SS, threshold distance 630 optionally corresponds to a threshold maximum distance between surface of touch screen 504 and input device 600 (e.g., tip of input device 600) for displaying both a preview mark of the currently selected drawing implement and virtual shadow of the currently selected drawing implement being the same.

Figure 6H:
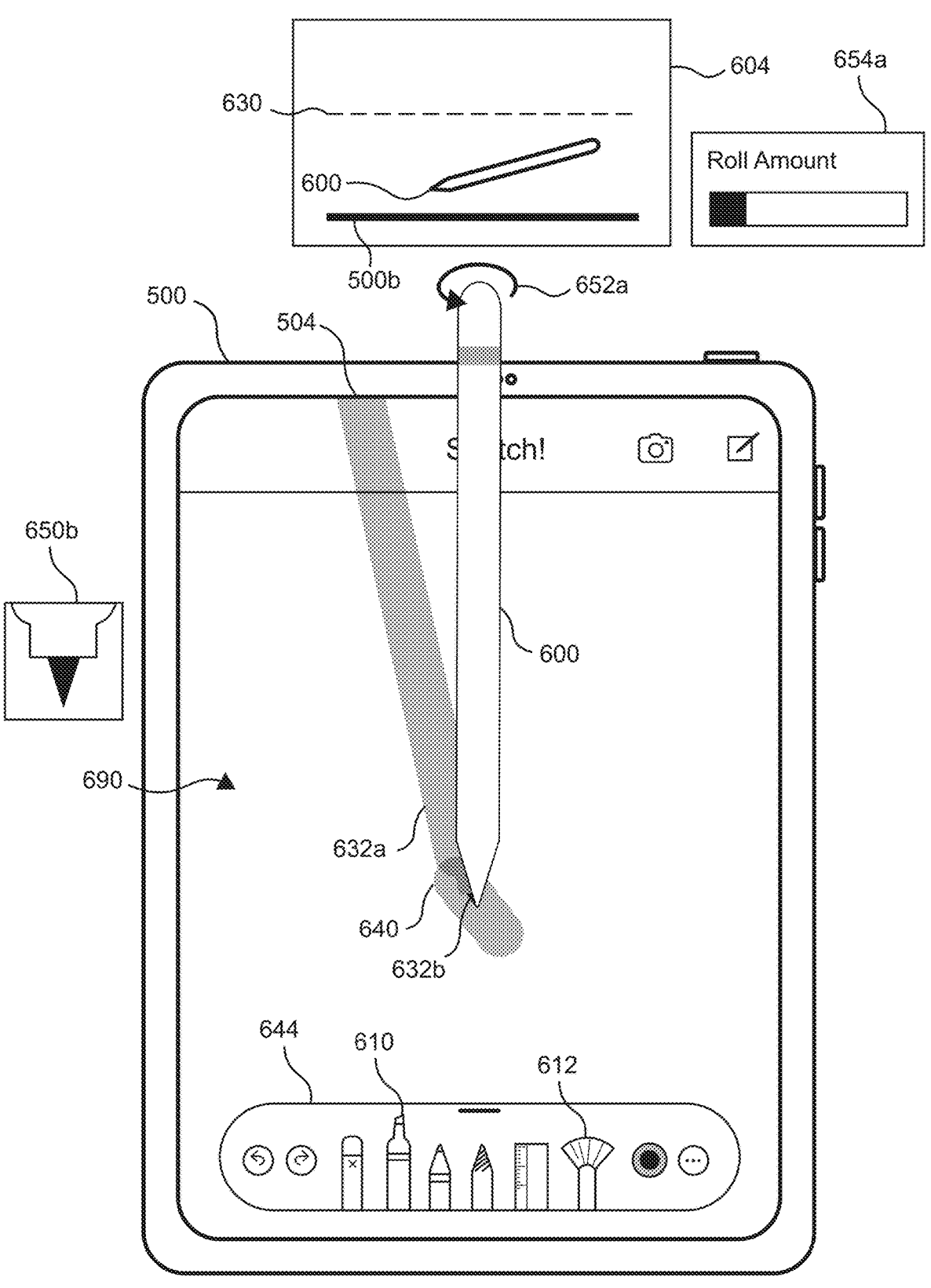
Figure 6I:
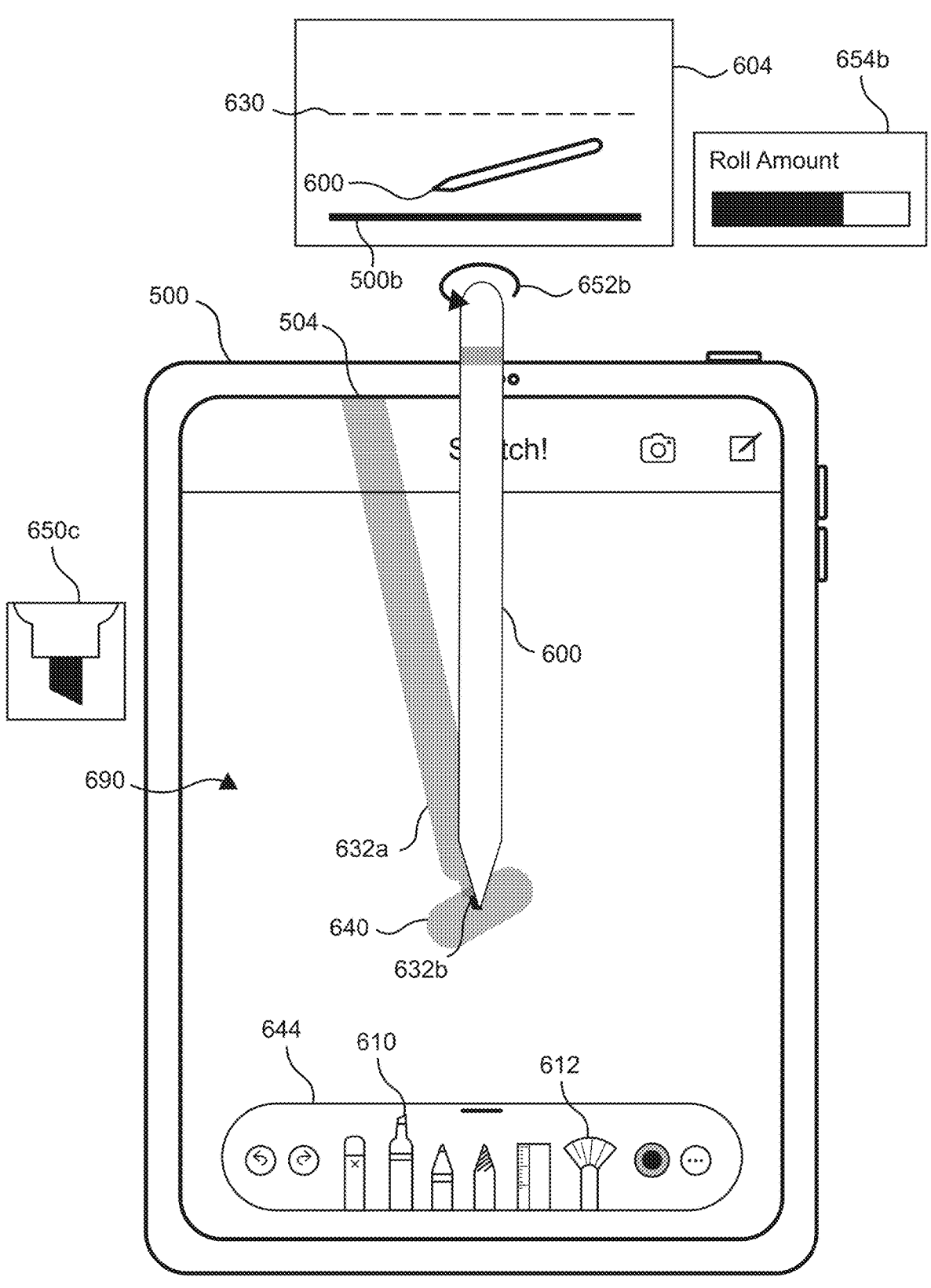

FIGS. 6G through 6I illustrate device 500 changing visual appearances of shadow portion 632b of the highlighter 610 and preview mark 640 of the highlighter 610 in response to respective changes in orientations of input device 600 about the roll axis (e.g., longitudinal axis) of input device 600 according to some embodiments. It should be noted that, in FIGS. 6G through 6I, the currently selected drawing implement for the input device is highlighter 610, and the corresponding barrel of the highlighter 610 has radial symmetry (e.g., about the roll axis of highlighter 610). As such, since the inputs described with reference to FIGS. 6G through 6I are respective rotations about the roll axis of input device 600 (and the roll axis of input device 600 is optionally the same as the roll axis of the currently selected drawing implement), and the barrel of the highlighter 610 has radial symmetry, the device 500 optionally maintains the same visual appearance of shadow portion 632a of the highlighter 610 throughout FIGS. 6G through 6I.

From FIG. 6G to 6H, device 500 detects rotational movement (e.g., as indicated by arrow 652a) of the input device 600 about the roll axis (e.g., longitudinal axis) of input device 600 while the input device 600 has the pose relative to the surface of touch screen 504 illustrated in FIG. 6G. For example, while input device has the pose illustrated in FIG. 6G, device 500 detects an amount of roll of input device 600 (e.g., an amount of twist of the input device 600 about its roll axis optionally from a user holding and twisting the input device 600 about the roll axis of the input device 600) indicated in glyph 654a (e.g., a 90-degree rotation). In response, device 500 optionally changes the visual appearance of the portion 632b of the highlighter 610 and of the preview mark 640 of the highlighter 610, as shown in FIG. 6H, in accordance with the respective amount of rolling of input device about its roll axis. For example, in FIG. 6G, portion 632b of the highlighter 610 has a first visual appearance corresponding to the shadow of the chisel tip of highlighter 610 while the orientation of input device 600 is a first orientation, as shown in glyph 650a, and in FIG. 6H, as shown in glyph 650a, portion 632b of the highlighter 610 has a second visual appearance corresponding to the shadow of the chisel tip of highlighter 610 corresponding to the rotation of the chisel tip of highlighter tool in FIG. 6G by 90 degrees (e.g., from the first orientation in FIG. 6G to the second orientation illustrated in FIG. 6H) while the input device maintains the first pose relative to the surface of touch screen 504.

Likewise, in response to the rotational movement (e.g., as indicated by arrow 652a), device 500 optionally changes the visual appearance of the preview mark 640 of the highlighter 610, as shown from FIG. 6G to FIG. 6H, in accordance with the respective amount of rolling of input device about its roll axis. For example, in FIG. 6G, preview mark 640 of the highlighter 610 has a first visual appearance including a first orientation relative to a reference in the user interface 690 (e.g., palette 644) while the pose of input device 600 is a first pose relative to the surface of touch screen 504 and while the orientation of input device 600 is a first orientation relative to the surface of touch screen 504, and in FIG. 6H, due to change in orientation of the input device 600 from the first orientation to the second orientation, which is due to the rolling of the input device about the roll axis of the input device 600 by the respective amount while the input device 600 has the first pose illustrated in FIG. 6G, preview mark 640 of the highlighter 610 has a second visual appearance including a second orientation relative to the reference in the user interface (e.g., palette 644) while the pose of input device 600 is the first pose relative to the surface of touch screen 504. From FIG. 6G to 6H, device 500 has optionally rotated (e.g., on user interface 690) preview mark 640 of the highlighter 610 by 90-degrees about a center of preview mark 640 of the highlighter 610 in FIG. 6G, corresponding to the amount of roll of the input device about the roll axis of the input device, and optionally in a direction (e.g., clockwise or counterclockwise) corresponding to the direction of the rolling of the input device 600. As such, the rotation of the input device 600 about the roll axis of input device 600 optionally causes a corresponding change in the visual appearances of shadow portion 632b of the highlighter 610 and preview mark 640 of the highlighter 610.

Alternatively, from FIG. 6G to 6I, device 500 detects rotational movement (e.g., as indicated by arrow 652b) of the input device 600 about the roll axis (e.g., longitudinal axis) of input device 600 while the input device 600 has the pose relative to the surface of touch screen 504 illustrated in FIG. 6G. For example, while input device has the pose illustrated in FIG. 6G, device 500 detects an amount of roll of input device 600 (e.g., an amount of twist of the input device 600 about its roll axis optionally from a user holding and twisting the input device 600 about the roll axis of the input device 600) indicated in glyph 654b (e.g., a 180-degree rotation). In response, device 500 optionally changes the visual appearance of the portion 632b of the highlighter 610 and of the preview mark 640 of the highlighter 610, as shown in FIG. 6I, in accordance with the respective amount of rolling of input device about its roll axis. For example, in FIG. 6G, portion 632b of the highlighter 610 has a first visual appearance corresponding to the shadow of the chisel tip of highlighter 610 while the orientation of input device 600 is a first orientation, as shown in glyph 650a, and in FIG. 6I, as shown in glyph 650c, portion 632b of the highlighter 610 has a second visual appearance corresponding to the shadow of the chisel tip of highlighter 610 corresponding to the rotation of the chisel tip of highlighter 610 in FIG. 6G by 180 degrees (e.g., from the first orientation in FIG. 6G to the second orientation illustrated in FIG. 6I) while the input device maintains the first pose relative to the surface of touch screen 504.

Likewise, in response to the rotational movement (e.g., as indicated by arrow 652b) about the roll axis of the input device 600 while the input device 600 has the pose illustrated in FIG. 6G, device 500 optionally changes the visual appearance of the preview mark 640 of the highlighter 610, as shown from FIG. 6G to 6I, in accordance with the respective amount of rolling of input device about its roll axis. For example, in FIG. 6G, preview mark 640 of the highlighter 610 has a first visual appearance including a first orientation relative to a reference in the user interface (e.g., palette 644) while the pose of input device 600 is a first pose relative to the surface of touch screen 504 and while the orientation of input device 600 is a first orientation relative to the surface of touch screen 504, and in FIG. 6I, due to change in orientation of the input device 600 from the first orientation of FIG. 6H to the second orientation of FIG. 6I, which is due to the rolling of the input device about the roll axis of the input device 600 by the respective amount while the input device 600 has the first pose illustrated in FIG. 6G, preview mark 640 of the highlighter 610 has a second visual appearance including a second orientation relative to the reference in the user interface (e.g., palette 644) while the pose of input device 600 is the first pose relative to the surface of touch screen 504. From FIG. 6G to 6I, device 500 has optionally rotated (e.g., on user interface 690) preview mark 640 of the highlighter 610 by 180-degrees about a center of preview mark 640 of the highlighter 610 in FIG. 6G, corresponding to the amount of roll of the input device about the roll axis of the input device, and optionally in a direction (e.g., clockwise or counterclockwise) corresponding to the direction of the rolling of the input device 600. As such, the rotation of the input device 600 about the roll axis of input device 600 optionally causes a corresponding change in the visual appearances of shadow portion 632*b* of the highlighter 610 and preview mark 640 of the highlighter 610.

It should be noted that preview mark 640 of the highlighter 610 in FIGS. 6G and 6I has the same orientation relative to the reference in the user interface because preview mark 640 of the highlighter 610 (e.g., in FIGS. 6G and 6I) is pill-shaped, and a 180-degree rotation (clockwise or counterclockwise) of a pill on a plane from a first orientation parallel to the plane to a second orientation on the plane, results in the same orientation due to the shape. Further, as shown from FIGS. 6G through 6I, device 500 optionally changes appearances of preview marks and shadows of currently selected drawing implements for input devices correspondingly and/or differently based on different amounts of rotations of the input device 600 about the roll axis of input device 600 and optionally based on the shapes of the preview marks and drawing implements.

Figure 6J:
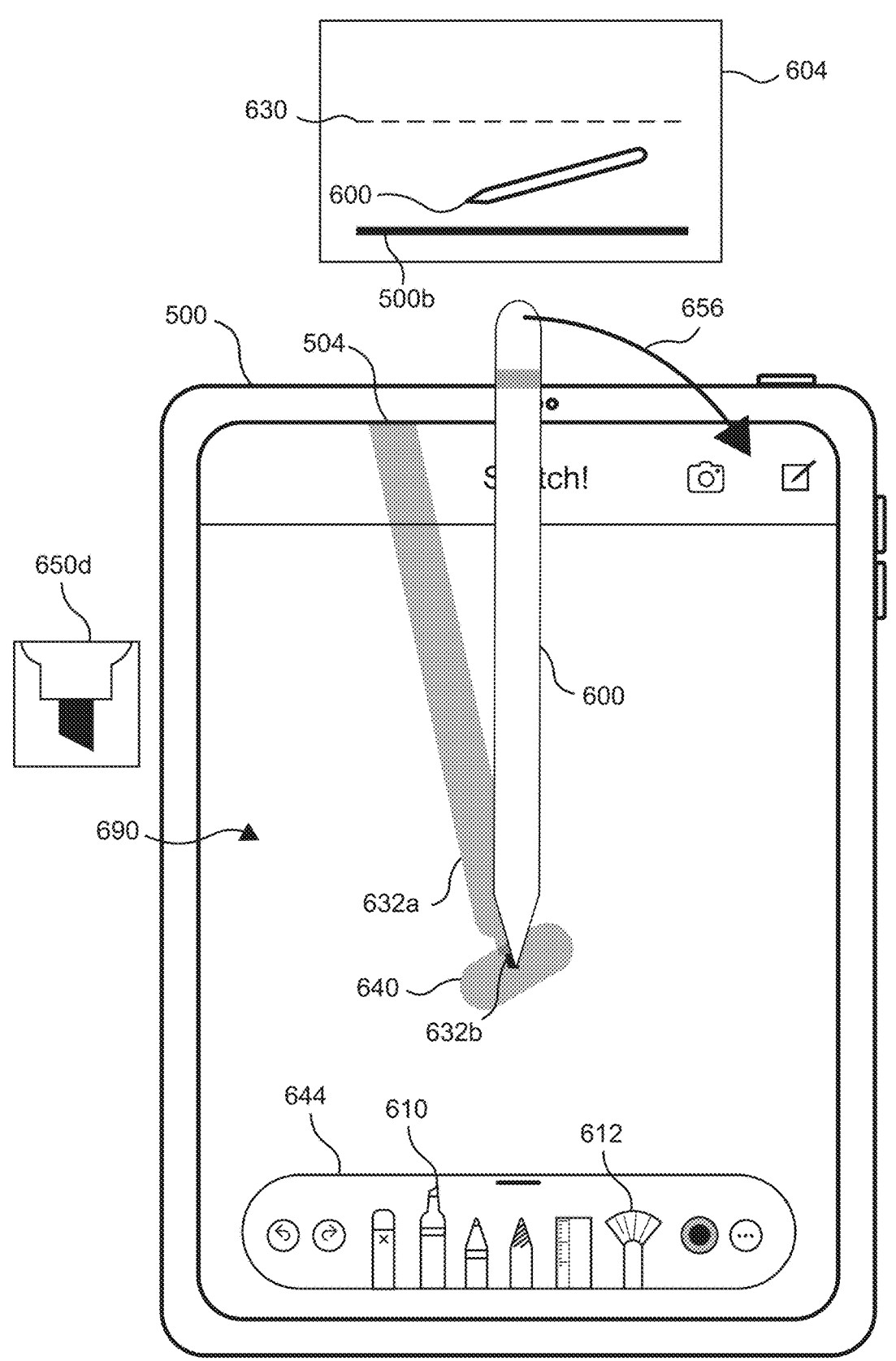
Figure 6K:
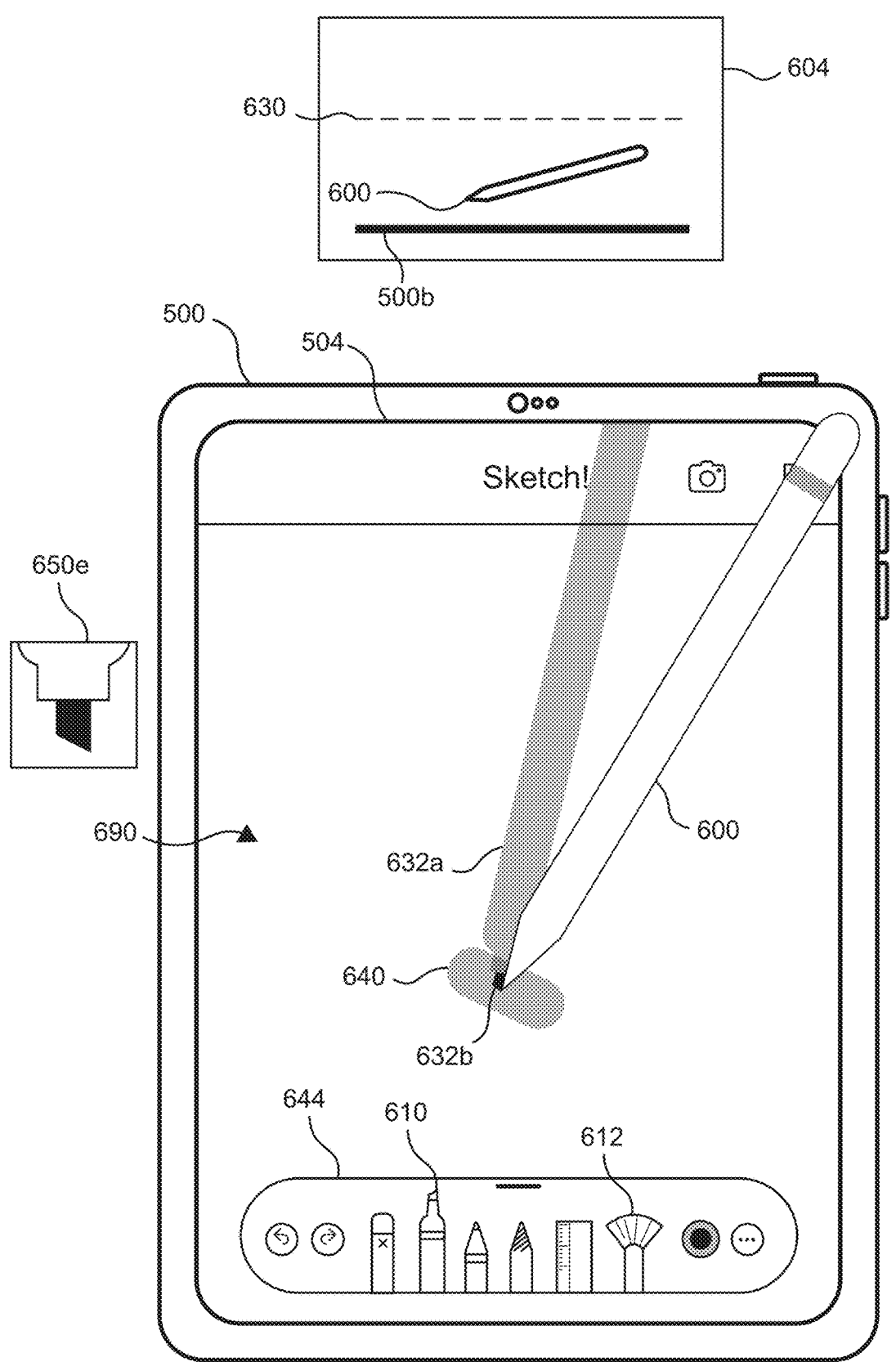

FIGS. 6J and 6K illustrate device 500 changing a visual appearance of preview mark 640 of the highlighter 610 and of the shadow portions 632*a*/632*b* of the highlighter 610 in response to detecting a change in pose of input device 600, in accordance with some embodiments. For example, in FIG. 6J, device 500 detects movement of input device 600 about an axis (e.g., a rotation in a first direction about a tip of the input device 600), as indicated by arrow 656 in FIG. 6J (e.g., the tilt of the input device 600 remains the same while another component of the pose of input device changes while detecting the change in pose of the input device 600), different from the roll axis of input device 600 in FIG. 6J. In response, as shown in FIG. 6K, device 500 updates the user interface 690 to include the preview mark 640 of the highlighter 610 and shadow portions 632*a*/632*b* of the highlighter 610 each of which is visually different in visual appearance on the user interface 690 compared to the preview mark 640 of the highlighter 610 in FIG. 6J. For example, in FIG. 6J, portions 632*a*/632*b* occupy a first location on user interface 690 and preview mark 640 of the highlighter 610 has a first orientation relative to a reference (e.g., relative to palette 644) on user interface, and in FIG. 6K, portions 632*a*/632*b* of the highlighter 610 occupy a second location on user interface 690 (or, optionally are rotated clockwise relative to an point on user interface 690 where portion 632*b* of the highlighter 610 in FIG. 6J is displayed) and preview mark 640 of the highlighter 610 has a second orientation relative to the reference on user interface 690 different from the first orientation relative to the reference. As such, device 500 optionally updates the visual appearance of the portions 632*a*/632*b* and of the preview mark 640 of the currently selected drawing implement in response to detecting a change in pose of the input device 600 relative to the surface of touch screen 504. Further details regarding device 500 changing visual appearances of a simulated shadow and/or preview mark of a selected drawing implement are described with reference to FIG. 7.

Figure 6L:
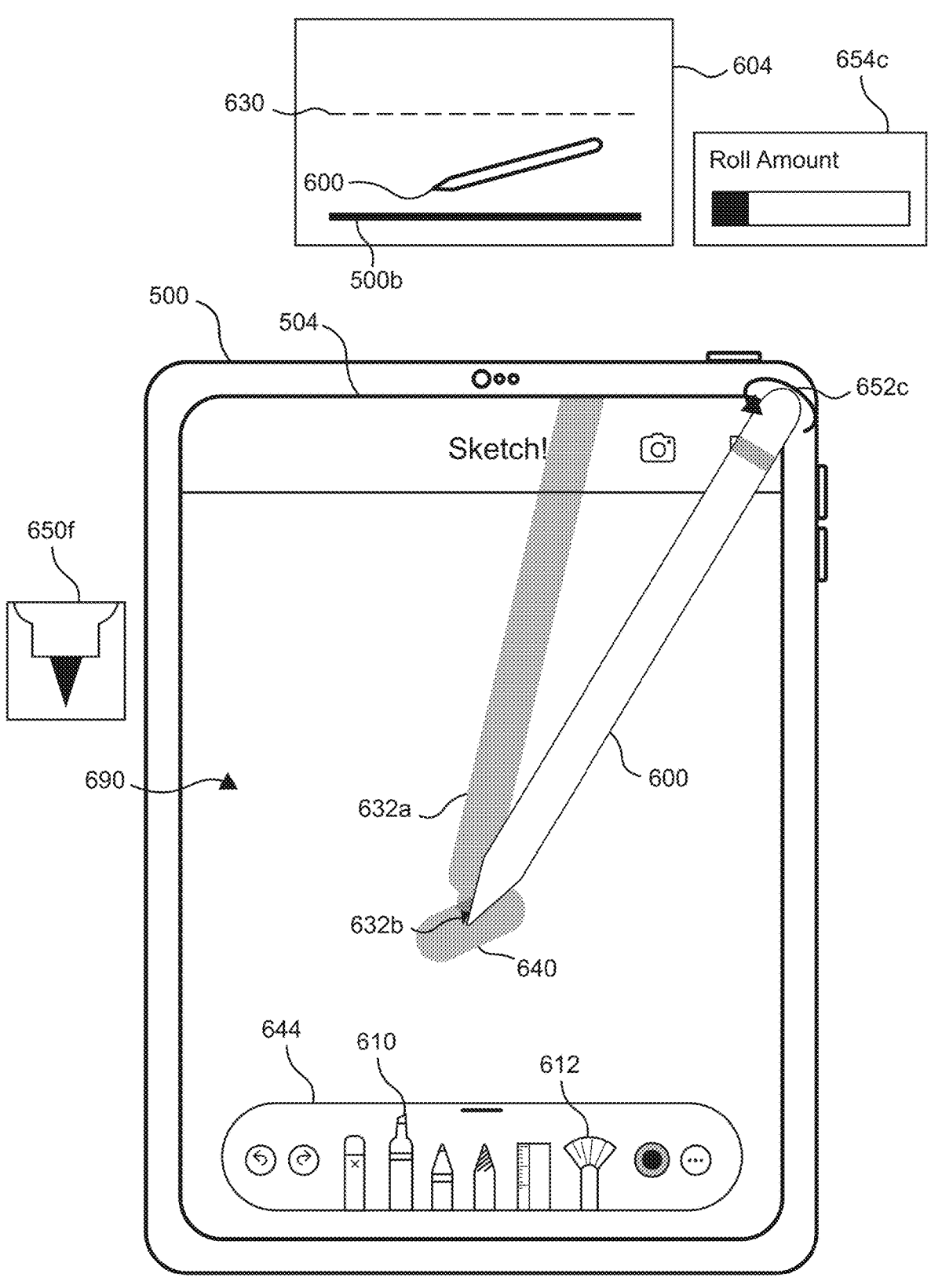

From FIG. 6K to 6L, device 500 detects rotational movement (e.g., as indicated by arrow 652*c*) of the input device 600 about the roll axis (e.g., longitudinal axis) of input device 600 while the input device 600 has the pose relative to the surface of touch screen 504 illustrated in FIG. 6K). For example, while input device has the pose illustrated in FIG. 6K, device 500 detects an amount of roll of input device 600 (e.g., an amount of twist of the input device 600 about its roll axis optionally from a user holding and twisting the input device 600 about the roll axis of the input device 600) indicated in glyph 654*c* (e.g., a 90-degree rotation), thus changing an orientation of input device 600 relative to the surface of touch screen 504. In response, device 500 optionally changes the visual appearance of the portion 632*b* of the highlighter 610 and of the preview mark 640 of the highlighter 610, as shown in FIG. 6L, in accordance with the respective amount of rolling of input device about its roll axis. For example, in FIG. 6K, portion 632*b* of the highlighter 610 has a first visual appearance corresponding to the shadow of the chisel tip of highlighter 610 while the orientation of input device 600 is a first orientation, as shown by glyph 650*e*, and in FIG. 6L, as shown by glyph 650*f*, portion 632*b* of the highlighter 610 has a second visual appearance corresponding to the shadow of the chisel tip of highlighter 610 corresponding to the rotation of the chisel tip of highlighter tool in FIG. 6K by 90 degrees (e.g., from the first orientation in FIG. 6K to the second orientation illustrated in FIG. 6L) while the input device maintains the first pose relative to the surface of touch screen 504.

Likewise, in response to the rotational movement (e.g., as indicated by arrow 652*c* of FIG. 6L), device 500 optionally changes the visual appearance of the preview mark 640 of the highlighter 610, as shown from FIG. 6K to FIG. 6L, in accordance with the respective amount of rolling of input device about its roll axis. For example, in FIG. 6K, preview mark 640 of the highlighter 610 has a first visual appearance including a first orientation relative to a reference in the user interface (e.g., palette 644) while the pose of input device 600 is a first pose relative to the surface of touch screen 504 and while the orientation of input device 600 is a first orientation relative to the surface of touch screen 504, and in FIG. 6L, due to change in orientation of the input device 600 from the first orientation to the second orientation, which is due to the rolling of the input device about the roll axis of the input device 600 by the respective amount (e.g., glyph 654*c* corresponding to a 90-degree rotation) while the input device 600 has the first pose illustrated in FIG. 6K, preview mark 640 of the highlighter 610 has a second visual appearance including a second orientation relative to the reference in the user interface (e.g., palette 644) while the pose of input device 600 is the first pose relative to the surface of touch screen 504. From FIG. 6K to FIG. 6L, device 500 has optionally rotated (e.g., on user interface 690) preview mark 640 of the highlighter 610 by 90-degrees about a center of preview mark 640 of the highlighter 610 in FIG. 6K, corresponding to the amount of roll of the input device 600 about the roll axis of the input device, and optionally in a direction (e.g., clockwise or counterclockwise) corresponding to the direction of the rolling of the input device 600.

As such, rotation of the input device 600 about the roll axis of input device 600 optionally causes a corresponding change in the visual appearances of portion 632*b* of the highlighter 610 and preview mark 640 of the highlighter 610, optionally even when or if the input device 600 changes pose (e.g., FIGS. 6J through 6L).

Figure 6M:
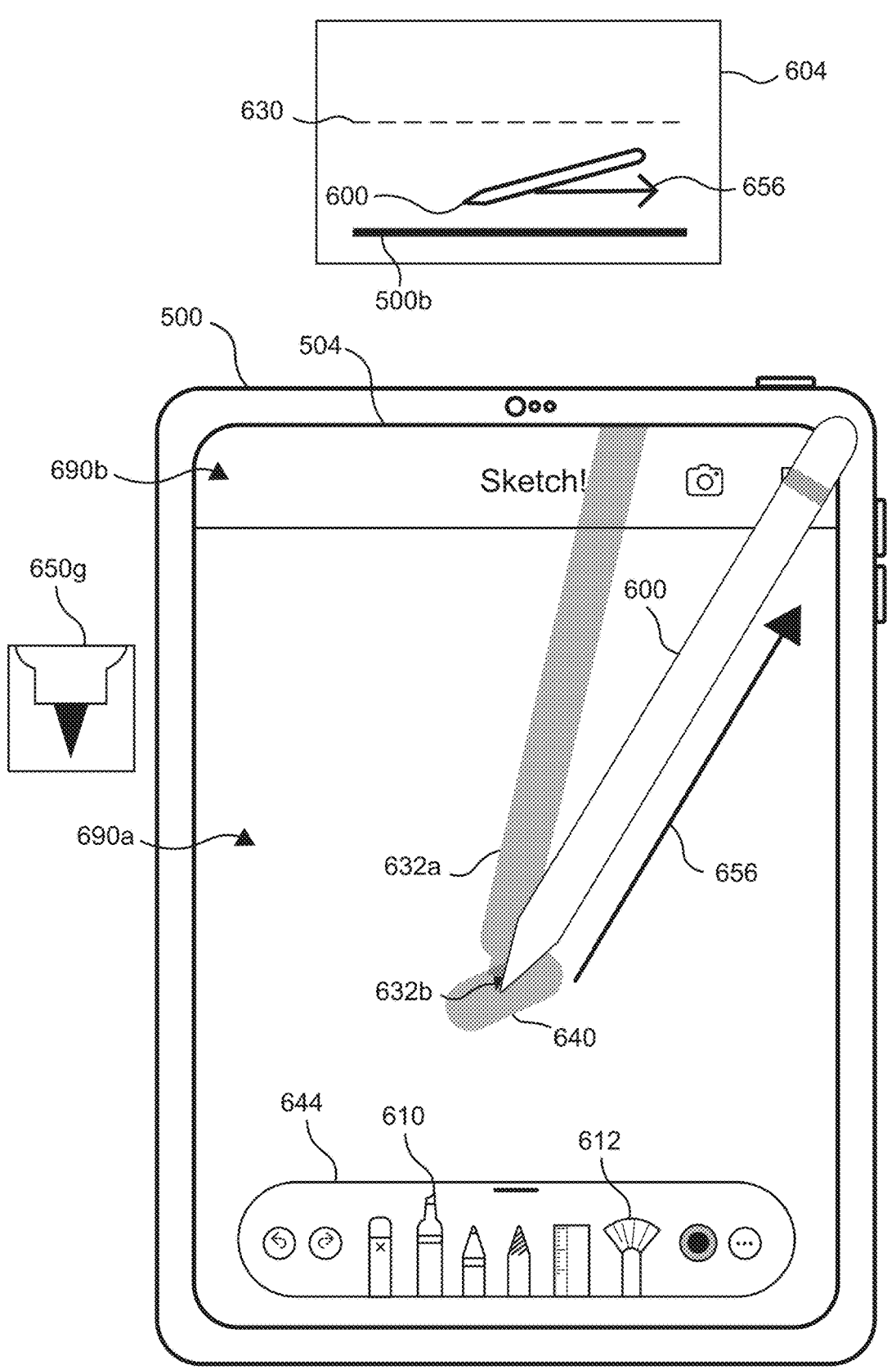
Figure 6N:
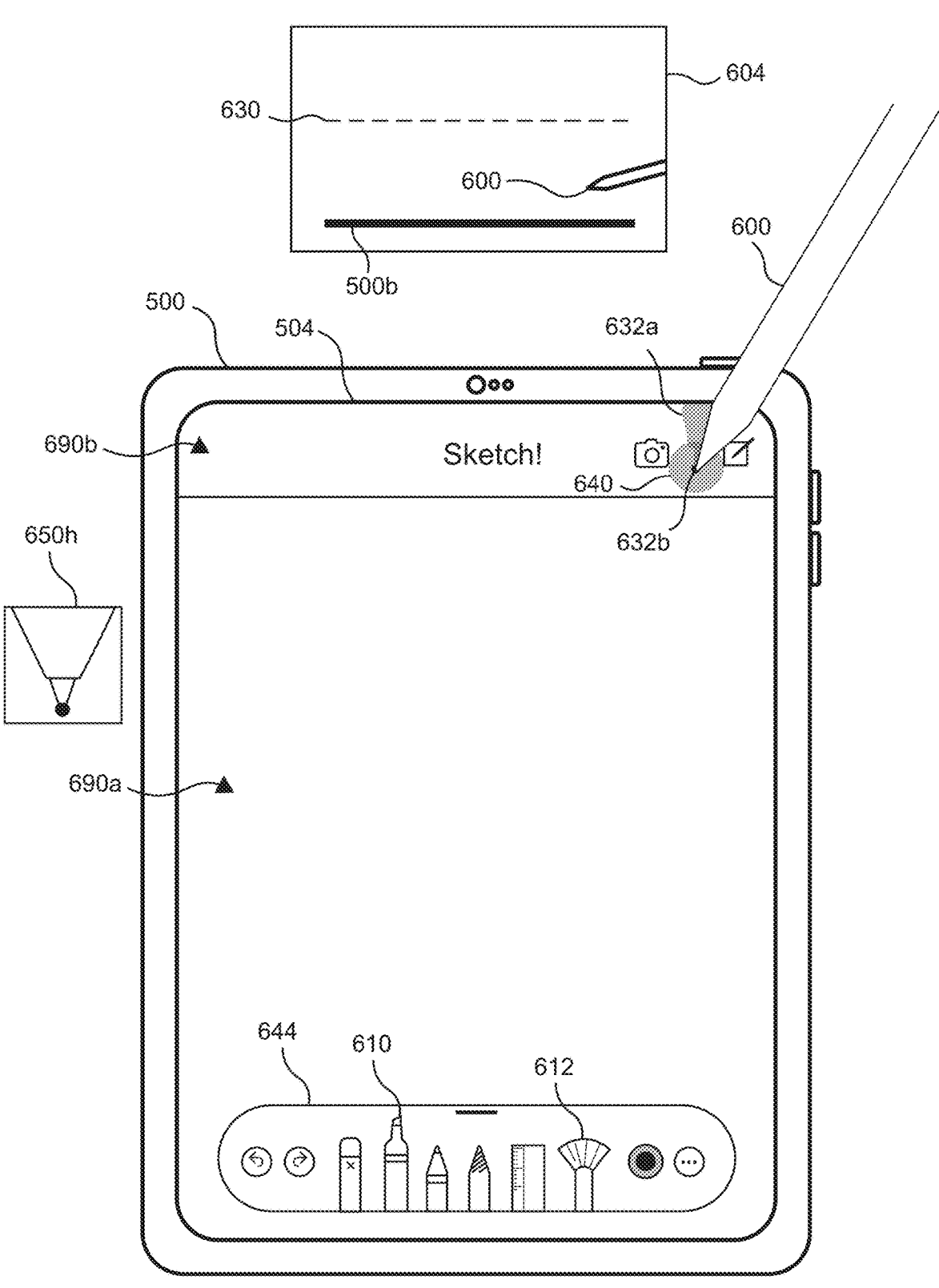

FIGS. 6M and 6N illustrate device 500 changing the drawing implement for the input device in response to detecting movement from a first region of the user interface 690 corresponding to a drawing area to a second region of the user interface 690 corresponding to a non-drawing area while the drawing implement for the input device is not a default drawing implement, in accordance with some embodiments.

In some embodiments, different areas of user interface 690 permit different preview marks and simulated shadows. For example, a first area of user interface 690 is optionally a non-drawing area, and when a preview mark of a drawing implement and/or portion 632*b* of a drawing implement is to be displayed in the non-drawing area, device 500 optionally displays a preview mark and/or simulated shadow of a default drawing implement (that, optionally is displayed in palette 644), such as a ball pen, independent of whether the ball pen is the currently selected drawing implement for the input device 600. For example, in FIG. 6O, device 500 detects movement of input device 600 (e.g., translational movement of input device 600, such as movement of the tip of the input device 600) from hovering over/above or in contact with region 690*a* (e.g., a drawing area) of user interface 960 to hovering over/above or in contact with region 690*b* (e.g., a non-drawing area) of user interface 960 while the selected drawing implement for the input device is the highlighter 610. In response, as shown in FIG. 6N, device 500 updates the user interface to include a preview mark 640 of a default drawing implement (e.g., a ball pen) and portions 632*a*/632*b* of the default drawing implement (e.g., see glyph 650*h*) based on the pose and orientation of the input device 600 instead of the preview mark 640 of the highlighter 610 and instead of the portions 632*a*/632*b* of the highlighter 610 even though the highlighter 610 is selected as the drawing implement as indicated by the palette 644 in FIG. 6N. In some embodiments, when the preview mark 640 hovers over/above a selectable user interface element in the region 690*b*, device updates the visual appearance of the preview mark 640 to conform or morph to the user interface element (and optionally changes other visual characteristics such as color, transparency, or hue, of the preview mark), such as in the change in the visual appearance in the preview mark 640 of the default drawing implement (e.g., ball pen) shown from FIG. 6N to FIG. 6O. In some embodiments, when a preview mark of a drawing implement and/or portion 632*b* of the drawing implement is to be displayed in the drawing area (e.g., in response to movement (e.g., translational movement of input device 600, such as movement of the tip of the input device 600) from hovering over/above or in contact with region 690*b* (e.g., the non-drawing area) of user interface 690 to hovering over/above or in contact with region 690*a* (e.g., the drawing area) of user interface 690, and the default drawing implement associated with the region 690*b* is not the currently selected drawing implement for the input device, device 500 optionally updates the preview mark of the drawing implement and/or portions 632*a*/632*b* to reflect the currently selected drawing implement rather than the default drawing implement associated with the region 690*b*.

Figure 6P:
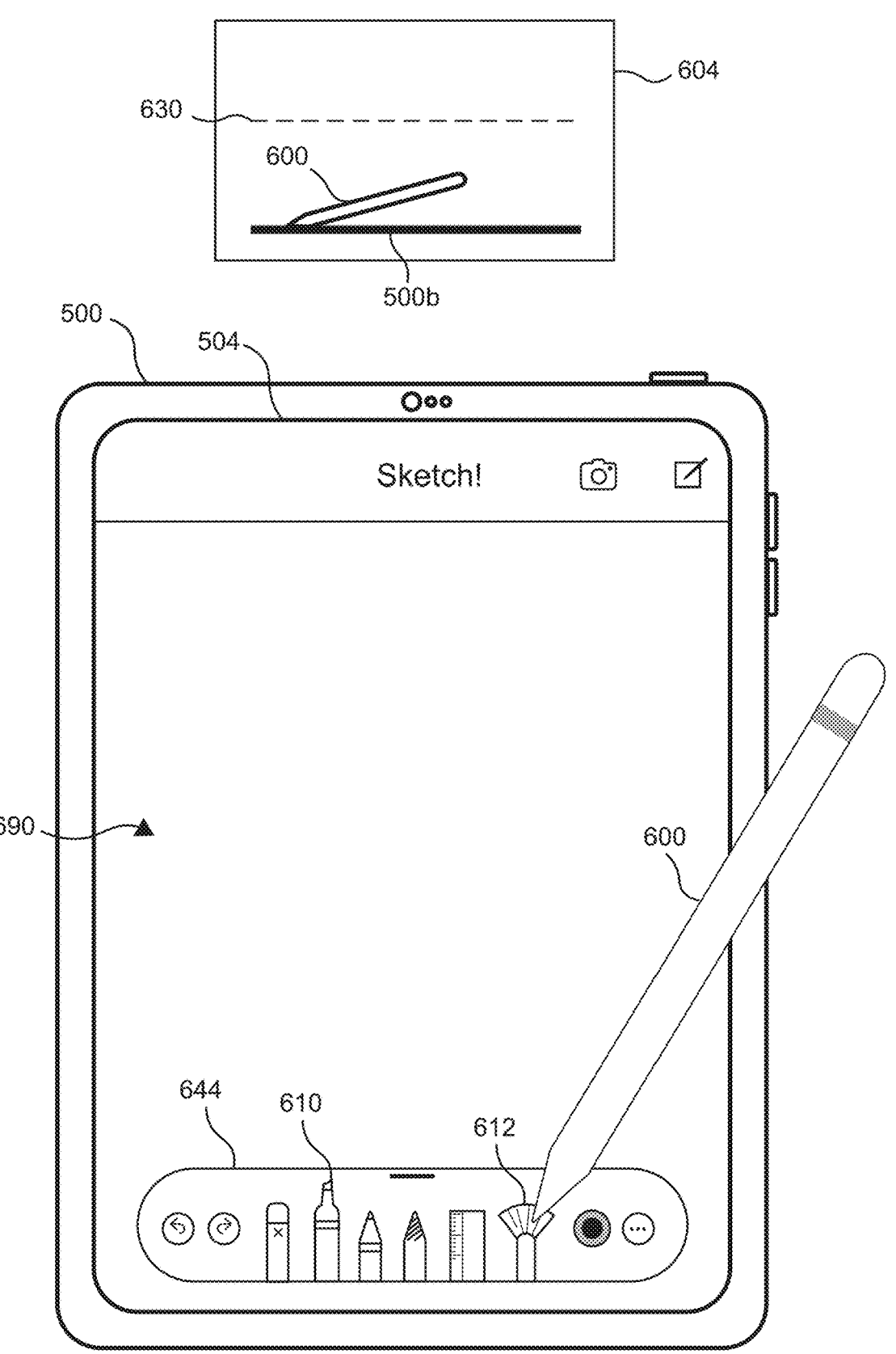

FIG. 6P illustrates device 500 associating the input device 600 with a different drawing implement in response to user input selecting the different drawing implement, in accordance with some embodiments.

Figure 6Q:
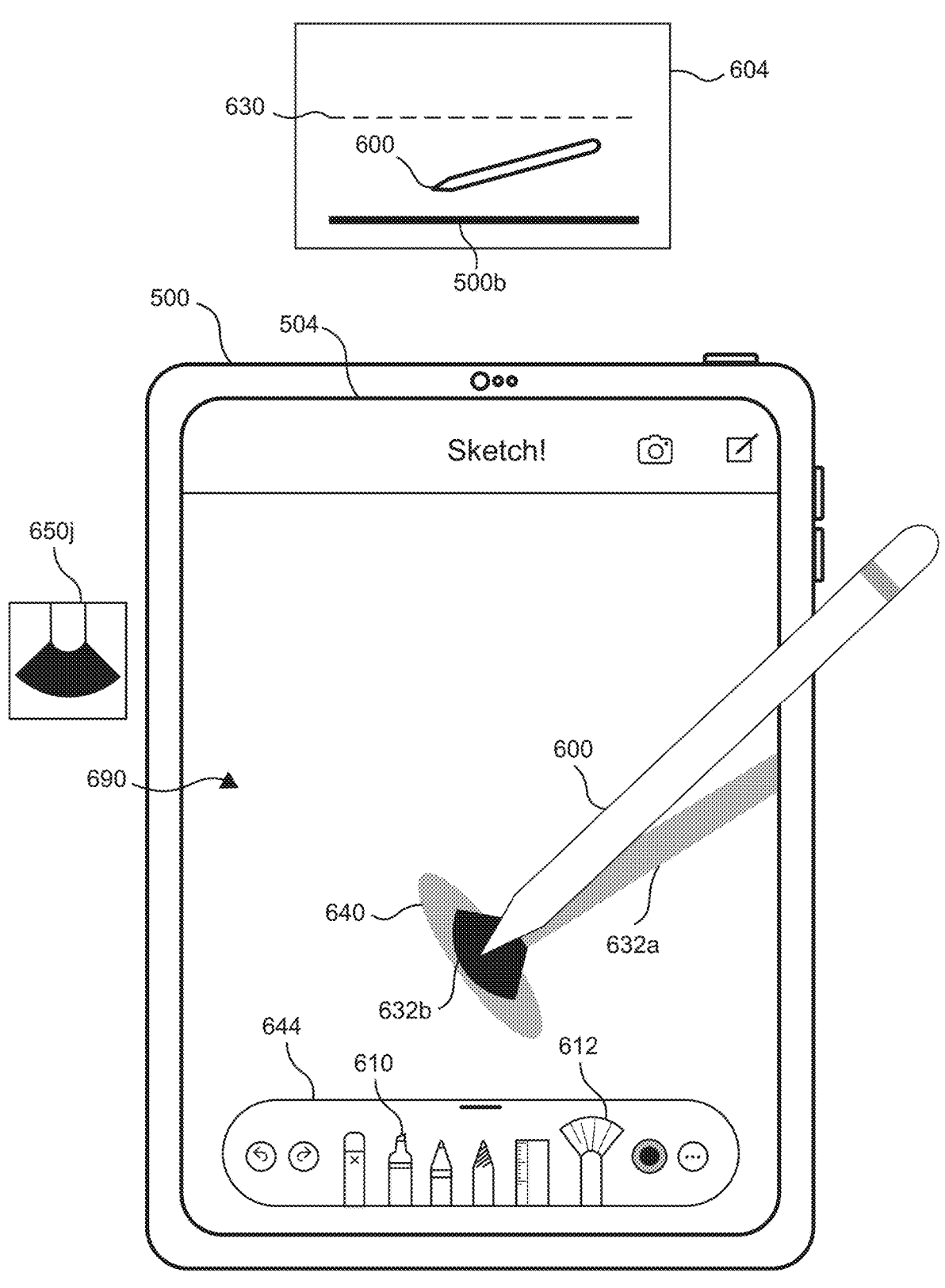

In FIG. 6P, while the currently selected drawing implement for input device 600 is highlighter 610, device 500 detects input corresponding to selection of a different drawing implement. For example, device 500 optionally detects that tip of input device 600 is in contact with fan brush 612 in palette 644 of user interface 690 which corresponds to selection of a different drawing implement, which in FIG. 6P, is the fan brush 612. In response, device 500 displays a preview mark 640 corresponding to the fan brush 612 and portions 632*a*/632*b* corresponding to the fan brush 612, such as shown in FIG. 6Q. In some embodiments, when the tip of the input device 600 is hovering over/above or in contact with palette 644, device 500 forgoes display of a preview mark 640 and/or shadow portion 632*a*/632*b* of drawing implement on the user interface or in the palette 644. In some embodiments, when the tip of the input device 600 is hovering over/above or in contact with palette 644, device 500 maintains display of a preview mark 640 and/or shadow portion 632*a*/632*b* of drawing implement on the user interface or in the palette 644.

FIG. 6Q illustrates device 500 displaying a preview mark 640 corresponding to the fan brush 612 and portions 632*a*/632*b* corresponding to the fan brush 612 based on a pose and orientation of input device 600 relative to the surface of touch screen 504, in accordance with some embodiments. The visual appearance (e.g., shape) of preview mark 640 of fan brush 612 in FIG. 6Q (e.g., in glyph 650*j* and user interface 690) is different from the visual appearance (e.g., shape) of preview mark 640 of highlighter 610 in FIG. 6G optionally because respective drawing implements associated with the input device optionally have respective preview marks and respective simulated shadows that corresponds to differences in types of marking inputs and shapes of the respective drawing implements to which the respective preview marks and respective simulated shadows correspond. For example, highlighter 610 has a chisel tip and the fan brush 612 has different type of tip than a chisel tip. In FIG. 6Q, the latitudinal width of portions 632*a*/632*b* optionally corresponds to a maximum latitudinal width of portion 632*b* based on the pose and orientation of the input device 600 relative to the surface (e.g., the device 500 corresponds the pose and orientation of the input device 600 relative to the surface in FIG. 6Q to a pose and orientation of fan brush 612 in which the latitudinal widths of portions 632*a*/632*b* optionally corresponds to a maximum latitudinal size of portions 632*a*/632*b* when the orientation of the input device 600 is the illustrated orientation in FIG. 6Q while the pose of input device 600 is the illustrated pose in FIG. 6Q).

Figure 6R:
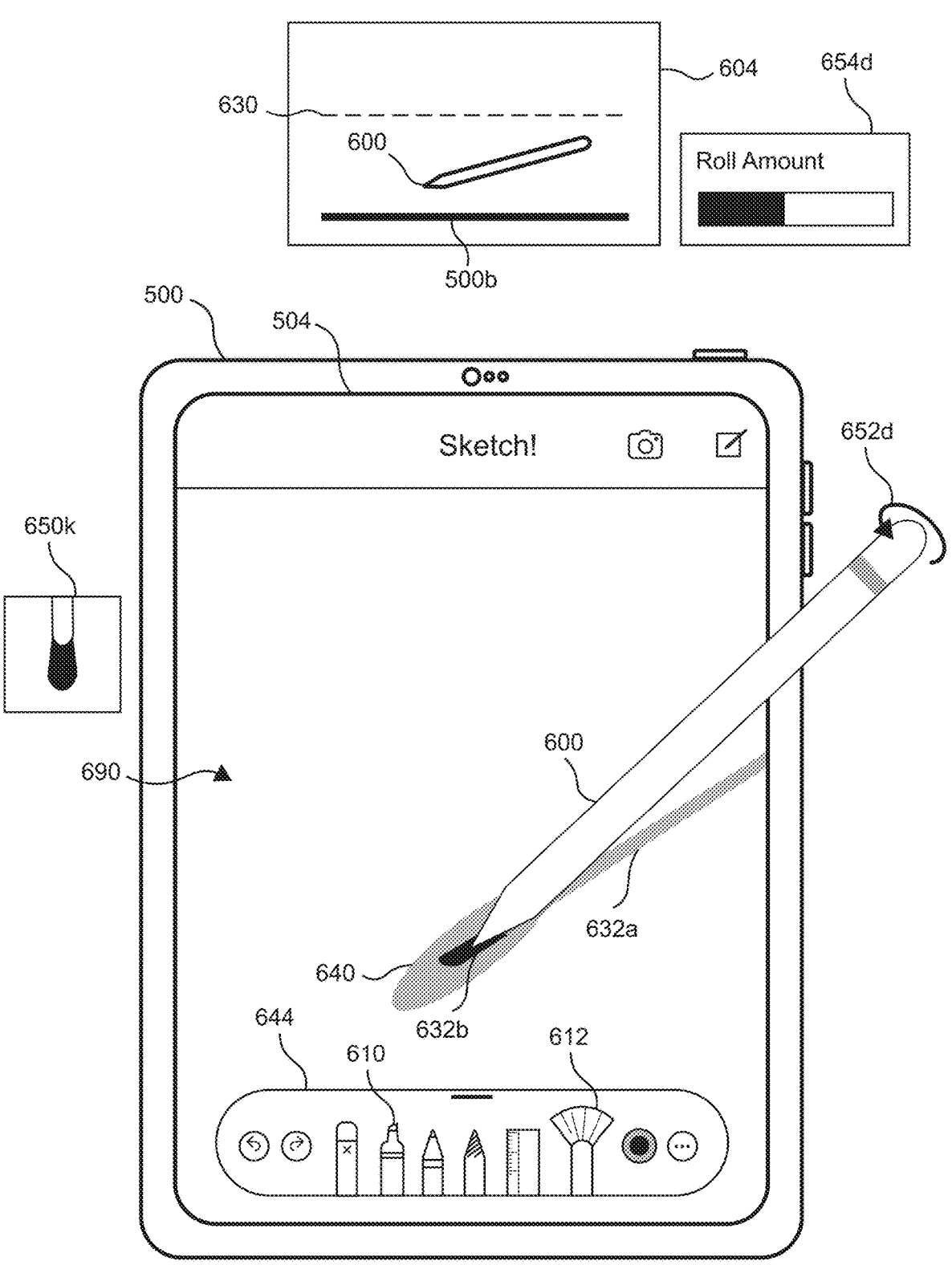
Figure 6S:
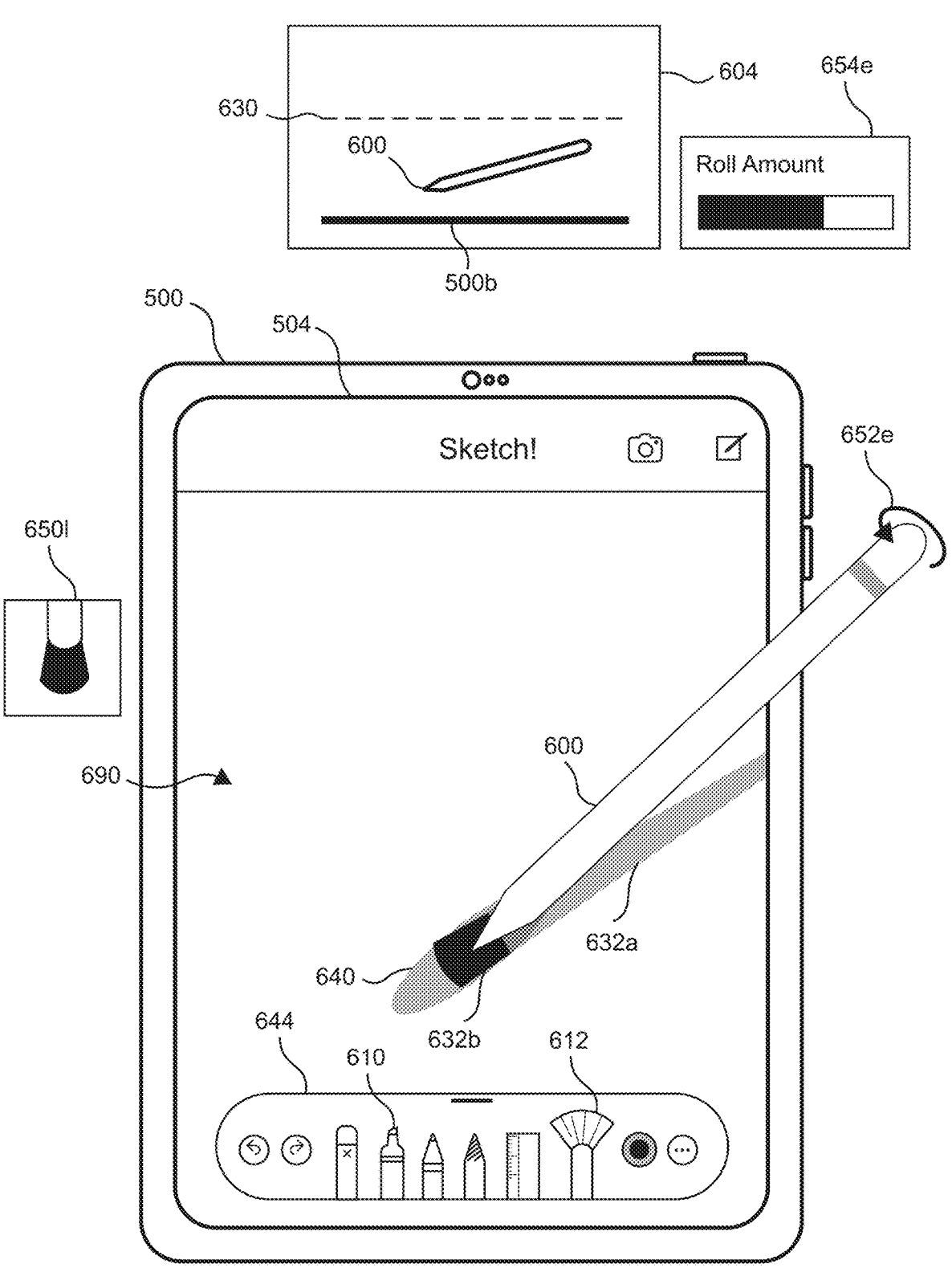

FIGS. 6Q through 6S illustrate device 500 changing visual appearances of shadow portion 632*a*/632*b* and preview mark 640 of fan brush 612 in response to respective changes in orientations of input device 600 about the roll axis of input device 600 according to some embodiments. Glyphs 650*j* through 650*l* of FIGS. 6Q through 6S provide respective magnified views of how shadow portion 632*b* of fan brush 612 is displayed (e.g., the shape of shadow portion 632*b* of the fan brush 612 and the shape of the edge of the barrel of the fan brush 612 closest to the tip of fan brush 612) on the user interface based on the orientation of input device 600 in the respective figure. It should be noted that, in FIGS. 6Q through 6S, the currently selected drawing implement for the input device is fan brush 612, and, unlike highlighter 610 of FIGS. 6G through 6I, the corresponding barrel of fan brush 612 does not radial symmetry (e.g., about the roll axis of fan brush 612), in addition to the tip of fan brush 612 not having radial symmetry. As such, changes in visual appearances of portions 632*a*/632*b* of fan brush 612 in response to rolling of input device appear as if the tip and barrel of fan brush 612 is symmetrical across a first plane parallel to and intersecting the longitudinal axis of fan brush 612 (which is optionally the same as the roll axis of the input device 600) and symmetrical across a second plane, different from the first plane, that is likewise parallel to and intersecting the longitudinal axis of fan brush 612, where the first plane and the second plane are perpendicular to each other. As such, since the inputs described with reference to FIGS. 6Q through 6S are respective rotations about the roll axis of input device 600 while the pose of the input device 600 is constant, and since the corresponding barrel of the fan brush 612 and the corresponding tip of the fan brush 612 do not radial symmetry, the device 500 optionally changes the visual appearance of portions 632a/632b throughout FIGS. 6Q through 6S.

From FIG. 6Q to 6R, device 500 detects rotational movement (e.g., as indicated by arrow 652d of FIG. 6R) of the input device 600 about the roll axis (e.g., longitudinal axis) of input device 600 while the input device 600 has the pose illustrated in FIG. 6Q. For example, while input device 600 has the pose illustrated in FIG. 6Q, device 500 detects an amount of roll of input device 600 (e.g., an amount of twist of the input device 600 about its roll axis optionally from a user holding and twisting the input device 600 about the roll axis of the input device 600) indicated in glyph 654d of FIG. 6R (e.g., a 90-degree rotation) starting from the orientation of input device 600 in FIG. 6Q. In response, device 500 changes the visual appearance of the portions 632a/632b of the fan brush 612 and of the preview mark 640 of the fan brush 612, as shown in FIG. 6R, in accordance with the respective amount of rolling of input device 600 about its roll axis. For example, in FIG. 6Q, portions 632a/632b of the fan brush 612 have a first visual appearance while the orientation of input device 600 is a first orientation, as shown in glyph 650j, and in FIG. 6R, as shown in glyph 650k, portions 632a/632b of the fan brush 612 have a second visual appearance corresponding to the rotational movement input of the input device 600 from the first orientation in FIG. 6Q to the second orientation illustrated in FIG. 6R) while the input device maintains the same pose relative to the surface of touch screen 504.

Likewise, in response to the rotational movement (e.g., as indicated by arrow 652d), device 500 optionally changes the visual appearance of the preview mark 640 of the fan brush 612, as shown from FIG. 6Q to 6R, in accordance with the respective amount of rolling of input device about its roll axis. For example, in FIG. 6Q, preview mark 640 of the fan brush 612 has a first visual appearance including a first orientation relative to a reference in the user interface (e.g., palette 644) while the pose of input device 600 is a first pose relative to the surface of touch screen 504 and while the orientation of input device 600 is a first orientation relative to the surface of touch screen 504, and in FIG. 6R, due to change in orientation of the input device 600 from the first orientation to the second orientation, which is due to the rolling of the input device about the roll axis of the input device 600 by the respective amount while the input device 600 has the first pose illustrated in FIG. 6Q, preview mark 640 of the fan brush 612 has a second visual appearance including a second orientation relative to the reference in the user interface (e.g., palette 644) while the pose of input device 600 is the first pose relative to the surface of touch screen 504. From FIG. 6Q to 6R, device 500 has optionally rotated (e.g., on user interface 690) preview mark 640 of the highlighter 610 by 90-degrees about a center of preview mark 640 of the fan brush 612 in FIG. 6Q, corresponding to the amount of roll of the input device about the roll axis of the input device, and optionally in a direction (e.g., clockwise or counterclockwise) corresponding to the direction of the rolling of the input device 600.

Alternatively, from FIG. 6Q to 6S, device 500 detects rotational movement (e.g., as indicated by arrow 652e of FIG. 6S) of the input device 600 about the roll axis (e.g., longitudinal axis) of input device 600 while the input device

600 has the pose illustrated in FIG. 6Q. For example, while input device 600 has the pose illustrated in FIG. 6Q, device 500 detects an amount of roll of input device 600 (e.g., an amount of twist of the input device 600 about its roll axis) indicated in glyph 654e (e.g., a degree of rotation in between 0-90, 90-180, 180-240, or 240-360 degrees, excluding endpoints)). In response, device 500 changes the visual appearance of the portions 632a/632b of the fan brush 612 and of the preview mark 640 of the fan brush 612, as shown in FIG. 6S, in accordance with the respective amount of rolling of input device 600 about its roll axis. For example, in FIG. 6Q, portions 632a/632b has a first visual appearance corresponding to a simulated shadow of a barrel and tip of fan brush 612 while the orientation of input device 600 is a first orientation and while the pose of input device 600 is the same as illustrated in FIG. 6Q, and in FIG. 6R, portions 632a/632b have a second visual appearance (e.g., different from the visual appearance of portions 632a/632b in FIG. 6R) while the orientation of input device 600 is a second orientation and while the pose of input device 600 is the same as illustrated in FIG. 6Q.

Figure 6T:
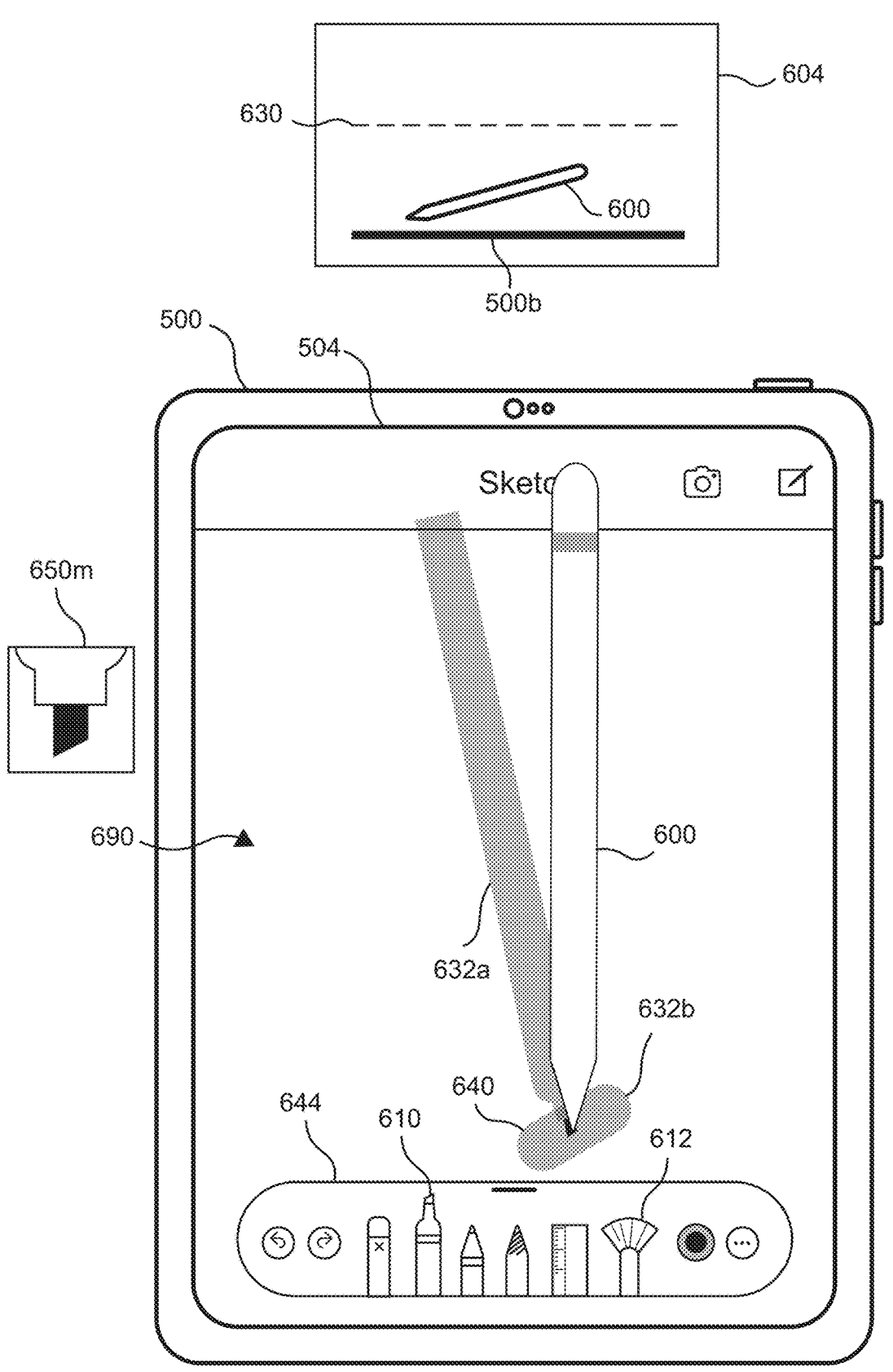
Figure 6U:
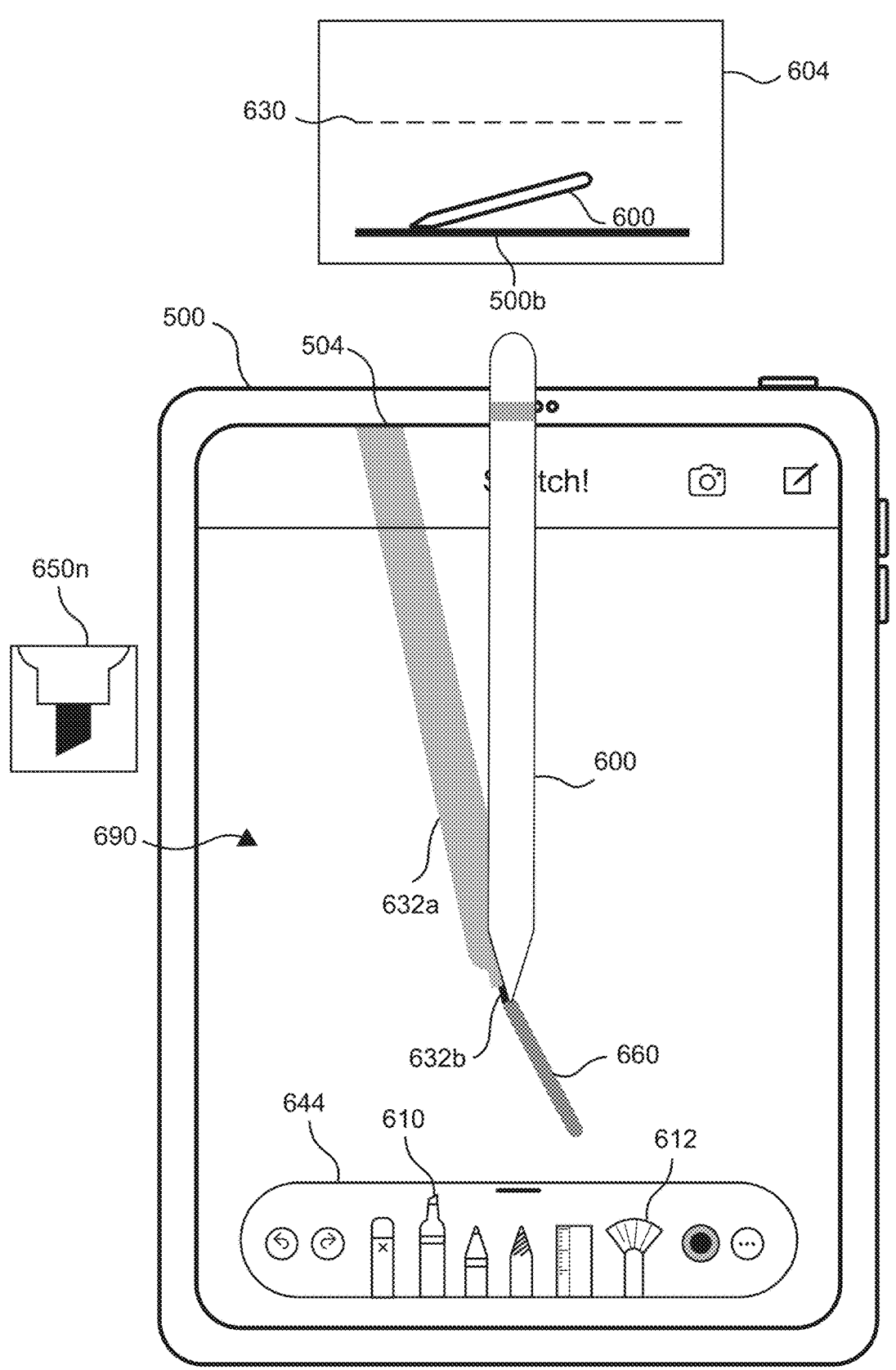
Figure 6V:
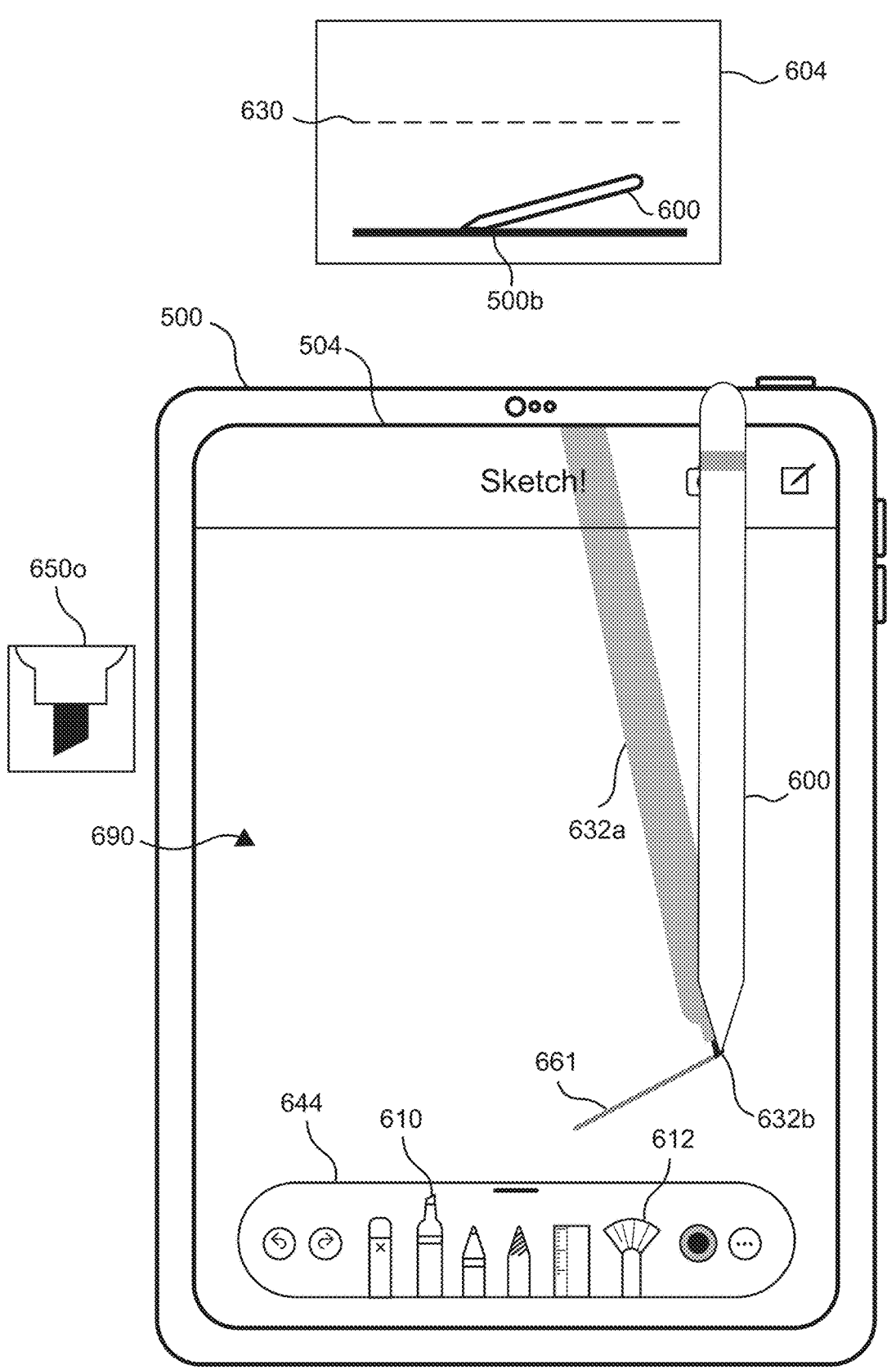

FIGS. 6T through 6V illustrate examples of device 500 displaying different marks of a drawing implement (e.g., highlighter 610) in response to different marking inputs including different movement directions while the orientation of the input device is the same as in FIG. 6T, in accordance with some embodiments.

It should be noted that the ratio of the longitudinal length of illustrated preview mark 640 of highlighter 610 to the width of preview mark 640 of highlighter 610 is greater than one. Thus, a marking input that includes movement in a direction that is more perpendicular or normal to the longitudinal length of preview mark 640 of highlighter 610 optionally results in a wider mark of the highlighter compared to a mark of the highlighter resulting from a marking input that includes movement in a direction that is more parallel or less normal to the longitudinal length of preview mark 640 of highlighter 610.

In FIG. 6T, device 500 displays preview mark 640 of the highlighter 610 having a first visual appearance (e.g., a first orientation relative to a reference in the user interface) based on the pose (e.g., the input device 600 being within a threshold distance for displaying a preview mark of the drawing implement) and orientation of input device 600 relative to the surface of touch screen 504. From FIG. 6T to 6S, while the input device 600 has the first orientation relative to the surface of touch screen 504, device 500 detects a marking input (e.g., including movement including a start of the marking input at the center of the preview mark 640 of the highlighter 610 in FIG. 6T) in a first direction relative to the orientation of the preview mark 640 of the highlighter 610 in FIG. 6T, and in response, displays a mark 660 of the highlighter 610 that has visual characteristics that are based on the direction of the marking input relative to the orientation of the preview mark 640 in FIG. 6T when or as the marking input is detected (e.g., the orientation of highlighter 610 optionally has not changed in FIGS. 6T through 6V). In FIG. 6U, the mark 660 of the highlighter 610 has a first width (e.g., a maximum width) optionally because the direction of the marking input is perpendicular to the longitudinal length of the preview mark 640 in FIG. 6T, thus indicating the orientation of the highlighter 610 and that a marking input provided in that direction would have the first width. In FIG. 6V, the mark 661 of the highlighter 610 has a second width (e.g., a minimum width) optionally because the direction of the marking input is parallel to the longitudinal length of the preview mark 640 in FIG. 6T, thus indicating the orientation of the highlighter 610 and that a marking input provided in that direction would have the second width, provided the orientation of the input device 600 relative to the surface of touch screen 504 stays the same.

In some embodiments, during generation of a mark (and/ or detection of a marking input) on (or for) the user interface 690, device 500 optionally does not display a preview mark. Alternatively, in some embodiments, during generation of a mark (and/or detection of a marking input) on (or for) the user interface 690, device 500 optionally does display a preview mark.

Figure 6W:
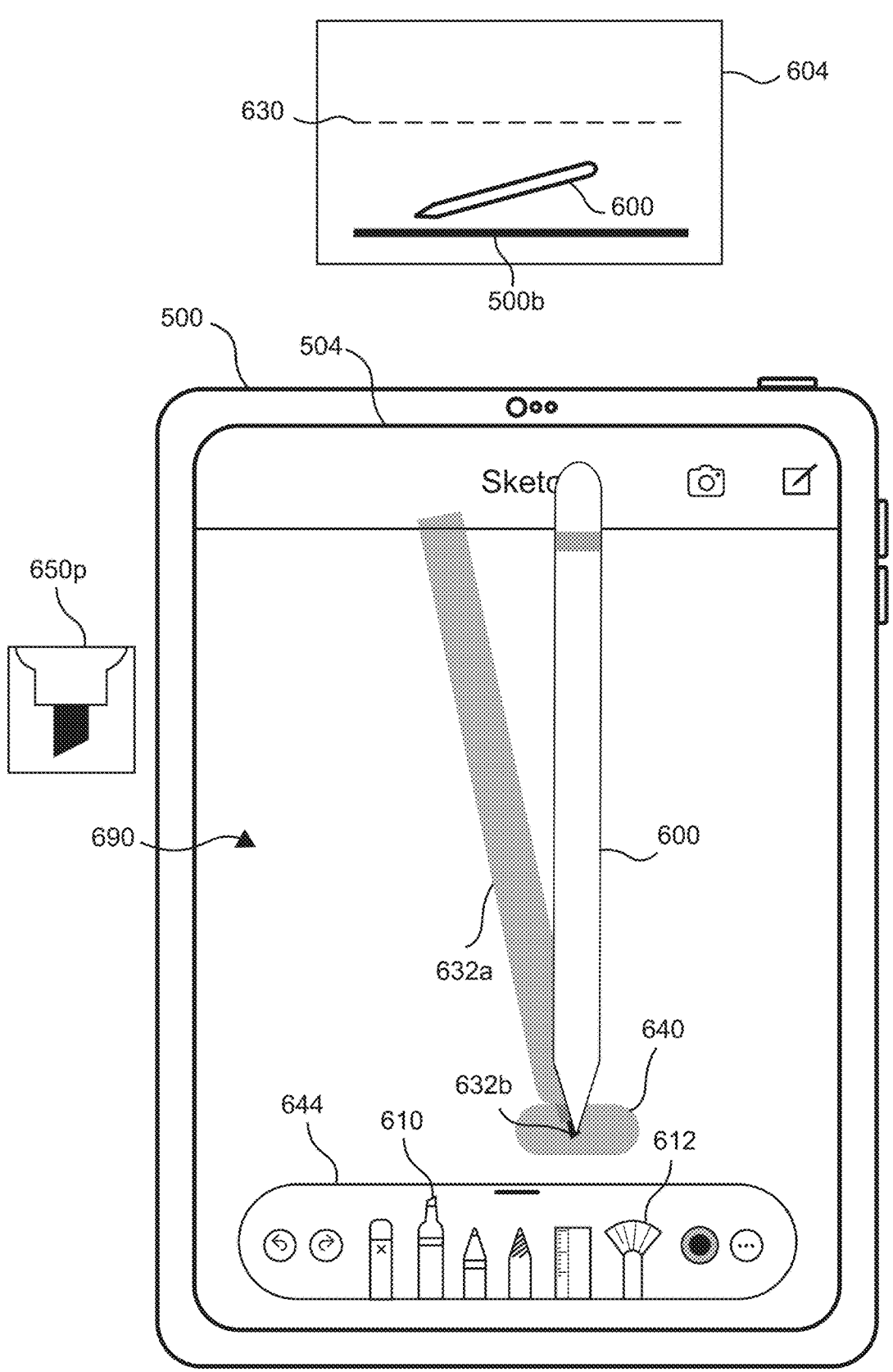

FIGS. 6W through 6BB illustrate different flows of device 500 displaying different marks of a drawing implement (e.g., highlighter 610) in response to different marking inputs including the same movement direction detected when the orientation of the input device is different, in accordance with some embodiments.

Figure 6X:
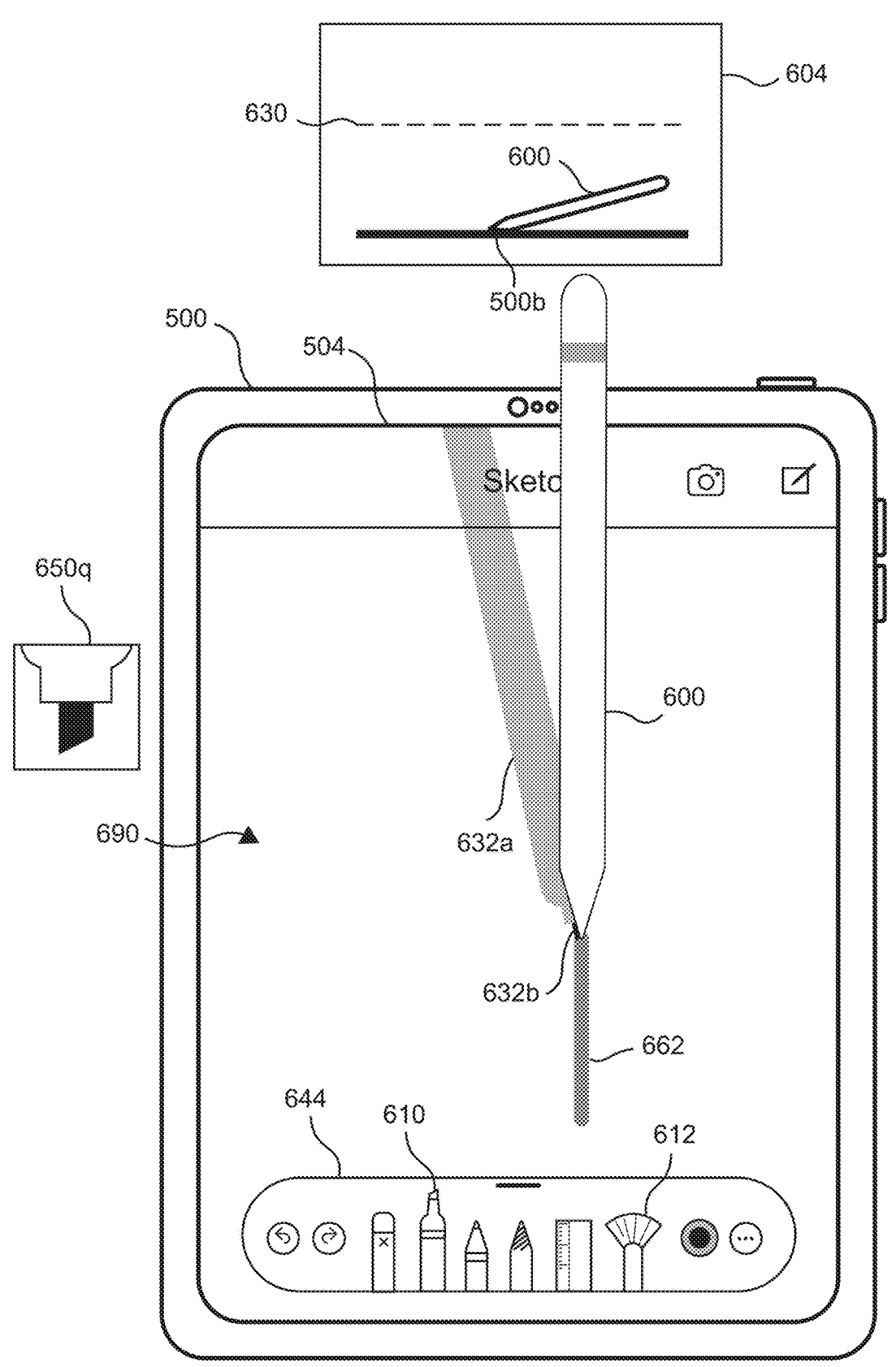
Figure 6Y:
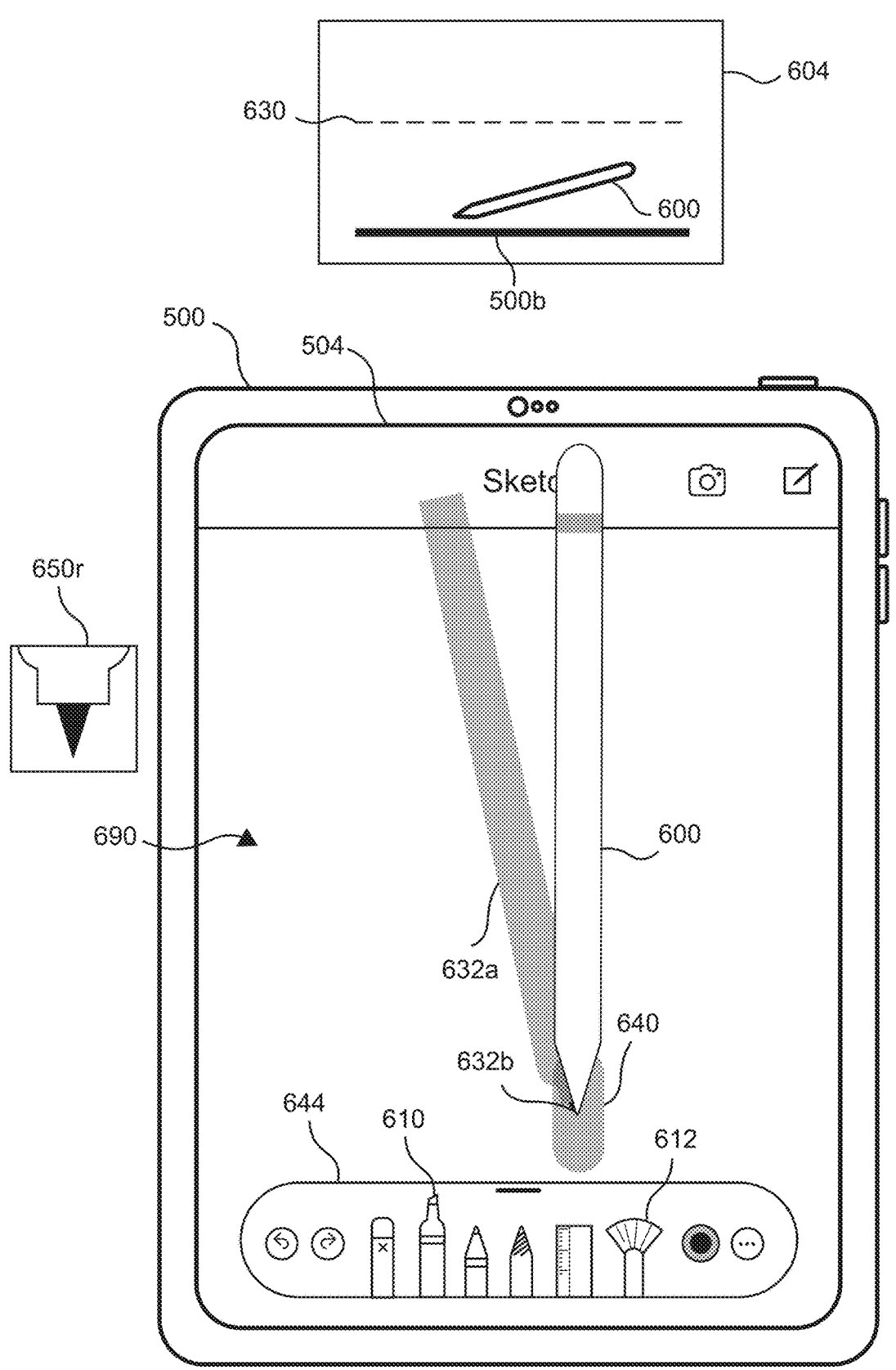

For example, in FIG. 6W, preview mark 640 of highlighter 610 has a first orientation relative to a reference (e.g., palette 644) in the user interface 690; in FIG. 6Y, preview mark 640 of highlighter 610 has a second orientation relative to the reference in the user interface, different form the first orientation; in FIG. 6AA, preview mark 640 of highlighter 610 has a third orientation relative to the reference in the user interface, different from the first and second orientations of FIGS. 6W and 6Y respectively.

Figure 6Z:
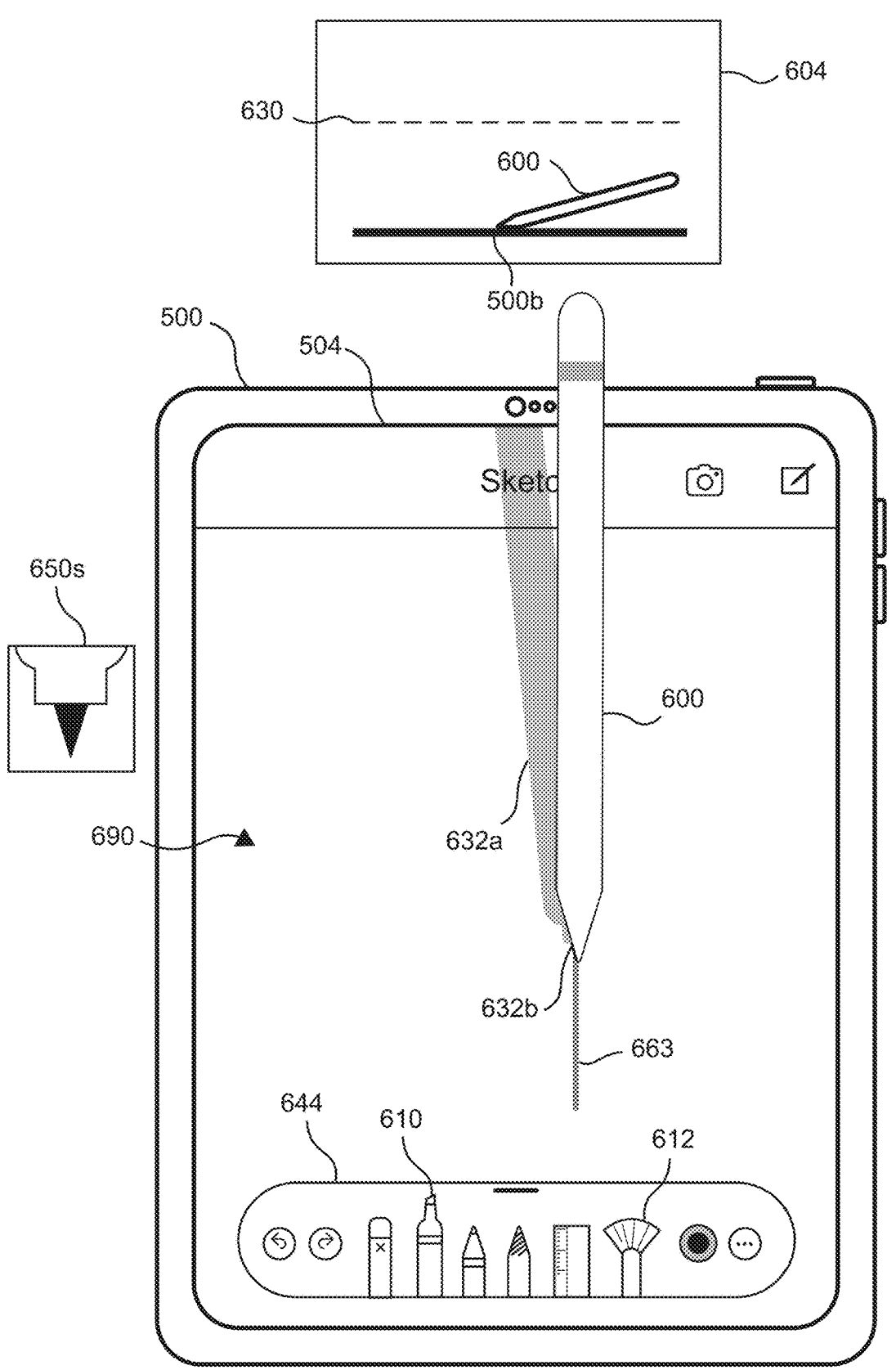
Figure 6A:
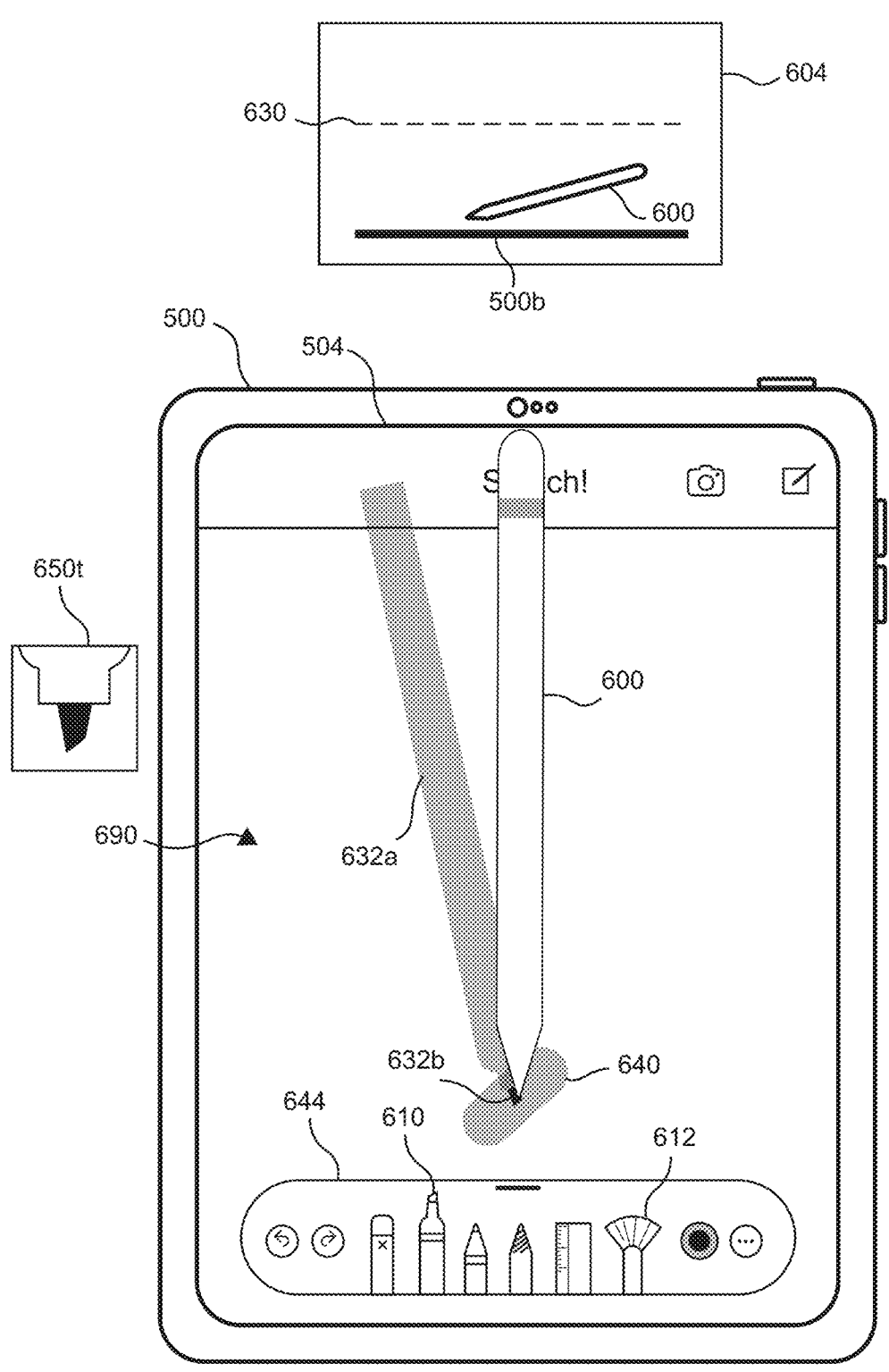
Figure 6B:
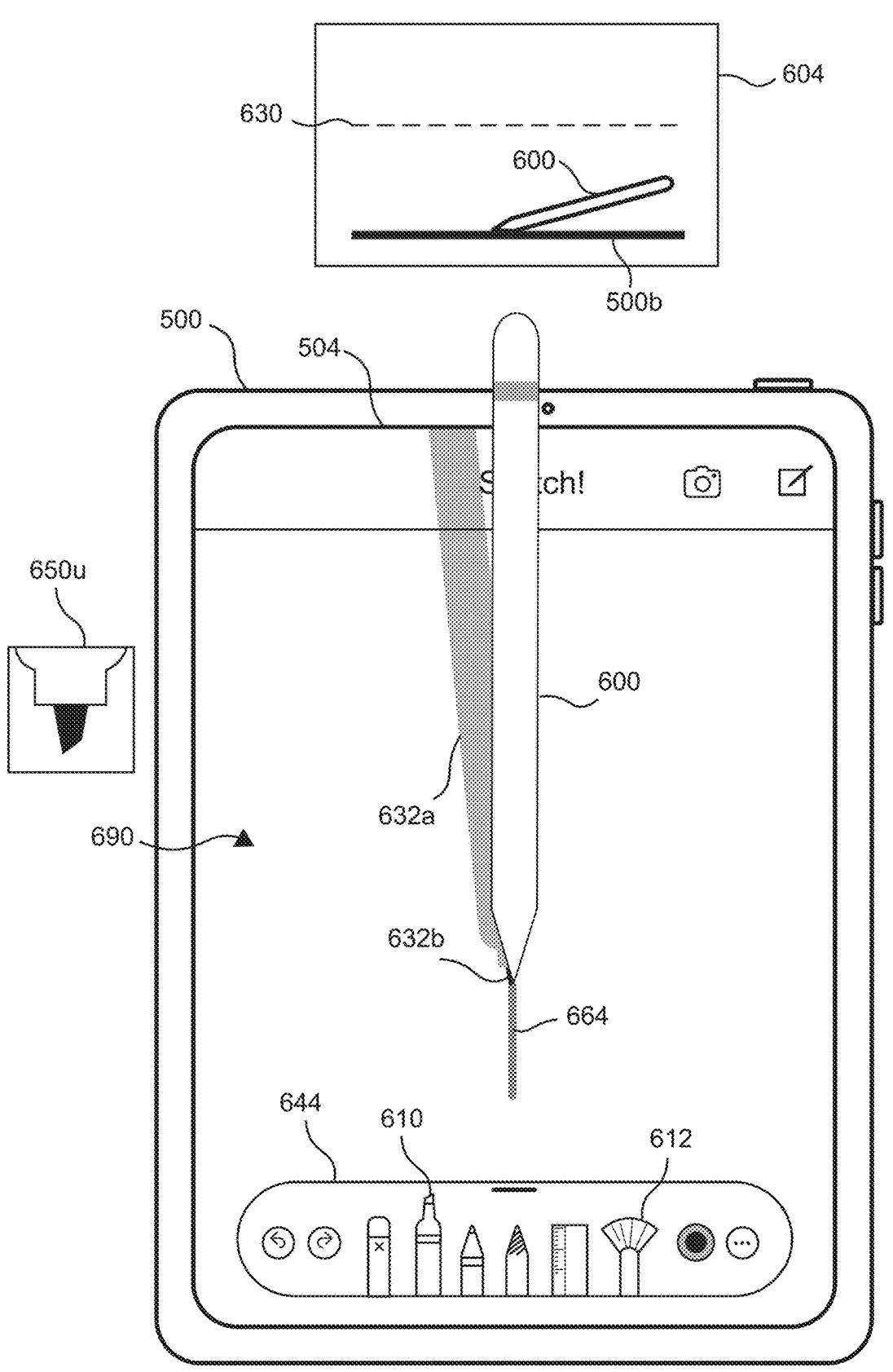
Figure 6C:
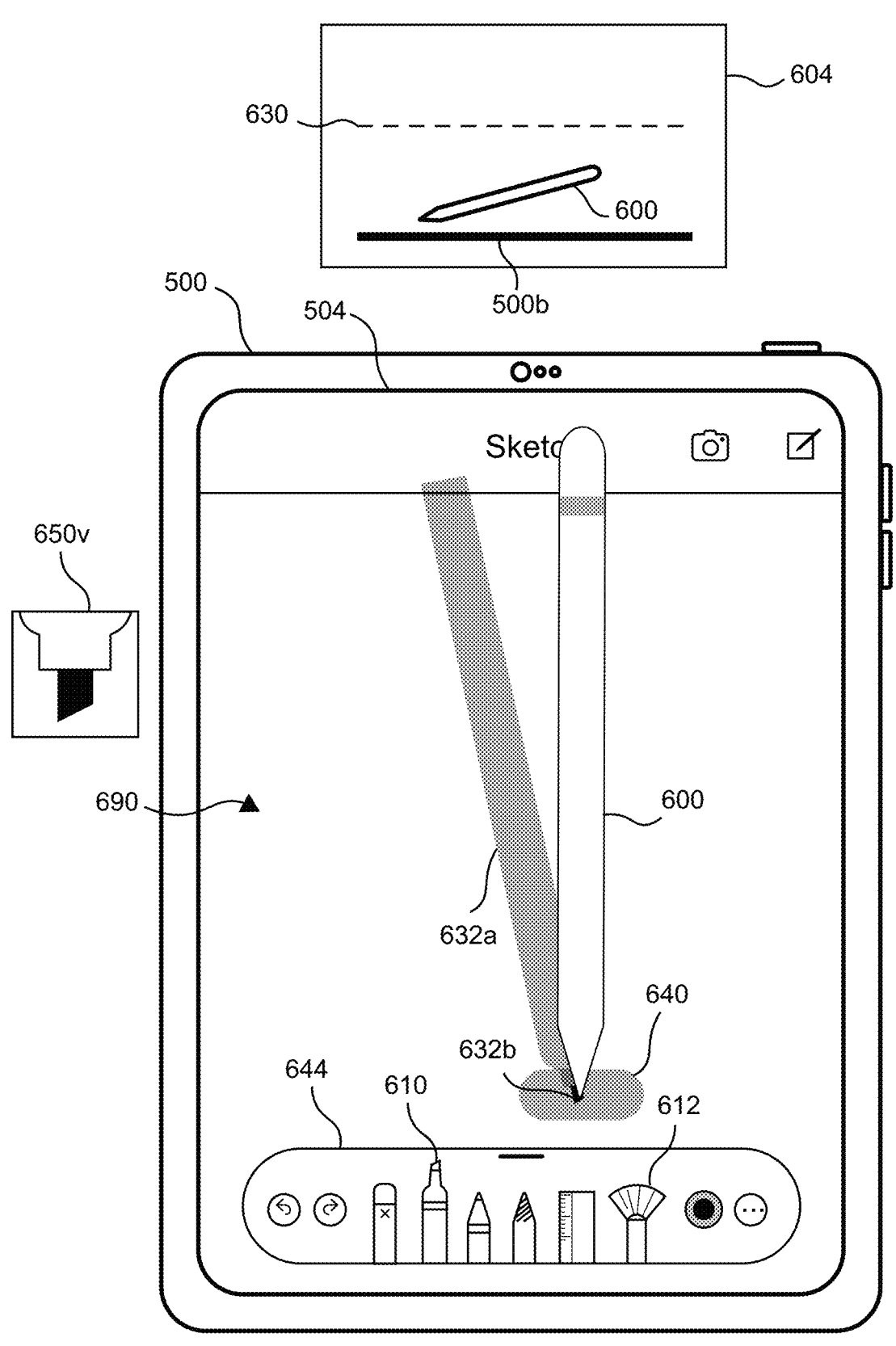
Figure 6D:
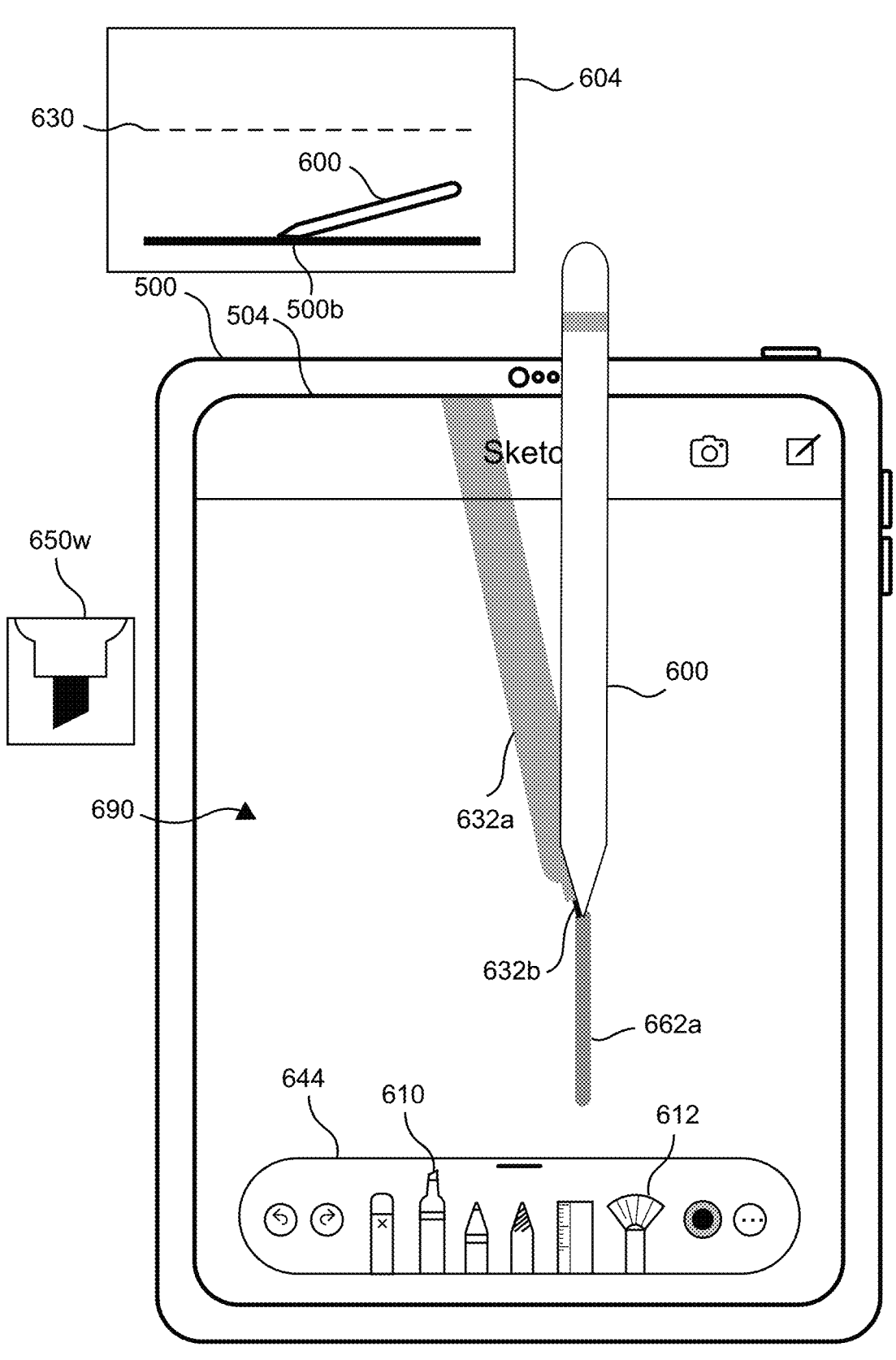
Figure 6E:
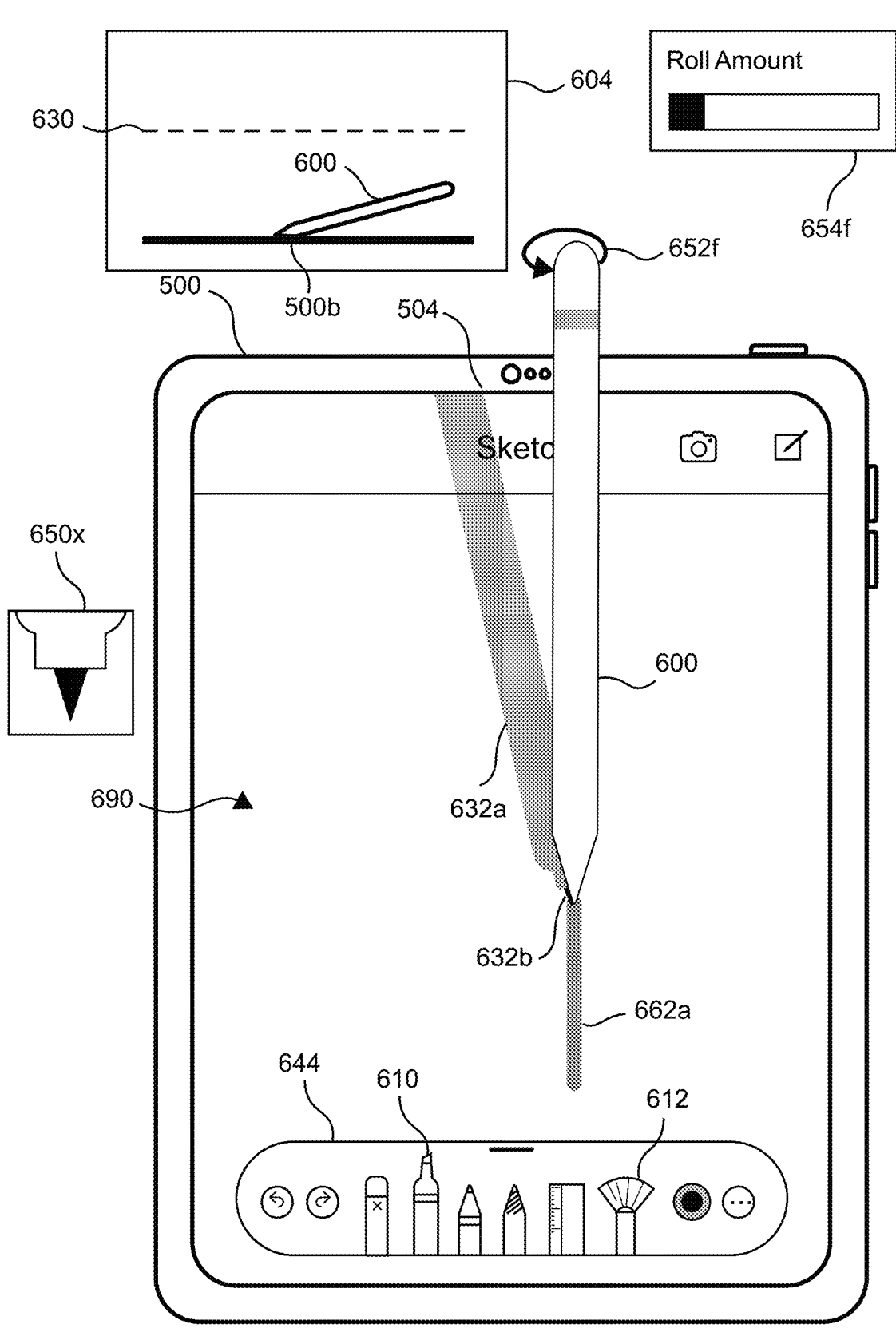
Figure 6F:
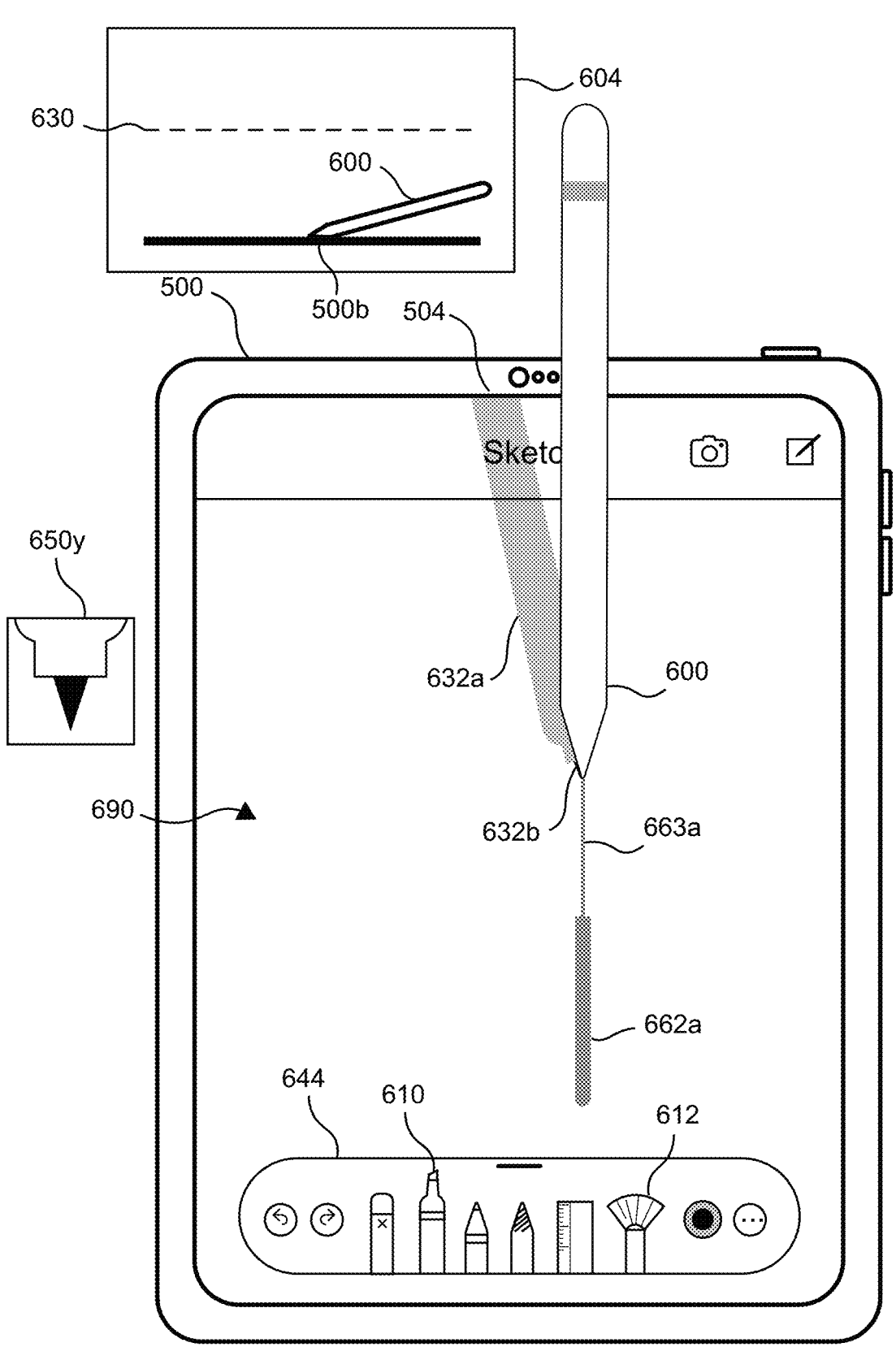
Figure 6G:
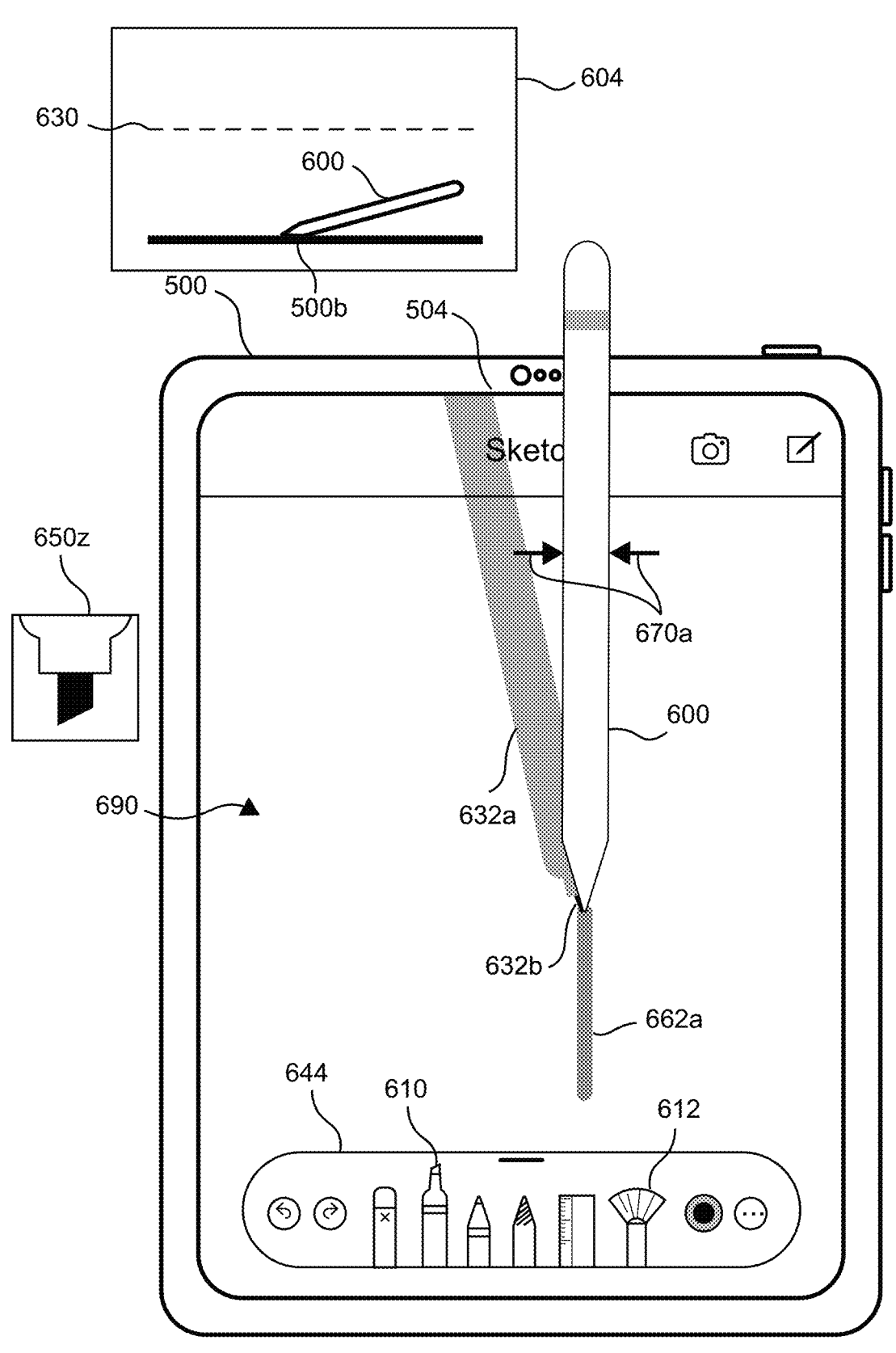
Figure 6H:
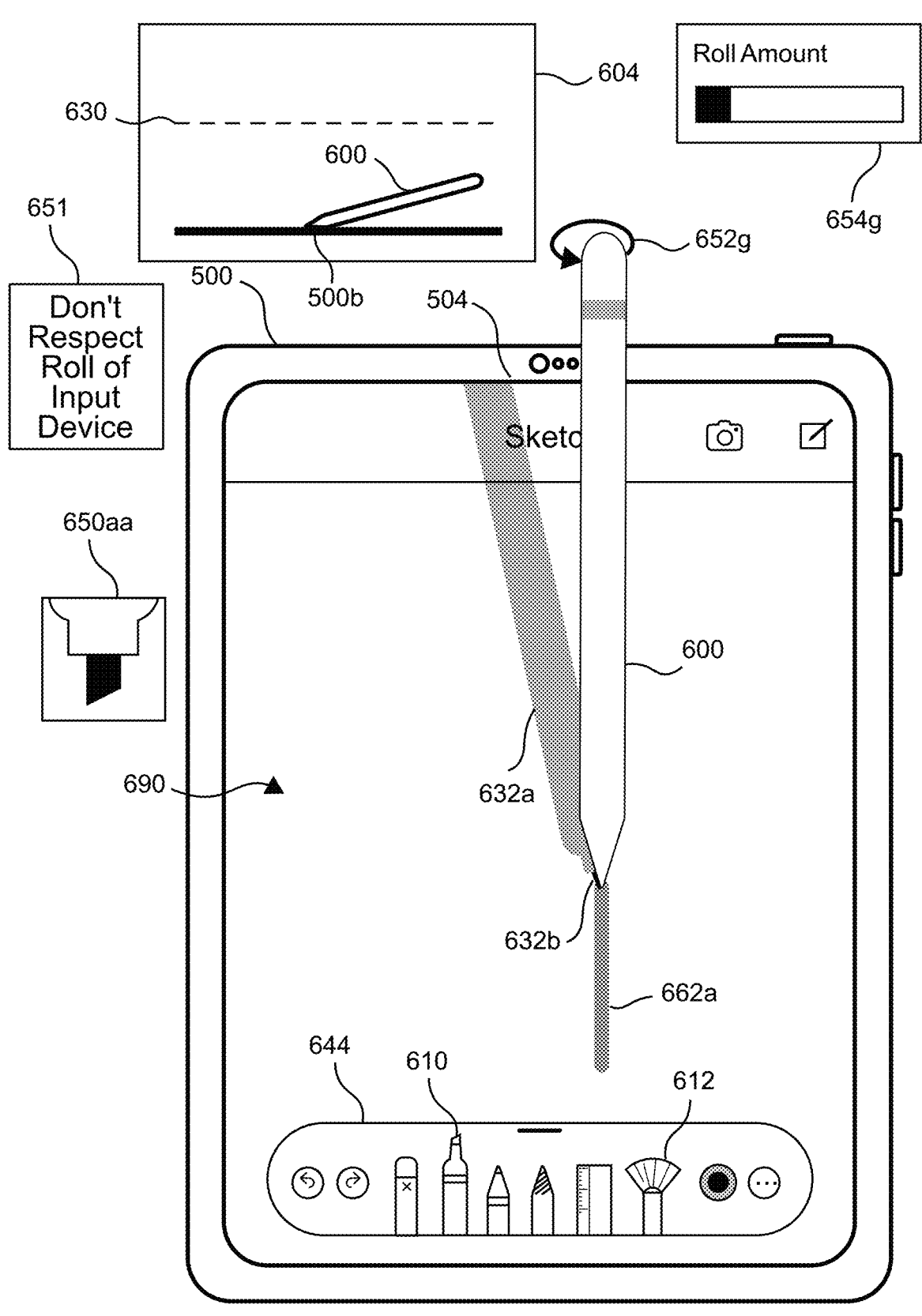
Figure 6I:
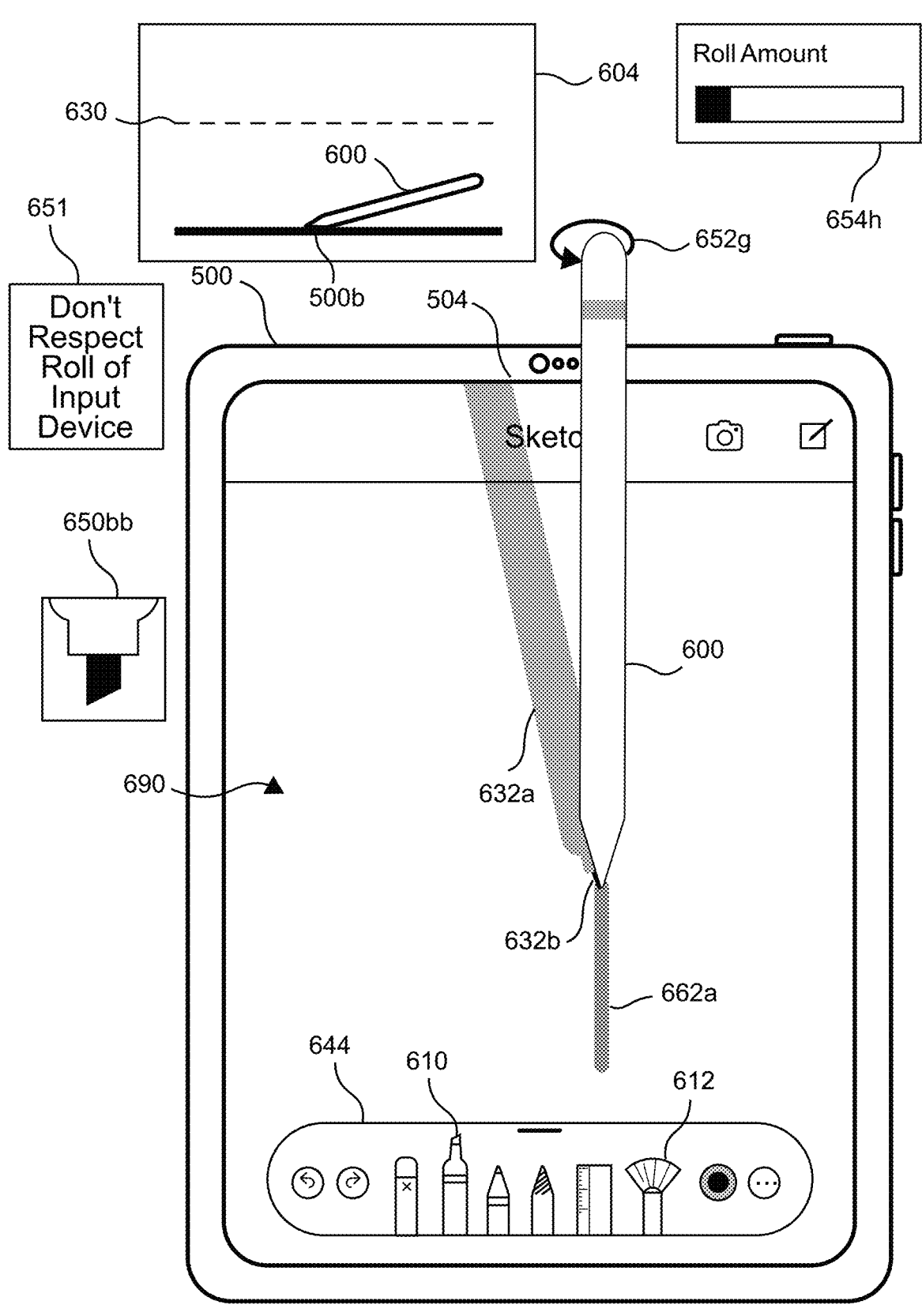
Figure 6J:
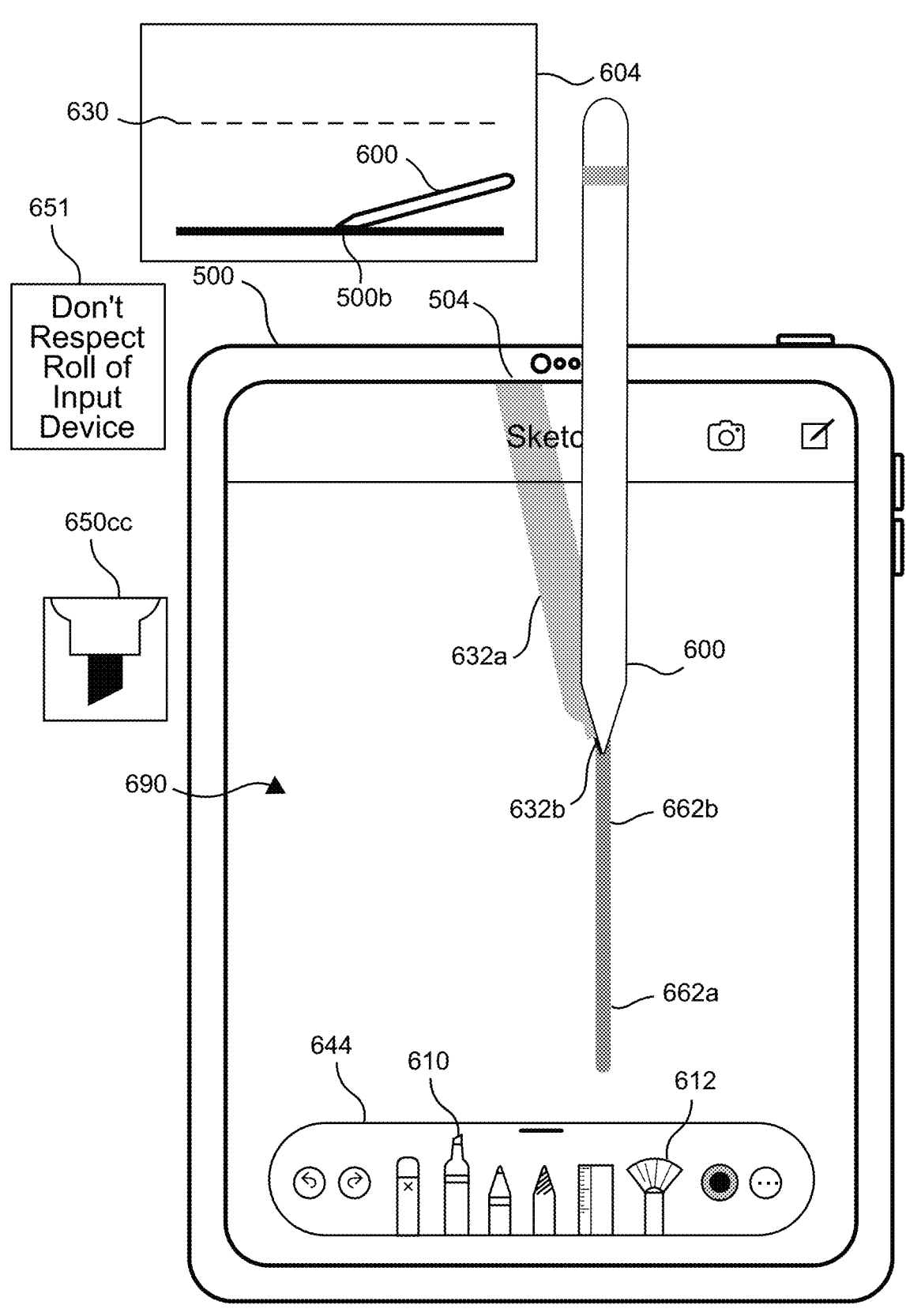
Figure 6K:
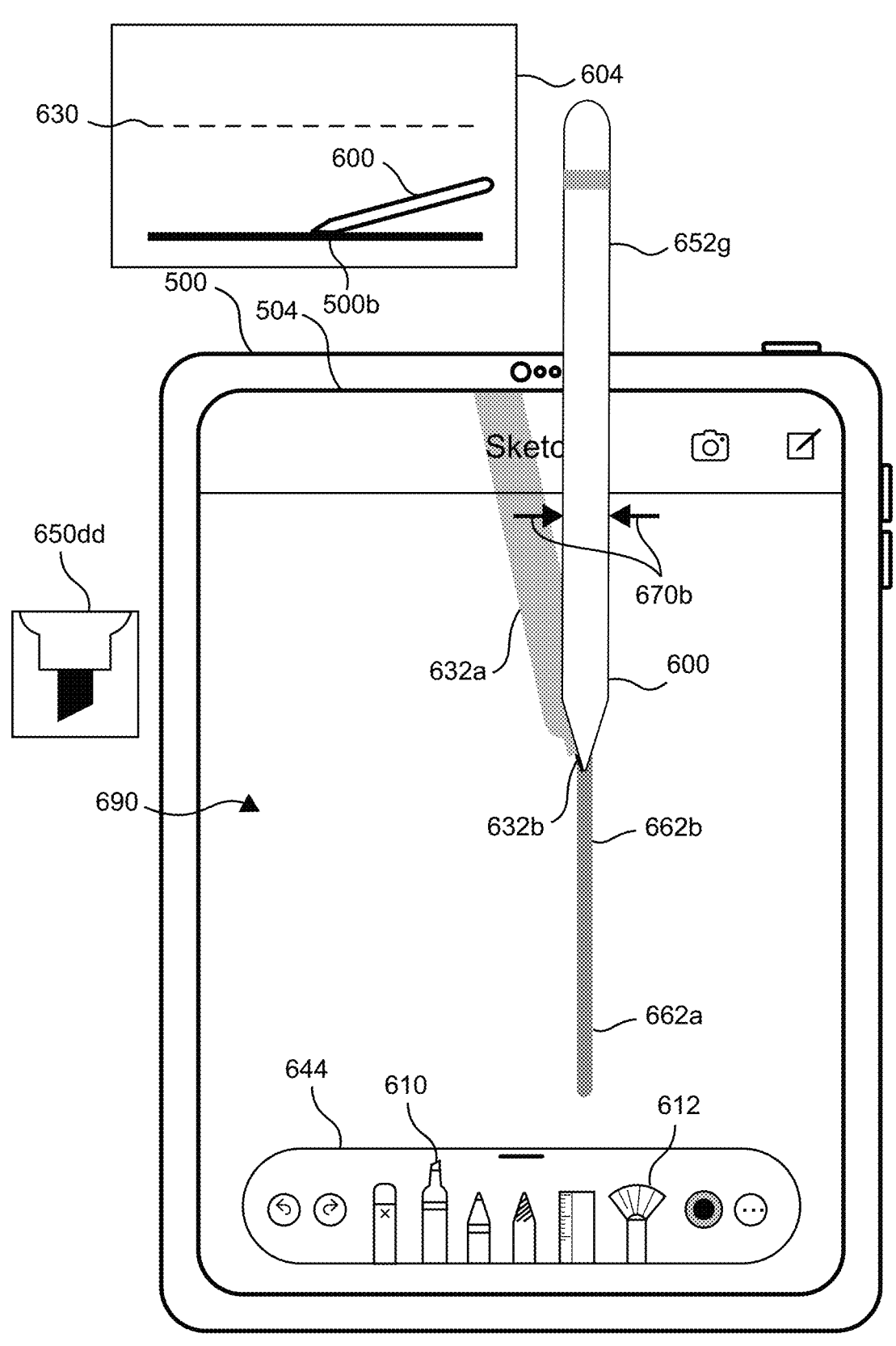
Figure 6L:
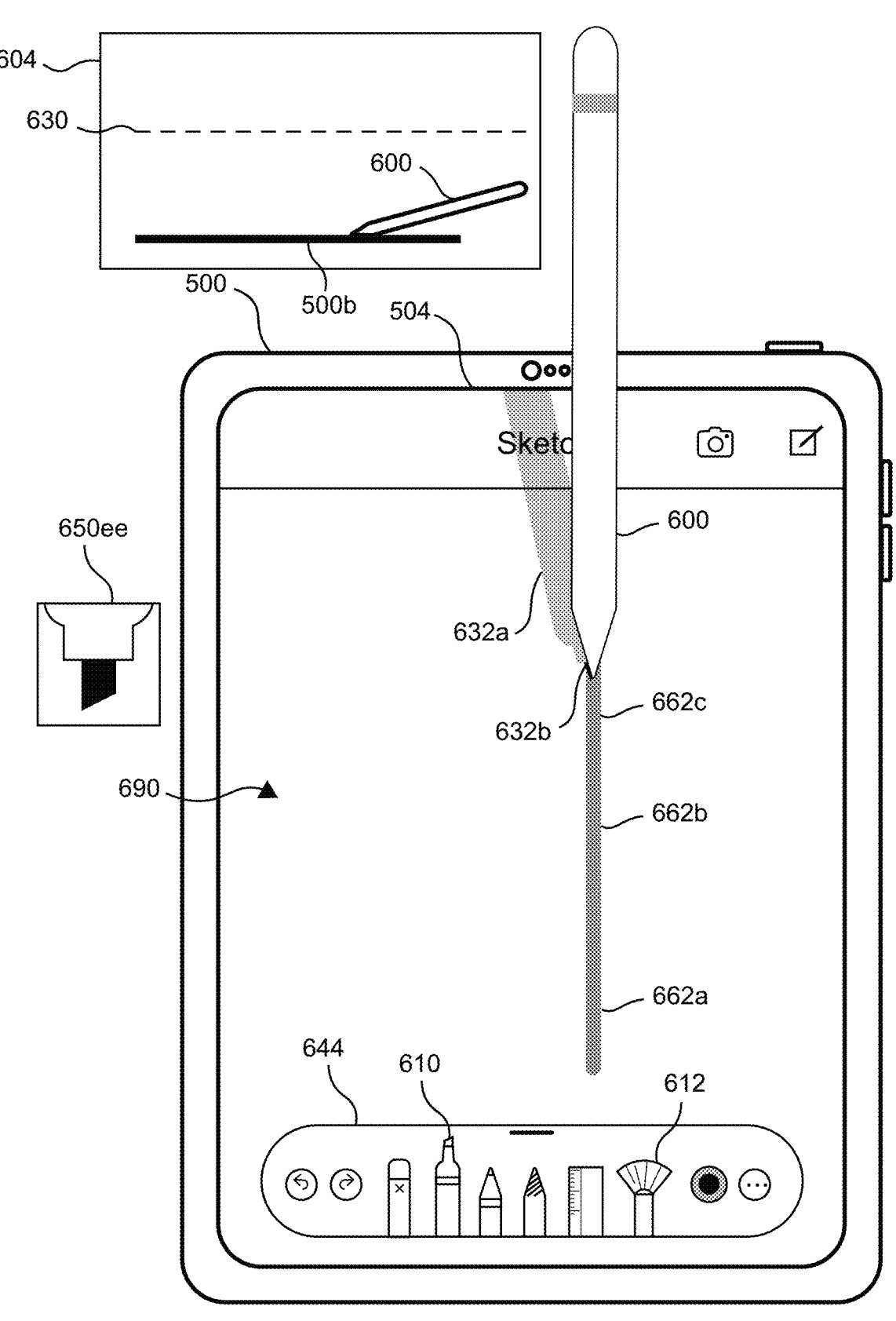
Figure 6M:
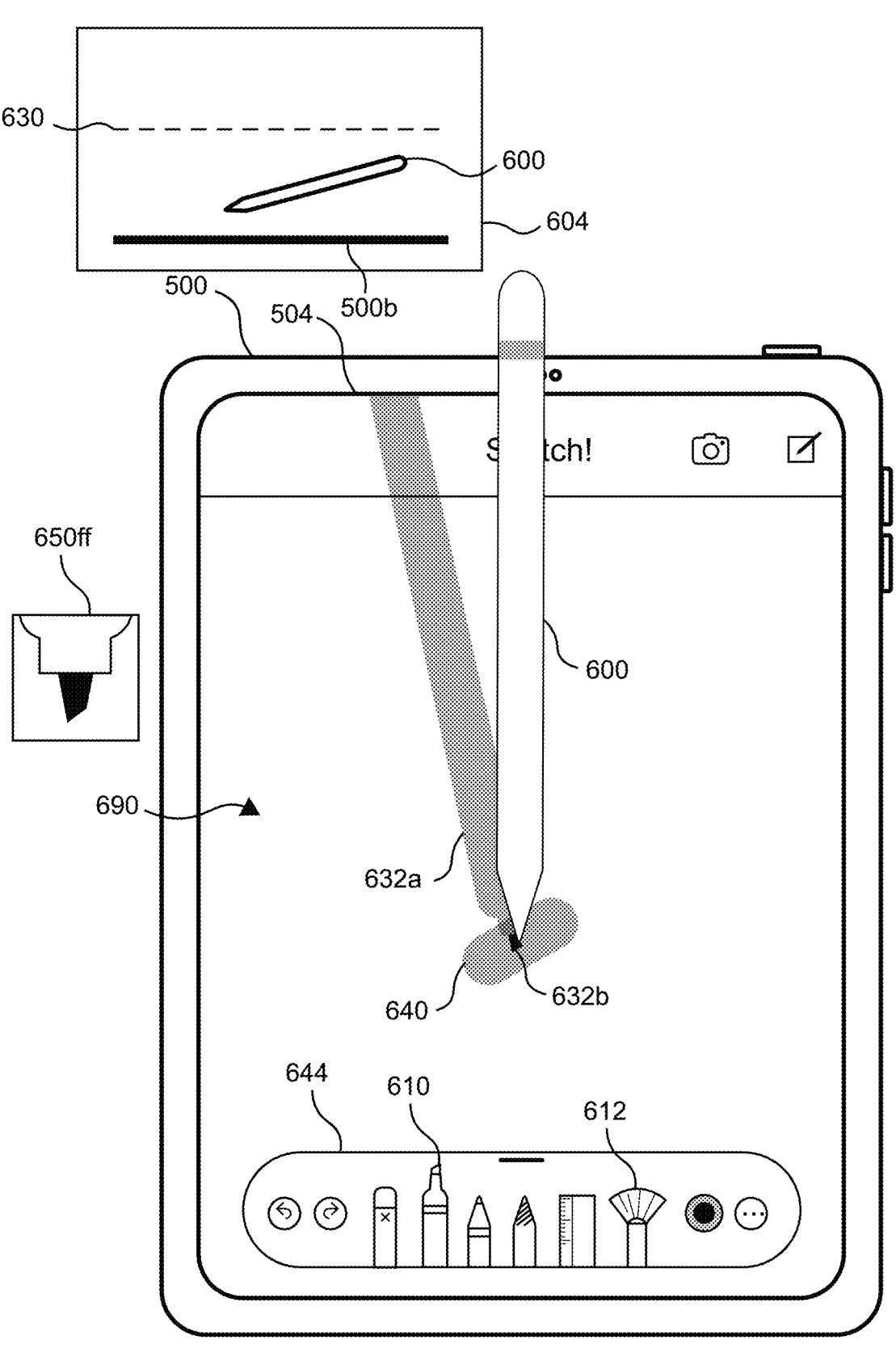
Figure 6N:
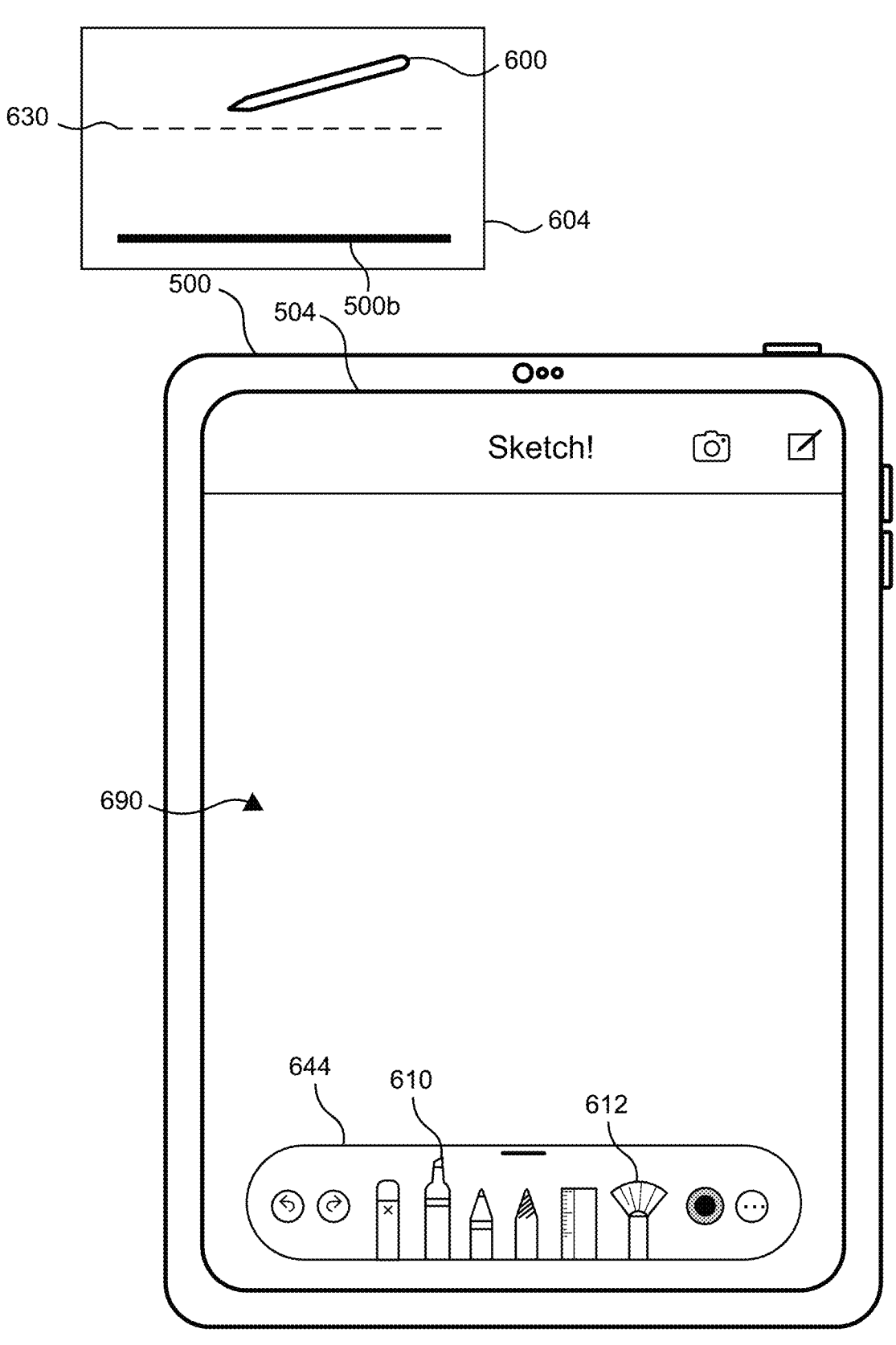

While input device 600 has the respective orientation corresponding to the respective orientation of the preview mark 640 of highlighter 610 in FIGS. 6W, 6Y, and 6AA, device 500 optionally detects a respective marking input including movement in the same direction relative to the reference in the user interface, the movement including a start of the marking input at the center of the preview mark 640 of the highlighter 610 in FIG. 6W. In response, as shown in FIGS. 6X, 6Z, and 6BB, respectively, device 500 displays respective marks of highlighter 610 having different visual characteristics because, though the direction of movement relative to the user interface is the same, the direction of movement relative to the respective orientation of the preview mark 640 of the highlighter 610 is different. In FIG. 6X, the mark 662 of the highlighter 610 has a first width (e.g., a maximum width) optionally because the direction of the marking input is perpendicular to the longitudinal length of the preview mark 640 in FIG. 6W. In FIG. 6Z, the mark 663 of the highlighter 610 has a second width (e.g., a minimum width) optionally because the direction of the marking input is parallel to the longitudinal length of the preview mark 640 of highlighter 610 in FIG. 6Y. In FIG. 6BB, the mark 664 of the highlighter 610 has a third width (e.g., a width that is in between the maximum width and the minimum width) optionally because the direction of the marking input is not parallel and not perpendicular to the longitudinal length of the preview mark 640 of highlighter 610 in FIG. 6AA.

FIGS. 6A-6BB are further described with reference to method 700 of FIG. 7.

In some embodiments, the electronic device changes an orientation of a selected drawing implement for the input device in accordance with changes in orientation of the input device (e.g., rolling of the input device about the input device's roll axis) relative to the electronic device (e.g., relative to surface 652, such as relative to user interface 690). In some embodiments, the electronic device maintains an orientation of a selected drawing implement for the input device even if the input device changes in orientation relative to the electronic device. In some embodiments, the electronic device maintains an orientation of a selected drawing implement for the input device even if the input device changes in orientation relative to the electronic device (e.g., relative to the user interface 690) or changes an orientation of a selected drawing implement for the input device in accordance with changes in orientation of the input device in accordance with user input. FIGS. 6CC through 6LL generally illustrate exemplary examples of the above-mentioned embodiments.

In particular, FIGS. 6CC through 6FF illustrate exemplary ways in which an electronic device displays marks of a currently selected drawing implement for the input device in response to marking inputs detected while the currently selected drawing implement for the input device is permitted to change in orientation in response to changes in orientation of input device 600, in accordance with some embodiments. Pointedly, in FIGS. 6CC through 6FF, exemplary ways are illustrated in which an electronic device displays marks of highlighter 610 in response to marking inputs detected while the highlighter 610 is permitted to change in orientation in response to changes in orientation of input device 600, in accordance with some embodiments.

In FIG. 6CC, electronic device 500 displays shadow portions 632a/632b and preview mark 640 of highlighter 610. The user interface 690 indicates the orientation of highlighter 610 by way of the appearances of shadow portions 632a and/or 632b and preview mark 640 of highlighter 610 in the user interface 690, as similarly discussed above. For example, the shape of the shadow portion 632b, which is magnified in glyph 650v, optionally indicates the orientation of highlighter 610, which as elsewhere described is virtual chisel tip highlighter, and additionally, the orientation of the preview mark 640 of the highlighter 610 (e.g., the angle between a longitudinal side of the preview mark 640 and a reference (e.g., a reference line) in the user interface 690) optionally indicates the orientation of highlighter 610. From FIG. 6CC to FIG. 6DD, the electronic device 500 detects a marking input from the input device 600 that includes movement of input device 600 in a first direction (e.g., movement of the input device 600 towards a top of the electronic device 500 and/or towards a top of the user interface 690), and then generates the mark 662a based on the marking input and the direction associated with the marking input.

In FIG. 6EE, rotational movement of input device 600 is detected, as indicated by arrow 652f, while the highlighter 610 is permitted to change in orientation in response to changes in orientation of input device 600. In response, the electronic device 500 updates display of the user interface 690 to indicate the highlighter 610 having a respective orientation that corresponds to the result of the rolling of the input device 600 about its roll axis, as shown in FIG. 6EE. For example, the rotational movement of input device 600 is optionally a 90-degree rotation about the roll axis of the input device 600, and in response, the shadow portion 632b is updated to an appearance that corresponds to a 90-degree rotation about the roll axis of the highlighter 610, as shown from glyph 650w in FIG. 6DD to glyph 650x in FIG. 6EE. FIG. 6FF illustrates a result of a marking input that is detected while the highlighter has the same orientation illustrated and described with reference to FIG. 6EE. In particular, FIG. 6FF shows generation of mark 663a of highlighter 610, which is a result of a marking input that includes the same direction as the marking input that resulted in generation of mark 662a of FIG. 6DD, but nonetheless results in the mark 663a having different visual characteristics (e.g., thinner) than the mark 662a of FIG.

6DD due to the rotational movement of the highlighter 610 about its roll axis to a different orientation, thus simulating how applying a mark of a chisel tip highlighter in the same direction would have different visual characteristics if the chisel tip highlighter is differently oriented about its roll axis while applying the mark.

Further, FIGS. 6GG through 6JJ illustrate exemplary ways in which an electronic device displays marks of highlighter 610 in response to marking inputs based on an orientation of the highlighter 610 and detected while the highlighter 610 is not permitted to change in orientation in response to changes in orientation of input device 600 in response to detection of an event, in accordance with some embodiments.

In particular, FIG. 6GG illustrates an embodiment in which, while the input device 600 (and highlighter 610) has the same orientation as in FIG. 6DD, electronic device 500 detects an event corresponding to a request to maintain (e.g., lock) an orientation of highlighter 610 relative to the user interface 690. For example, a user optionally desires to maintain an orientation of highlighter 610 while highlighting text in the user interface 690 to reduce marking errors resulting from changing the orientation of highlighter 610 and applies a squeeze gesture to the input device 600 (e.g., applying force on either side of the input device 600), as illustrated with the arrows 670a applied to the input device 600 in FIG. 6GG, and the electronic device 500 interprets the squeeze gesture as part of the event. In response to detection of the event, the electronic device 500 optionally forgoes respecting (e.g., responding to) changes in orientation of the input device 600, such as shown in FIGS. 6HH through 6JJ.

For example, in FIG. 6HH a rotational movement of input device 600 about its roll axis is detected, as indicated by arrow 652g (and arrow 652g optionally corresponds to the same amount (and direction) of roll of input device 600 about its roll axis as arrow 652f of FIG. 6EE which resulted in an update in orientation of highlighter 610 in FIG. 6EE); however, electronic device 500 does not indicate the rotational movement via the user interface 690, thus indicating that the highlighter 610 is not permitted to change in orientation in response to changes in orientation of the input device 600. For further clarity, when the highlighter 610 is permitted to change in orientation in response to changes in orientation of the input device 600, the electronic device 500 updates the user interface to indicate the change in orientation of the highlighter 610, as such as shown by FIGS. 6DD and 6EE (e.g., see glyph 650w and 650x, which illustrate the changes in orientation of the highlighter 610 due to the rotational movement of the input device 600 indicated by arrow 652f), and when the highlighter 610 is not permitted to change in orientation in response to changes in orientation of the input device 600, the electronic device 500 does not update the user interface 690 to indicate the change in orientation of the highlighter 610, as shown by FIG. 6DD (or FIG. 6GG) and 6HH (e.g., see glyph 650w (or 650z) and 650aa), which illustrate the electronic device 500 maintaining the user interface 690 indicating the same orientation of highlighter 610 even though the input device 600 has changed in orientation.

FIG. 6II is provided to generally illustrate that even if further change in orientation of input device 600 is detected, as indicated by arrow 652g in FIG. 6II, while the highlighter 610 is not permitted to change in orientation, the electronic device 500 continues to maintain the user interface 690 indicating the same orientation of input device as if a change in orientation of the input device 600 was not detected.

FIG. 6JJ illustrates generation of mark 662b, which is a result of a marking input that is detected while the highlighter 610 is maintained in orientation (e.g., relative to the user interface 690), though the input device 600 has rotated about its roll axis due to the rolling illustrated in FIGS. 6HH and/or 6II. In particular, FIG. 6JJ shows generation of mark 662b of highlighter 610, which is a result of a marking input that includes the same direction as the marking input that resulted in generation of mark 662a of FIG. 6DD, and is a mark having the same characteristics as the mark 662a of FIG. 6DD due to the maintaining of the orientation of highlighter 610 independent of rolling of input device 600 about the roll axis of the input device 600. The electronic device 500 maintaining the orientation of highlighter 610 independent of rolling of input device 600 about its roll axis optimally reduces errors in mark generation.

FIGS. 6HH through 6JJ also include an indication 651 that the highlighter 610 is not permitted to change in orientation. In some embodiments, the user interface 690 indicates a visual notification, different from (e.g., separate from) the appearances of shadow portions 632a and/or 632b and preview mark 640 of highlighter 610 in the user interface 690, that the currently selected drawing implement for the input device is not permitted to change in orientation in response to changes in orientation of the input device. In some embodiments, the user interface 690 does not include a visual notification that is different from (e.g., separate from) the appearances of shadow portions 632a and/or 632b and preview mark 640 of highlighter 610 in the user interface 690 that indicates the currently selected drawing implement for the input device is not permitted to change in orientation in response to changes in orientation of the input device.

FIGS. 6KK and 6LL illustrate exemplary ways in which an electronic device displays applied marks in response to marking inputs based on an orientation of a selected drawing implement while the selected drawing implement is permitted to change in orientation in response to changes in orientation of input device 600 in response to detection of an event, in accordance with some embodiments.

In particular, FIG. 6KK illustrates an example in which, while the input device 600 (and highlighter 610) has the same orientation as in FIG. 6JJ, electronic device 500 detects an event corresponding to a request to cease maintaining (e.g., cease locking) the orientation of highlighter 610 relative to the user interface 690. For example, a user optionally desires to cease maintaining the orientation of highlighter 610 on the user interface 690 in order to reduce marking errors resulting from maintaining the orientation of highlighter 610, and applies a squeeze gesture to the input device, as illustrated with the arrows 670b applied to the input device 600 in FIG. 6KK, and the electronic device 500 interprets the squeeze gesture as part of the event. In some embodiments, the squeeze gesture is the same (e.g., is a repeat of the) squeeze gesture described with reference to FIG. 6GG. In response to detection of the event, the electronic device 500 optionally respects (e.g., responds to) changes in orientation of the input device 600. For example, if a change in orientation of input device 600 is detected while the highlighter 610 is permitted to change in orientation, then the user interface 690 is updated to indicate the change in orientation of the highlighter 610 in response to changes in orientation of input device 600, such as illustrated and described with reference to FIGS. 6CC through 6FF.

FIG. 6LL illustrates mark 662c, which is a result of a marking input that is detected after the event to ceasing maintaining the orientation of highlighter 610 independent of changes in orientation of input device 600 of FIG. 6KK is detected. In particular, FIG. 6KK shows generation of mark 662*c* of highlighter 610, which is a result of a marking input that includes the same direction as the marking input that resulted in generation of mark 662*a* of FIG. 6DD (and as the marking input that resulted in generation of mark 662*b* of FIG. 6JJ), and is a mark of the same characteristics as the marks 662*a*/662*b* due to orientation of the highlighter 610 during the marking input being the same as the orientation of highlighter 610 during the marking inputs that resulted in the generations of marks 662*a*/662*b* described in FIGS. 6DD and 6JJ. In some embodiments, in response to the event to cease maintaining the orientation of highlighter 610 independent of changes in orientation of input device 600 of FIG. 6KK is detected, the highlighter 610 changes in orientation to an orientation that is different from the orientation of the highlighter 610 when the event was detected (e.g., a default, predefined orientation; or an orientation corresponding to a current orientation of the input device 600, such as to match any changes in orientation of the input device 600 that occurred while the orientation of the highlighter 610 was locked). In some embodiments, in response to the event to cease maintaining the orientation of highlighter 610 independent of changes in orientation of input device 600 of FIG. 6KK is detected, the highlighter 610 maintains the orientation of highlighter 610, such as shown from FIG. 6KK to FIG. 6LL, until a change in orientation of the input device 600 is detected. It should be noted that in the illustrated embodiment of FIG. 6LL, in response to the event, the correspondence of the orientation of the input device 600 to the orientation of the highlighter 610 has updated. For example, though the orientations of highlighter 610 in FIGS. 6DD and 6LL are the same, the orientations of input device 600 about its roll axis in FIGS. 6DD and 6LL are different, such that in response to the event, the electronic device 500 optionally updates the correspondence of the orientation of the input device 600 to the orientation of the highlighter has updated from the orientation of the input device 600 about its roll axis. Continuing with this example, if input device 600 of FIG. 6LL is rotated about its roll axis to be oriented in the orientation of input device 600 of FIG. 6DD about its roll axis, and the roll axes of these input devices 600 are parallel, then the resulting user interface would optionally indicate highlighter 610 having a different orientation than the illustrated orientation of input device 600 of FIG. 6DD, such that in response to the event, the electronic device optionally updates the correspondence of the orientation of the input device 600 to the orientation of the highlighter has updated from the orientation of the input device 600 about its roll axis.

In some embodiments, an electronic device sets (or resets) the orientation of a selected drawing implement for the input device in response to detection of an event. For example, an electronic device optionally changes the orientation of a selected drawing implement for the input device to a default orientation in response to detection of an event corresponding to a request to set or reset the orientation of the selected drawing implement for the input device to a default orientation with respect to the user interface; such features optimally reduce errors in interaction with the electronic device 500 that is associated with mark generation. FIGS. 6MM through 6UU generally illustrates exemplary examples of the above-mentioned embodiments.

In some embodiments, the event corresponding to the request to set or reset the orientation of the selected drawing implement for the input device to a default orientation with respect to the user interface includes movement of the input device 600 relative to a threshold distance of the display generation component 504, such as shown in FIGS. 6MM through 6OO. In FIG. 6MM, the electronic device displays shadow portions 632*a*/632*b* and preview mark 640 of highlighter 610. In some embodiments, the user interface 690 indicates the orientation of highlighter 610 by way of the appearance of shadow portions 632*a*/632*b* and preview mark 640 of highlighter 610 in the user interface 690 (e.g., the angle between a longitudinal side of the preview mark 640 and a reference (e.g., a reference line) in the user interface 690) and/or shape and/or size of shadow portion 632*b* of highlighter 610, which corresponds to a simulated shadow of a chisel tip highlighter in a specific orientation relative to the user interface 690 (e.g., relative to a reference in the user interface 690), as described elsewhere herein). From FIG. 6MM to FIG. 6NN, the input device 600 moves beyond threshold 630 (e.g., the relative distance (e.g., the relative vertical distance) between electronic device 500 and input device 600 increases to above threshold 630 and then returns back to being located within threshold 630.

In response to the input device 600 moving beyond threshold 630, as shown in FIG. 6NN, the electronic device 500 (optionally) ceases displaying shadow portions 632*a*/632*b* and preview mark 640 of highlighter 610 in the user interface 690, as discussed previously herein. Then, from FIG. 6NN to FIG. 6OO, the input device 600 moves back to being within the threshold 630, and in response, the electronic device 500 updates display of the user interface 690 to indicate that the highlighter 610 has the default orientation. For example, both the appearance of shadow portions 632*a*/632*b* and preview mark 640 of highlighter 610 in the user interface 690 are updated to indicate that the highlighter 610 has the default orientation. For example, the shadow portion 632*b* has a default appearance and the angle between a longitudinal side of the preview mark 640 and a reference (e.g., a reference line) of the user interface 690 is optionally a default angle (e.g., 0, 5, 10, 20, 60, 120 degrees, or another angle). Thus, in response to the event, the electronic device 500 updates or resets the orientation of the highlighter 610 to have the default orientation.

It should be noted that the electronic device 500 optionally updates or resets the orientation of the highlighter 610 to have the default orientation in response to the event independent of whether or not the input device 600 has changed in orientation. For example, the orientations of input device 600 in FIGS. 6MM and 6OO are optionally the same, while the orientations of highlighter 610 in FIGS. 6MM and 6OO are different. As another example, the orientations of input device 600 in FIGS. 6MM and 6OO are optionally different, while the orientations of highlighter 610 in FIGS. 6MM and 6OO are different.

Figure 6O:
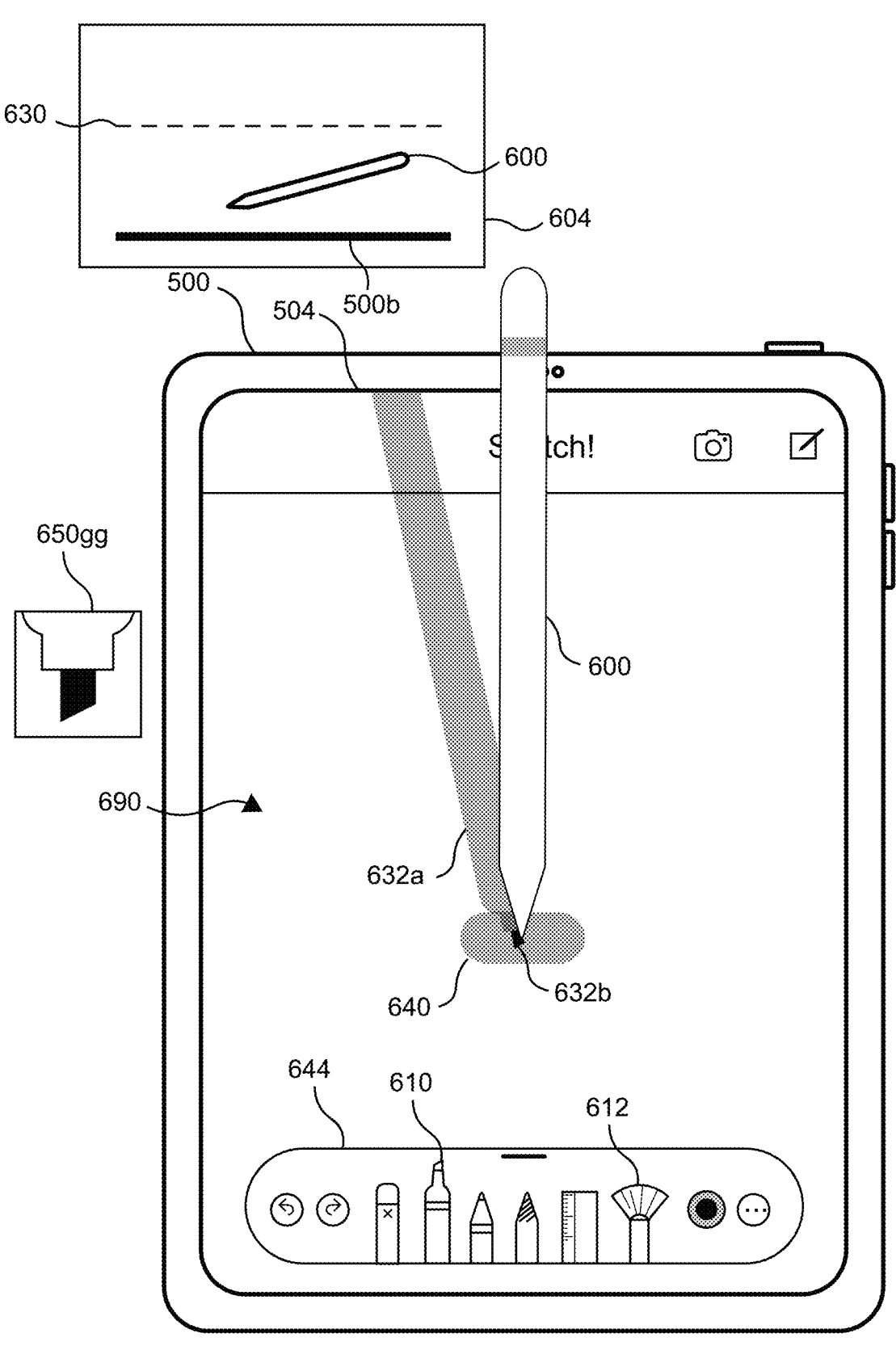
Figure 6P:
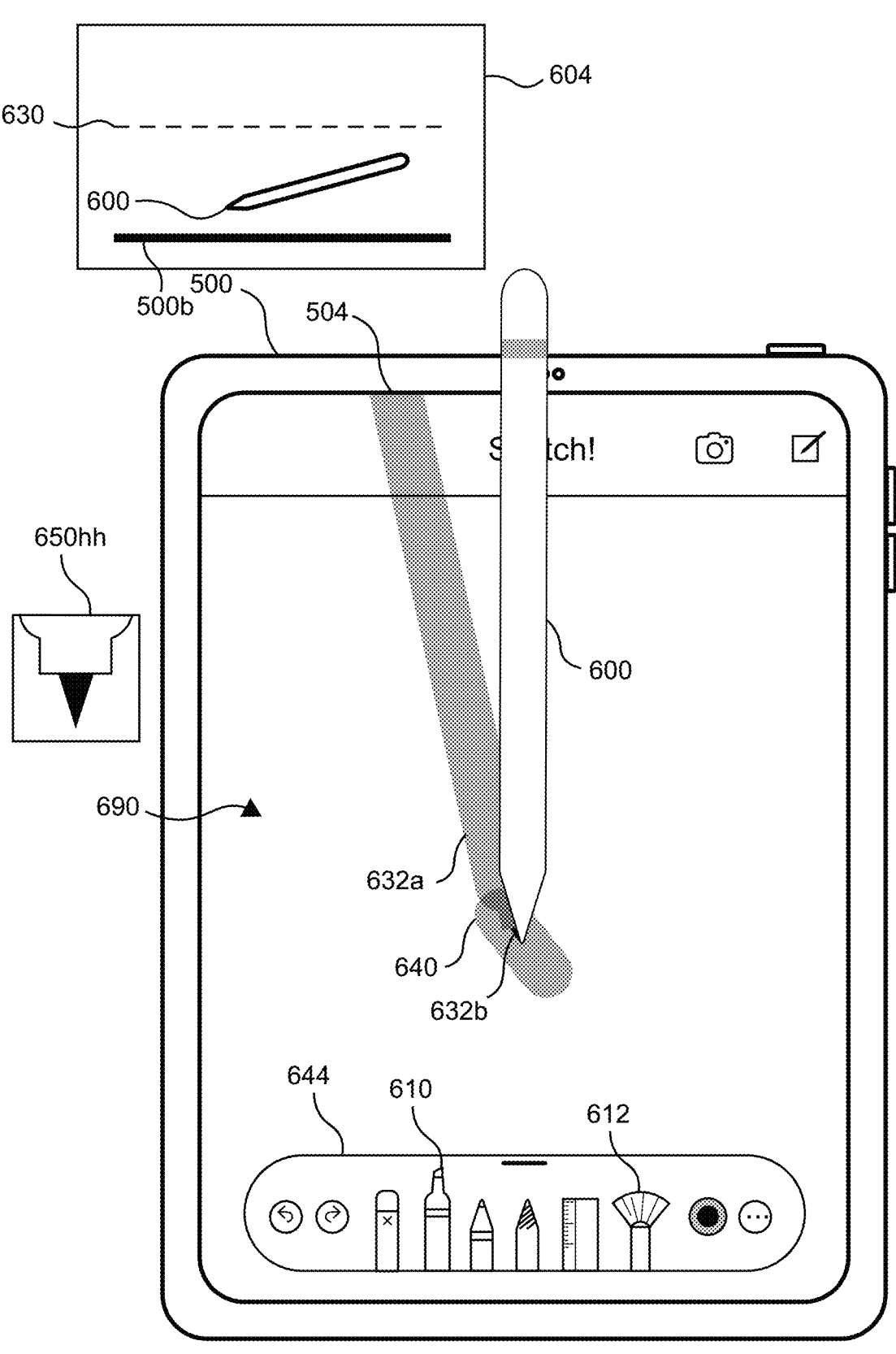
Figure 6Q:
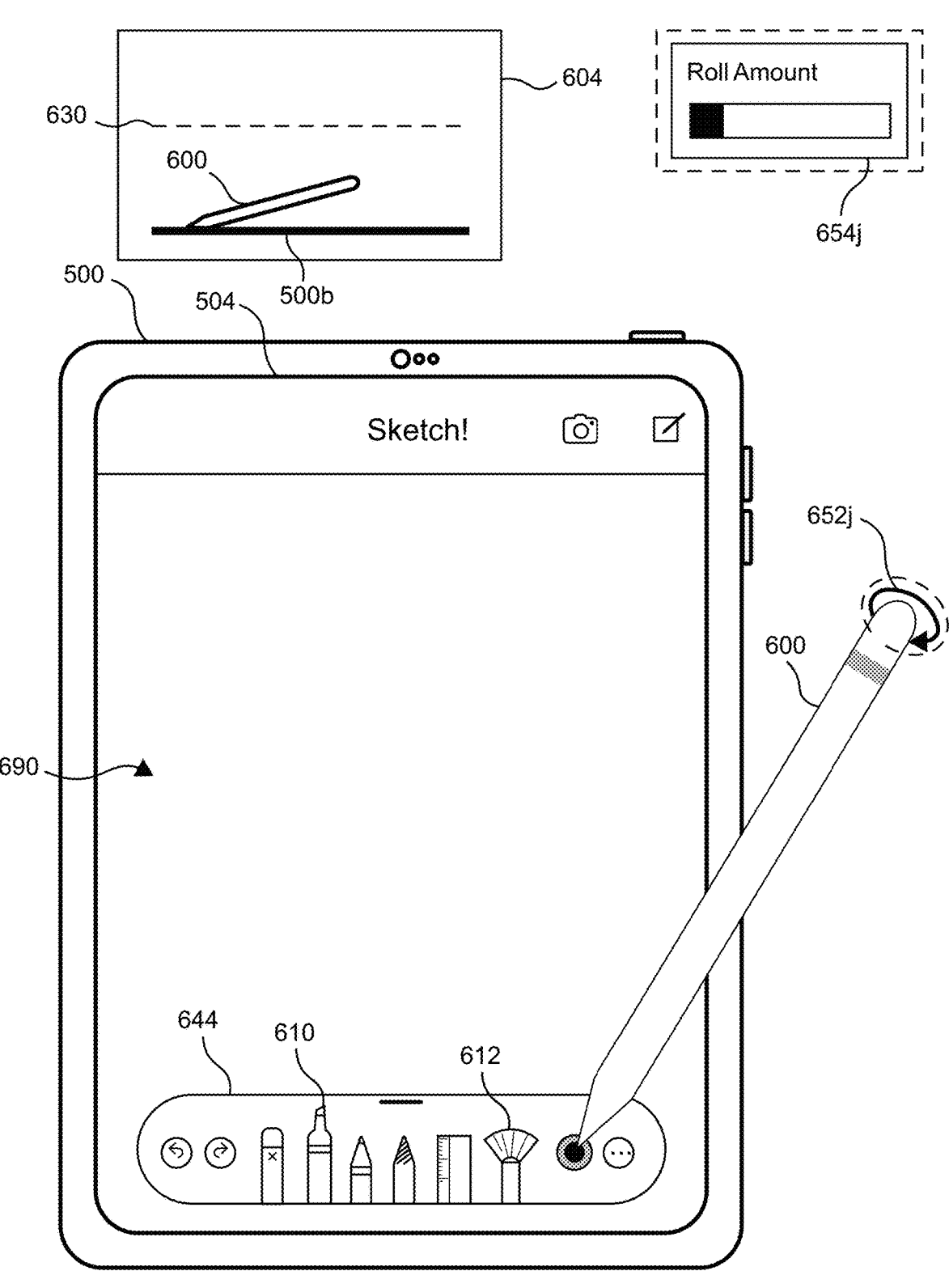
Figure 6R:
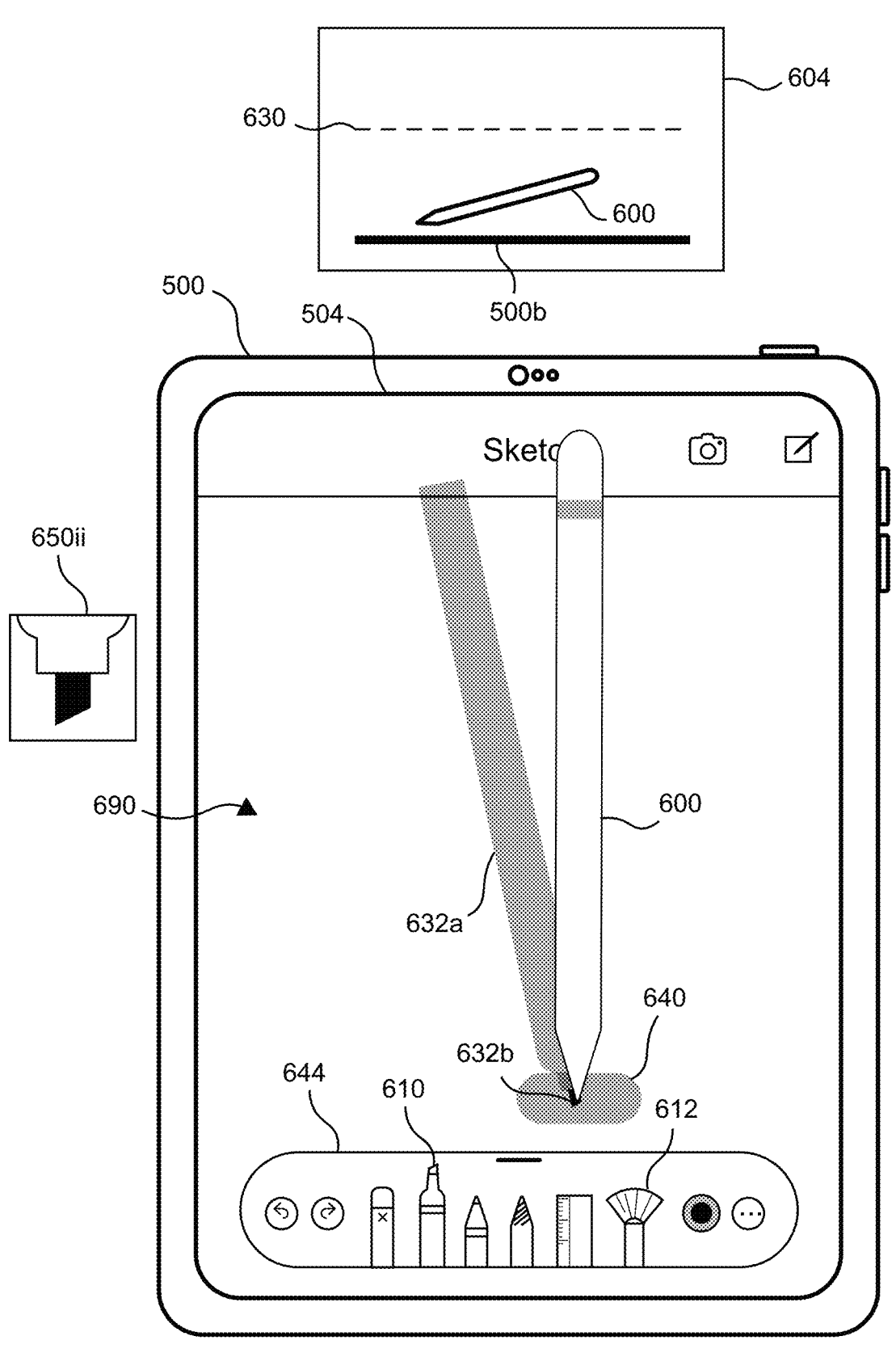
Figure 6S:
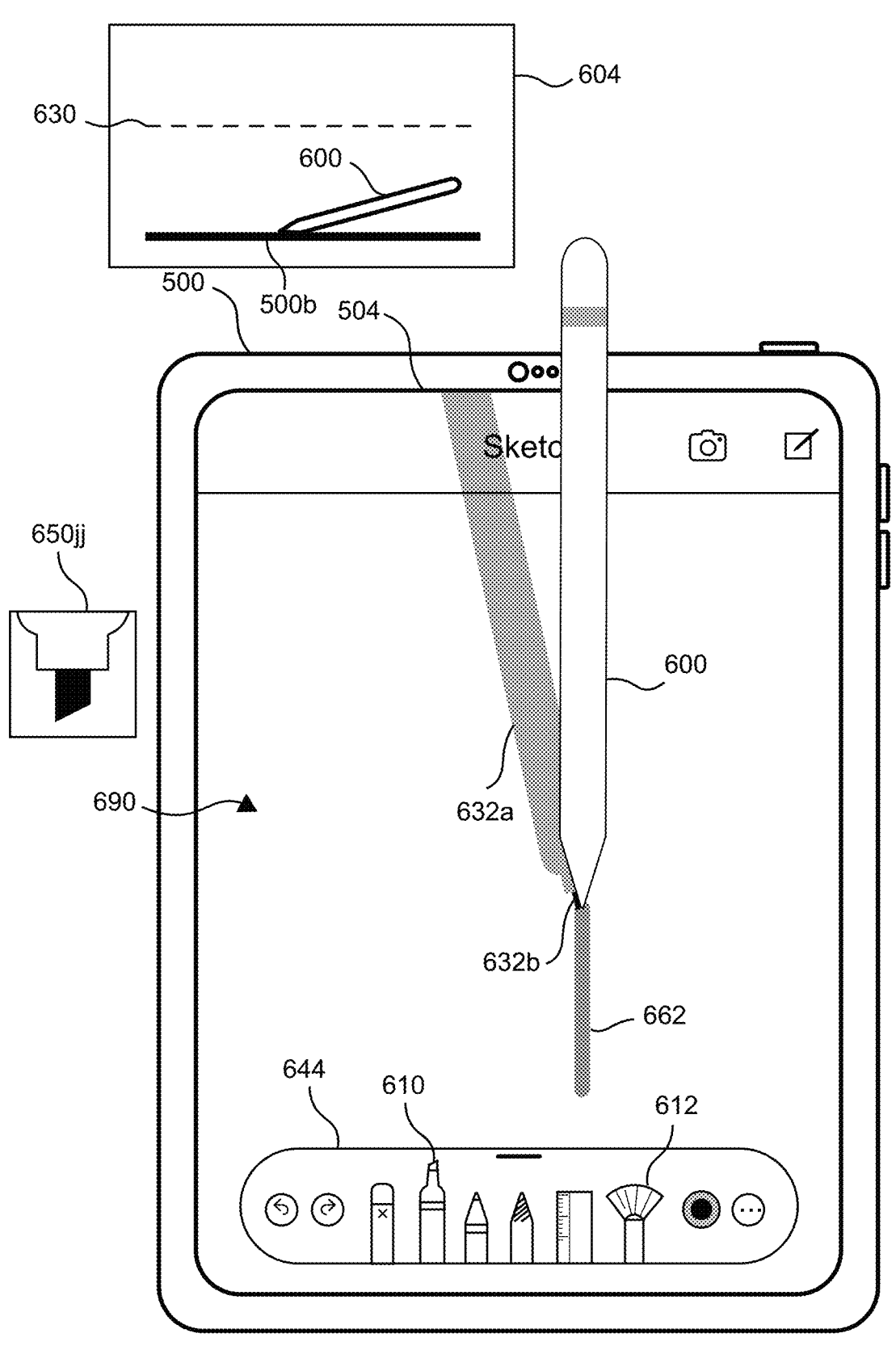
Figure 6T:
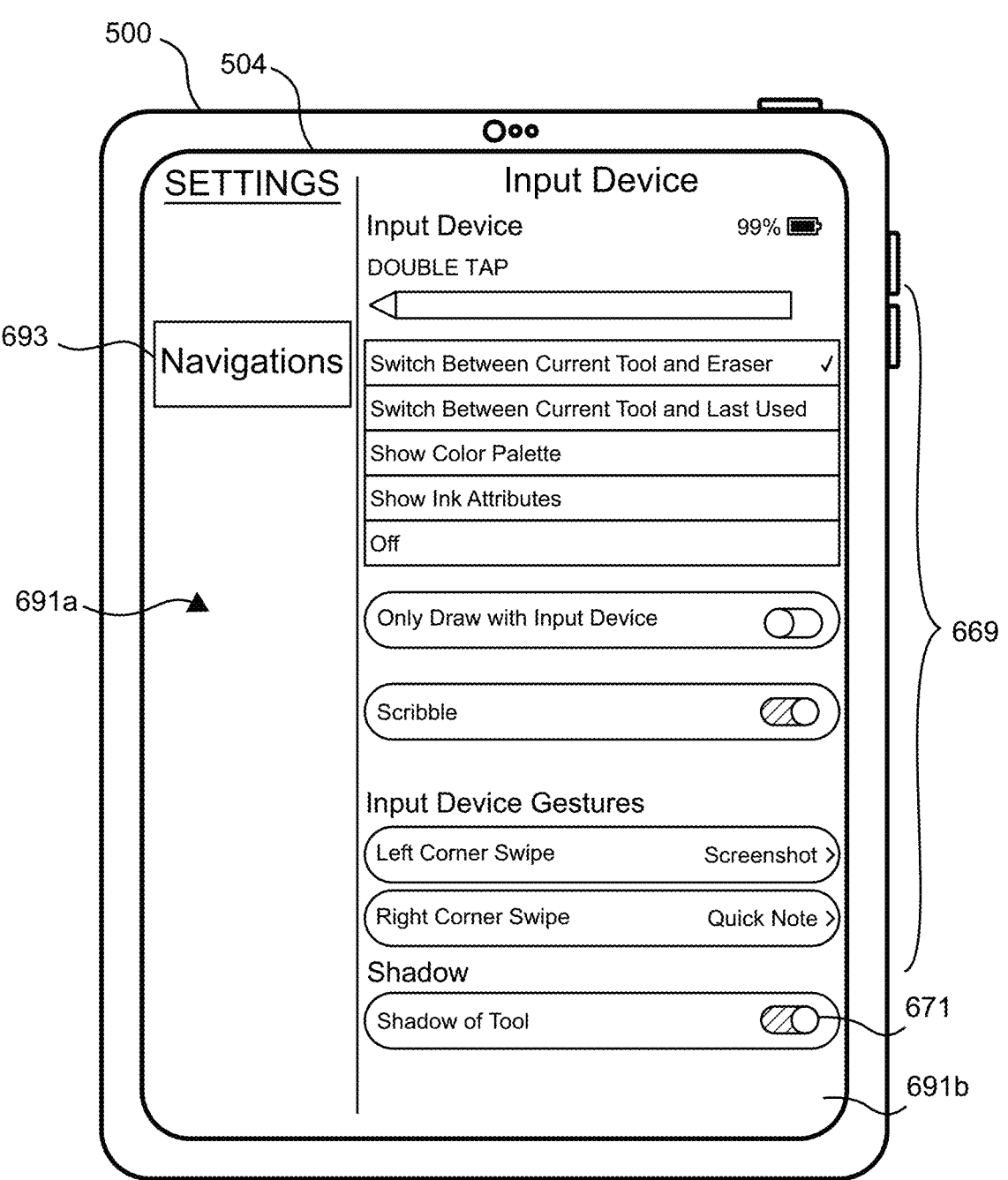

In addition, it should be noted that the electronic device 500 optionally updates or resets the orientation of the highlighter 610 to have the default orientation in response to the event independent of the orientation of input device 600 (and/or of highlighter 610) when or before the event is detected. For example, if the input device 600 (and/or highlighter 610) is oriented as illustrated in FIG. 6PP instead of as illustrated in FIG. 6MM, and the event corresponding to the request to set or reset the orientation of the highlighter 610 to the default orientation with respect to the user interface is detected, then the electronic device 500 would optionally update the orientation of the highlighter 610 to be the same as illustrated in FIG. 6OO. For example, the user interface 690 of FIG. 6PP indicates that the highlighter 610 has a first orientation, such as with the appearance (e.g., shape and/or orientation) of the shadow portion 632*b* (the shape of which is more clearly shown in glyph 650*hh* in FIG. 6PP), and the user interface 690 of FIG. 6MM indicates that the highlighter 610 has a second orientation, different from the first orientation, such as with the appearance of the shadow portion 632*b* (which is more clearly shown in glyph 650*ff* in FIG. 6MM. Continuing with this example, if the event corresponding to the request to set or reset the orientation of the selected drawing implement for the input device was detected, independent of whether the user interface indicates that the highlighter 610 has the first orientation or the second orientation, the user interface would update to indicate that the highlighter 610 has the default orientation, such as the orientation of the highlighter 610 in FIG. 6OO. Further, continuing with this example, the change in orientation of the highlighter 610 (e.g., the amount of change in orientation) from the first orientation to the default orientation is different from (e.g., different in amount than) the change in orientation of the highlighter 610 from the second orientation to the default orientation.

In some embodiments, the event corresponding to the request to set or reset the orientation of the selected drawing implement for the input device to a default orientation with respect to the user interface includes movement of the input device 600 between different areas of user interface 690 and/or selection of a new drawing implement. For example, in response to movement of input device 600 from a drawing region of user interface 690, such as the illustrated location of input device 600 in FIG. 6PP to its illustrated location in FIG. 6QQ, which is in content entry palette 644 and is a non-drawing region, and then back to the drawing region, such as the illustrated location of input device 600 in FIG. 6RR, the electronic device 500 optionally resets the orientation of the selected drawing implement, optionally independent of whether or not the input device 600 has changed in orientation and/or independent of the orientation of input device 600 (and/or of highlighter 610) when or before the event is detected. For example, from FIG. 6PP to FIG. 6QQ, the user optionally selects a user interface element in content entry palette 644 corresponding to a different highlighting color, and in response to detection that input device 600 is, for example, located in the drawing region at its illustrated location in FIG. 6PP, the electronic device resets the orientation of the highlighter to the default orientation, such as shown from FIG. 6QQ to 6RR, independent of whether the input device changes in orientation while interacting with content entry palette 644 (e.g., independent of whether rolling of input device 600, as indicated by arrow 652*j*, occurs or not) or otherwise changes in orientation before returning to the drawing region. In FIG. 6RR, the highlighter 610 is of a different color than the highlighter 610 of FIG. 6PP optionally due to the interaction of input device 600 with content entry palette 644, including selection of a different highlighting color. For example, the preview mark 640 of highlighter 610 in FIG. 6RR is optionally of a different color than the preview mark 640 of highlighter 610 of FIG. 6PP. It should be noted that if a different drawing implement is selected, such as selection of fan brush 612, which would change the currently selected drawing implement for the input device from the highlighter 610 to the fan brush 612, then the user interface 690 would optionally indicate that the fan brush 612 has a default orientation for the fan brush 612 (when the input device 600 returns to the drawing region (e.g., tip of input device 600 hovers over or is in contact with the drawing region)), such as the orientation of the fan brush 612 illustrated in FIG. 6Q with the orientation of the preview mark 640 of fan brush 612 and/or the shadow portion 632*b* of fan brush 612. For example, if the fan brush 612 is selected at a first time, then when the fan brush 612 is indicated (e.g., initially indicated) in the drawing region of the user interface (e.g., when the posing of the input device 600 is such that the user interface is to indicate the fan brush 612 in the drawing region), the user interface would optionally indicate the fan brush 612 having the default orientation for the fan brush 612, and if the fan brush 612 is selected at a second time, different from the first time, then when the fan brush 612 is indicated in the drawing region, then the user interface would update to indicate the fan brush 612 having the same default orientation, independent of the orientation of the input device 600. Continuing with this example, if a change in orientation of the input device 600 is detected after the user interface indicates in the drawing region that the fan brush 612 has the default orientation for the fan brush 612, then the user interface would optionally update the orientation of the fan brush 612 to indicate a second orientation of the fan brush 612 that is based on the change in orientation from the default orientation. Further, if a marking input is detected while the highlighter 610 has the orientation illustrated in FIG. 6RR, then the resulting mark of highlighter 610 of FIG. 6RR would optionally be generated based on the default orientation of the highlighter 610, such as shown with the mark 662 in FIG. 6SS having visual characteristics that are based on the highlighter 610 being in the default orientation and based on the movement of the highlighter 610 towards the top of the user interface 690 from FIG. 6RR to FIG. 6SS during the marking input.

FIG. 6TT illustrates an electronic device displaying a user interface element 671 for enabling or disabling display of shadow portions of a currently selected drawing implement for the input device, in accordance with some embodiments.

In some embodiments, the user interface element 671 is displayed in a settings menu for customization of interactive features of the input device 600 with electronic device 500, as shown in FIG. 6TT. For example, in FIG. 6TT, electronic device 500 displays region 691*a* and 691*b*, where region 691*b* includes various user interface elements 669 selectable to enable, disable, or customize features of how input device 600 interacts with electronic device 500, such as for corresponding different inputs detected at input device 600 or electronic device 500 to different resulting actions, functionalities, or processes at input device 600, electronic device 500, and/or in the interaction of input device 600 and electronic device 500. Region 691*a* includes navigations 693, which is optionally a navigation pane for navigating to different types of settings.

In FIG. 6TT, the user interface element 671 is illustrated as having a state that corresponds to enablement of display of shadow portions of a currently selected drawing implement for the input device (e.g., shadow portions 632*a*/632*b* of highlighter 610). For example, if electronic device 500 was to display user interface 690 while user interface element 671 is left in the state illustrated in FIG. 6TT, then the user interface 690 would optionally include shadow portions 632*a*/632*b* of highlighter 610. In response to input directed at the user interface element 671 of FIG. 6TT, the electronic device 500 would update the user interface element 671 to indicate a state that corresponds to disablement of display of shadow portions of a currently selected drawing implement for the input device (e.g., shadow portions 632*a*/632*b* of highlighter 610). For example, if electronic device 500 were to display a user interface 690 while user interface element 671 is left in the disabled state, then the user interface 690 would optionally not include shadow portions 632*a*/632*b* of highlighter 610.

FIGS. 6CC through 6TT are described further with reference to FIG. 7.

FIG. 7 is a flowchart illustrating a method for providing feedback about the pose and/or orientation of an input device relative to a surface in accordance with rotational movement of the input device about an axis associated with the input device, in accordance with some embodiments. The method 700 is optionally performed at an electronic device such as device 100, device 300, device 500, or device 580 as described above with reference to FIGS. 1A-1B, 2-3, 4A-4B, 5A-5C and 5I. Some operations in method 700 are, optionally combined and/or order of some operations is, optionally, changed.

As described below, the method 700 provides ways of providing feedback about the pose and orientation of an input device relative to a surface. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, the method 700 is performed at an electronic device in communication with a display generation component, one or more sensors (e.g., a touch-sensitive surface, such as touch-sensitive display system 112 in FIG. 1A or touch screen 112 in FIG. 4A) and an input device (e.g., a stylus in communication with the electronic device). For example, the electronic device optionally is or includes a mobile device (e.g., a tablet, a smartphone, a media player, or a wearable device), or a computer, optionally in communication with one or more of a mouse (e.g., external), trackpad (optionally integrated or external), touchpad (optionally integrated or external), remote control device (e.g., external), another mobile device (e.g., separate from the electronic device), a handheld device (e.g., external), and/or a controller (e.g., external), etc. In some embodiments, the display generation component is a display integrated with the electronic device (optionally a touch-sensitive and/or touch screen display), external display such as a monitor, projector, television, or a hardware component (optionally integrated or external) for projecting a user interface or causing a user interface to be visible to one or more users, etc. In some embodiments, the one or more sensors optionally include one or more sensors of FIG. 1A.

In some embodiments, the electronic device displays (702*a*), via the display generation component, a user interface, such as user interface 690 of FIG. 6A. For example, a user interface of an application installed and/or running on the electronic device, or a user interface of the operating system of the electronic device. In some embodiments, the user interface is a home screen user interface of the electronic device, or a user interface of an application accessible by the operating system of the electronic device, such as a word processing application, a note taking application, an image management application, a digital content management application, a drawing application, a presentation application, a word processing application, a spreadsheet application, a messaging application, a web browsing application, and/or an email application. In some embodiments, the user interface concurrently includes multiple user interfaces of one or more applications and/or the operating system of the electronic device. In some embodiments, the user interface includes one or more regions. In some embodiments, the user interface includes a first region (e.g., a drawing region) and a second region (e.g., a non-drawing region).

In some embodiments, while displaying the user interface via the display generation component, the electronic device detects (702*b*), via the one or more sensors, a first pose (e.g., position, tilt, and/or orientation) of the input device relative to a surface (702*c*) (e.g., a surface of the electronic device, a touch-sensitive surface, a surface of the display generation component via which the user interface is displayed, a physical surface on which the user interface is projected, or a virtual surface corresponding to at least a portion of the user interface), such as the pose of input device 600 relative to the surface of touch screen 504 in FIG. 6G, and a first orientation of the input device about a first axis associated with the input device (702*d*), such as the orientation of the input device relative to the surface of touch screen 504 in FIG. 6G (e.g., a roll axis or longitudinal axis of the input device, which optionally goes through a center of input device, out of a tip of the input device on one end (e.g., a first side) of the input device and out of another end of the input device that is opposite the tip of the input device, optionally passing through the center of the input device). For example, the first orientation about the first axis is optionally how the input device is positioned about the first axis (optionally relative to the surface). For example, the first orientation about the first axis is optionally how a first longitudinal edge of the input device (e.g., an edge of the input device that is parallel to the first axis) is located about the first axis (optionally relative to the surface). The first orientation about the first axis optionally corresponds to where a first point on a surface of the input device is positioned (e.g., above or below) relative the first axis (optionally relative to the surface). For example, the input device optionally includes a cylindrical portion configured to be handheld (e.g., a barrel of a stylus) and the first orientation about the first axis optionally corresponds to where a first point on the curved surface of the cylindrical portion is positioned relative to the first axis (optionally relative to the surface). In some embodiments, the first orientation of the input device about the first axis is further relative to the surface. For example, the electronic device and/or surface optionally obtains pose and orientation information including position/ attitude (pitch, yaw, and/or roll), orientation, tilt, path, force, distance, and/or location of the input device relative to the surface from one or more sensors (e.g., of the input device and/or of the electronic device, or of another device), one or more electrodes in the surface, one or more planar surfaces of a physical object (or physical regions) in a physical environment, other defined coordinate systems, other sensors, and/or other input devices (e.g., an input trackpad including a specialized surface that is configured to detect motion, pose, and/or orientation information of the input device).

In some embodiments, in response to detecting the first pose of the input device relative to the surface and the first orientation of the input device about the first axis associated with the input device, in accordance with a determination that the first pose of the input device relative to the surface includes the input device being within a first threshold distance (e.g., at 0 cm or in contact with the surface, or hovering over (and not in contact with the surface at 0.01, 0.05, 0.1, 0.2, 0.5, 0.8, 1, 3, 5, 10, 30, 50 or 100 cm, or another threshold distance) of the surface, such as threshold distance 630 of FIG. 6G, and that a currently selected drawing implement for the input device (e.g., virtual drawing implement corresponding to the physical input device) is a first drawing implement (e.g., a pen, a pencil, a crayon, an eraser, a highlighter, a paint brush, or another type of drawing implement), such as the highlighter 610 of FIG. 6G, the electronic device updates (702e) display, via the display generation component, of the user interface to include a preview mark of the first drawing implement, wherein the preview mark has a first visual appearance (e.g., one or more or all of a first position on the user interface, first degree of coloring (e.g., corresponding to the color of the virtual ink or material corresponding to the first drawing implement), first shape, first orientation, first size, first degree of transparency, first degree of blur, and/or other characteristic of the preview mark) in the user interface based on the first pose of the input device relative to the surface and based on the first orientation of the input device about the first axis associated with the input device, such as the preview mark 640 of the highlighter 610 having a respective orientation relative to palette 644 in FIG. 6G. In some embodiments, the electronic device displays the preview mark at a location corresponding to a projection of the tip portion of the input device on the surface (and/or of the tip portion of the first drawing implement on the surface). In some embodiments, the electronic device displays the preview mark at a location corresponding to the tip portion of a virtual shadow corresponding to the input device. In some embodiments, the electronic device determines that the input device is within the first threshold distance of the surface (in some embodiments, not contacting the surface, and in some embodiments, in contact with the surface) and, in accordance with the determination, displays the preview mark having the first visual appearance. In some embodiments, the electronic device changes the appearance of the first visual appearance based on a change in distance between the surface and the input device, such as described below. In some embodiments, the preview mark visually indicates one or more of proximity of the input device to the surface and/or proximity of the tip of input device to the surface, where a mark will be drawn (or rendered for display) by the user interface if and/or when the input device provides a marking input to the user interface (e.g., movement of the input device while the tip of the input device is in contact with the surface), and/or how a mark will be drawn (or rendered for display) by the user interface if and/or when the input device provides a marking input to the user interface (e.g., movement of the input device while the tip of the input device is in contact with the surface). In some embodiments, the preview mark is the same color as the color corresponding to the first drawing implement. For example, if the first drawing tool is a red crayon, the preview mark is optionally red, and if the first drawing implement is a green crayon, the preview mark is optionally green. In some embodiments, the preview mark is a default color that is optionally different from the selected color for the drawing implement. In some embodiments, the preview mark visually previews how a mark will be drawn (or rendered for display) based on a direction associated with a marking input provided to the user interface. In some embodiments, the preview mark having the first visual appearance visually indicates a first directionality (e.g., a lateral directionality) of a marking input of the input device corresponding to how a mark on the user interface would look having the drawing material of the first drawing implement applied to the user interface. For example, the preview mark optionally indicates that a first marking input including movement in a first direction along the user interface would render a first size of a mark on the user interface, and (optionally, simultaneously) indicates that the first marking input including movement in a second direction, different from the first direction, along the user interface would render a second size, different from the first size, of a mark on the user interface. In some embodiments, the preview mark visually previews how a mark will be drawn (or rendered for display) independent of a direction associated with a marking input provided to the user interface. For example, the preview mark optionally indicates that a first marking input including movement in a first direction along the user interface would render a first size of a mark on the user interface, and (optionally, simultaneously) indicates that the first marking input including movement in a second direction, different from the first direction, along the user interface would also render the first size, optionally due to the pose of the input device (e.g., the input device corresponding to a tip of a drawing implement that has radial symmetry and the input device being oriented, longitudinally, normal to the surface). In some embodiments, the position of the preview mark in the user interface corresponds to the position of the input device (e.g., the position of the tip of the input device) relative to the surface (e.g., the closest position of the surface to the position of the tip of the input device). In some embodiments, the electronic device moves the preview mark in a direction and/or by a magnitude that corresponds to the direction and/or magnitude of the movement of the input device (e.g., the direction and/or magnitude of the movement of the tip of the input device).

In some embodiments, while displaying, via the display generation component, the user interface including the preview mark of the first drawing implement having the first visual appearance, and while the input device has the first pose relative to the surface, the electronic device detects (702f), via the one or more sensors, rotational movement of the input device about the first axis associated with the input device, such as arrow 652b of FIG. 6H, the rotational movement of the input device corresponding to a change in orientation of the input device about the first axis associated with the input device from the first orientation to a second orientation, different from the first orientation. For example, the electronic device optionally detects that the input device is rotating about the roll axis or longitudinal axis of the input device. For example, the electronic device optionally detects that a first longitudinal edge of the input device has changed in position about the first axis (optionally relative to the surface) from a first location to a second location about the first axis (optionally while the pose of the input device relative to the surface remains the same (e.g., the pose of the input device when the first longitudinal edge is at the first location about the first axis is the same as the pose of the input device when the first longitudinal edge is at the second location about the first axis)). The electronic device optionally obtains this rotational movement information via one or more sensors (e.g., of the input device and/or of the electronic device, or of another device), one or more electrodes in the surface, one or more planar surfaces of a physical object (or physical regions) in a physical environment, other defined coordinate systems, other sensors, and/or other input devices (e.g., an input trackpad including a specialized surface that is configured to translate motion and pose information of the input device).

In some embodiments, in response to detecting the rotational movement of the input device about the first axis associated with the input device (e.g., about the roll axis or longitudinal axis of the input device), the electronic device updates (702g) display, via the display generation component, of the user interface to include the preview mark of the first drawing implement having a second visual appearance (e.g., one or more or all of a second degree of coloring (e.g., corresponding to the color of the virtual ink or material corresponding to the first drawing implement), second shape, second orientation, second size, second degree of transparency, second degree of blur, and/or other characteristic of the preview mark), different from the first visual appearance, based on the first pose of the input device and based on the second orientation of the input device about the first axis associated with the input device, such as the preview mark 640 of the highlighter 610 having a respective orientation relative to palette 644 in FIG. 6H, different from the orientation of the preview mark 640 of the highlighter 610 relative to palette 644 in FIG. 6G. In some embodiments, the electronic device displays a corresponding rotation of the preview mark in accordance with the rotational movement of the input device about the first axis associated with the input device. In some embodiments, the corresponding rotation of the preview mark simulates a three-dimensionality of the currently selected drawing implement (e.g., visually indicates that the currently selected drawing implement has rotated about its roll axis (e.g., its longitudinal axis), which is optionally virtual located at the corresponding physical location of the roll axis of the input device). In some embodiments, the preview mark having the second visual appearance visually previews how a mark will be drawn (or rendered for display) based on a direction associated with a marking input provided to the user interface given that the input device (e.g., corresponding to the first drawing implement) has been rotated about its roll axis. In some embodiments, due to the rotation of the input device about its roll axis and the corresponding rotation of the preview mark, the preview mark having the second visual appearance visually indicates a second directionality (e.g., a second lateral directionality) of a marking input of the input device, different from the first directionality described with reference to step 702*e*, corresponding to how a mark on the user interface would look having the drawing material of the first drawing implement applied to the user interface. For example, the preview mark having the second visual appearance optionally indicates that a first marking input including movement in the first direction (e.g., indicated with reference to step 702*e*) along the user interface would render a third size of a mark on the user interface, and (optionally, simultaneously) indicates that the first marking input including movement in the second direction (e.g., indicated with reference to step 702*e* above), different from the first direction, along the user interface would render a fourth size, different from the second size, of a mark on the user interface. In some embodiments, the preview mark having the second visual appearance visually previews how a mark will be drawn (or rendered for display) independent of a direction associated with a marking input provided to the user interface, such as when a tip of the currently selected drawing implement has radial symmetry and the input device is oriented normal to the surface with the tip of the input device corresponding to the tip of the drawing implement optionally being closest of the input device to the surface; in such case, the electronic device optionally forgoes changing the preview mark to have the second visual appearance in response to the rotational movement of the input device while the input device is oriented normal to the surface within the first threshold distance. In some embodiments, in response to a same marking input, such as for the same lateral movement of the input device while the marking input is being detected, the electronic device displays different renderings (e.g., of different sizes, width, sharpness, or other characteristic) of the virtual material of the first drawing implement applied to the user interface based on whether the marking input is detected while the preview mark has the first visual appearance or the second visual appearance. In some embodiments, the electronic device continues displaying the preview mark during detection of the marking input. In some embodiments, the second orientation is the same as the first orientation, such as when the rotational movement of the input device about the first axis is one or more full revolutions about the first axis. In some embodiments, when the second orientation is the same as the first orientation, the second visual appearance is the same as the first visual appearance. In some embodiments, the second orientation is different from the first orientation (e.g., different by 180 degrees), the preview mark is symmetrical across an axis that goes through a center of the preview mark and that is parallel to a length or width of the preview mark, and when the rotational movement of the input device about the first axis is one or more half revolutions about the first axis (e.g., 0.5, 1.5, 2.5, or 3.5 revolutions), the second visual appearance is the same as the first visual appearance. Displaying a preview mark of the currently selected drawing implement for an input device having a first visual appearance based on a pose and orientation of the input device and changing the visual appearance of the preview mark based on rotation of the input device about an axis associated with the input device provides an indication of the pose and orientation of the currently selected drawing implement, a distance to the surface, and/or a distance to a target user interface element and enables the user to precisely place the input device relative to the surface, thereby reducing errors in the interaction between the input device and/or the surface and reducing inputs needed to correct such errors.

In some embodiments, in response to detecting the first pose of the input device relative to the surface and the first orientation of the input device about the first axis associated with the input device, in accordance with the determination that the first pose of the input device relative to the surface includes the input device being within a second threshold distance (e.g., the same as or different from the first threshold distance, at 0 cm or in contact with the surface, or hovering over (and not in contact with) the surface at 0.01, 0.05, 0.1, 0.2, 0.5, 0.8, 1, 3, 5, 10, 30, 50 or 100 cm, or another threshold distance) of the surface and that the currently selected drawing implement for the input device (e.g., virtual drawing implement corresponding to the physical input device) is the first drawing implement (e.g., the pen, the pencil, the crayon, the eraser, the highlighter, the paint brush, or the other type of drawing implement), the electronic device updates display, via the display generation component, of the user interface.

In some embodiments, the user interface is updated to include the preview mark of the first drawing implement, wherein the preview mark has the first visual appearance (e.g., one or more or all of the first position on the user interface, first degree of coloring (e.g., corresponding to the color of the virtual ink or material corresponding to the first drawing implement), first shape, first orientation, first size, first degree of transparency, first degree of blur, and/or other characteristic of the preview mark) in the user interface (e.g., based on the first pose of the input device relative to the surface and based on the first orientation of the input device about the first axis associated with the input device), such as the preview mark 640 of the highlighter 610 having a respective orientation relative to palette 644 in FIG. 6G.

In some embodiments, the user interface is updated to include a representation of a virtual shadow of the first drawing implement, wherein the representation of the virtual shadow is different from the preview mark, the representation of the virtual shadow having a third visual appearance (e.g., one or more or all of a third position on the user interface, third degree of coloring (e.g., a third degree of darkness or greyness or another color that corresponds to that of the shadow), third shape, a third orientation, third size, third degree of transparency, third degree of blur, and/or other characteristic of the virtual shadow), in the user interface based on the first pose of the input device relative to the surface and based on the first orientation of the input device about the first axis associated with the input device, and wherein the representation of the virtual shadow includes a first portion corresponding to a tip of the first drawing implement, such as the portion 632*b* of the highlighter 610 in FIG. 6G mark 640 (e.g., the chisel tip, bullet tip, fine point tip, the hair of a paint brush, or the nib including the shape and/or size of the nib of the first drawing implement, or another structural component of the first drawing implement that corresponds to the tip of the first drawing implement); In some embodiments, the currently selected drawing implement is of a similar or different appearance than the physical appearance of the input device. For example, the input device is a physical stylus having a physical rubber (or other material) tip and the first drawing implement is optionally a virtual wooden pencil having a sharp (e.g., pointed) pencil tip, and the representation of the virtual shadow optionally visually includes an appearance of a shadow that conforms to that of the sharp pencil tip rather than that of the physical rubber tip of the input device (e.g., the appearance of the shadow includes a pointed tip rather than a more rounded tip). As such, the electronic device optionally can correspond the input device to any type of drawing implement and can cause display on the user interface of features and functionalities of the currently selected drawing implement, such as causing display of a representation of the virtual shadow of the first drawing implement having an appearance that corresponds to a shadow of the first drawing implement rather than to a shadow of the size and shape of the physical input device. Further, the currently selected drawing implement is optionally of a similar or different size than the size of the input device (e.g., greater than, less than, or the same). For example, the electronic device optionally displays the representation of the virtual shadow at a first position on the user interface based on the pose and orientation information of the input device. In some embodiments, the position and/or visual appearance of the representation of the virtual shadow corresponding to the input device is as if one or more external light sources at one or more positions relative to the electronic device are shining onto the input device and/or surface (e.g., as if the light is incident normal to the surface and the input device is obstructing at least some of the light that would be incident normal to the surface), and resulting in the representation of virtual shadow being displayed (e.g., which would correspond to the obstruction of the light that is due to the first drawing implement). For example, the first portion optionally indicates a projection (e.g., a shadow projection) of the tip of the currently selected drawing implement based on the first pose of the input device relative to hypothetical light source(s) that emit light onto the surface normal to the surface. For example, when the first pose of the input device relative to the hypothetical light source(s) that emit light onto the surface normal to the surface corresponds to a shadow projection of the tip that is of a first size and first shape, the user interface optionally displays the first portion having the first size and first shape (and optionally, other features of the third visual appearance described above, such as the first degree of blurriness), and when the first pose of the input device relative to the hypothetical light source(s) that emit light onto the surface normal to the surface corresponds to a shadow projection of the tip that is a second size and second shape, different from the first size and first shape, the user interface optionally displays the first portion having a second size and second shape (and optionally, other features of the third visual appearance described above), different from the first size and first shape. In some embodiments, the color of the shadow is based on the color of the hypothetical light. For example, when the hypothetical light is white light, the electronic device optionally displays the representation of the virtual shadow (e.g., first portion) having a first color (e.g., being of a first color) and when the hypothetical light is different from white light, the electronic device optionally displays the representation of the virtual shadow (e.g., first portion) having a second color (e.g., being of second first color) different from the first color. In some embodiments, at least a portion of the representation of the virtual shadow (e.g., the first portion) and the preview mark overlap on the user interface. In some embodiments, at least a portion of the representation of the virtual shadow (e.g., the first portion) completely overlaps with the preview mark. In some embodiments, at least a portion of the representation of the virtual shadow (e.g., the first portion) does not completely overlap with the preview mark. In some embodiments, the first portion corresponding to the tip of the currently selected drawing implement visually indicates one or more of proximity of the input device to the surface and/or proximity of the tip of the input device to the surface, where a mark will be drawn (or rendered for display) by the user interface if and/or when the input device provides a marking input to the user interface (e.g., movement of the input device while the tip of the input device is in contact with the surface), a size of the tip of the currently selected drawing implement, and/or how a mark will be drawn (or rendered for display) by the user interface if and/or when the input device provides a marking input to the user interface (e.g., movement of the input device while the tip of the input device is in contact with the surface). In some embodiments, the preview mark visually indicates how a mark will be drawn (or rendered for display) by the user interface if and/or when the input device provides a marking input to the user interface (e.g., movement of the input device while the tip of the input device is in contact with the surface) while the first portion does not visually indicate how the mark will be drawn (or rendered for display) by the user interface if and/or when the input device provides a marking input to the user interface (e.g., movement of the input device while the tip of the input device is in contact with the surface).

In some embodiments, in response to detecting the rotational movement of the input device about the first axis associated with the input device (e.g., about the roll axis or longitudinal axis of the input device), the electronic device updates display, via the display generation component, of the user interface to include the preview mark of the first drawing implement having the second visual appearance (e.g., based on the first pose of the input device and based on the second orientation of the input device about the first axis associated with the input device), and the representation of the virtual shadow of the first drawing implement having a fourth visual appearance (e.g., one or more or all of a fourth position on the user interface, fourth degree of coloring (e.g., a fourth degree of darkness or greyness or another color that corresponds to that of the shadow), fourth shape, a fourth orientation, fourth size, fourth degree of transparency, fourth degree of blur, and/or other characteristic of the virtual shadow), different from the third visual appearance, based on the first pose of the input device and based on the second orientation of the input device about the first axis associated with the input device, such as the change in visual appearance of the portion 632b from FIG. 6G to FIG. 6H. In some embodiments, the second visual appearance and/or the fourth visual appearance are different from the first visual appearance and/or the third visual appearance in one or more or all respects, respectively. For example, when the electronic device detects rotational movement of the input device about the first axis (e.g., has detected movement of the input device that only includes rotational movement of the input device about the first axis), without detecting another type of movement of the input device (e.g., without a change in distance between the input device and the surface and/or a change in lateral position of the input device relative to the surface), (and, optionally, the pose of the input device is not longitudinally normal to the surface) and the tip of the first drawing implement does not have radial symmetry, the electronic device optionally updates display of the representation of the virtual shadow (e.g., the first portion) to have a change in shape, orientation, and/or size, and optionally updates the preview mark to have a change in orientation (e.g., rotated on the user interface), but optionally not a change in size, as optionally the distance between the tip of the input device and the surface (e.g., the distance between the closest position of the tip and the surface) has not changed. In some embodiments, the electronic device updates the representation of the virtual shadow (e.g., first portion) and the preview mark differently. For example, in response to detecting the rotational movement, and optionally in accordance with a distance between the tip of the input device and the surface not changing in response to the rotational movement, the electronic device optionally updates the degree of color of the virtual shadow (e.g., such as if the tip of the first drawing implement does not have radial symmetry), but forgoes updating the degree of color of the preview mark (e.g., maintains the same degree of color of the preview mark as in the third visual appearance). In some embodiments, such as when the tip of the first drawing implement has radial symmetry, in response to detecting the rotational movement, the electronic device forgoes displaying the representation of the virtual shadow (e.g., first portion) with the fourth visual appearance, continues displaying the representation of the virtual shadow (e.g., first portion) with the third visual appearance, and displays the preview mark with the second visual appearance. For example, when the electronic device detects rotational movement of the input device about the first axis (e.g., optionally has detected movement of the input device that only includes rotational movement of the input device about the first axis), without detecting another type of movement of the input device (e.g., without a change in distance between the input device and the surface and/or a change in lateral position of the input device relative to the surface), and the tip of the first drawing implement has radial symmetry, the electronic device optionally forgoes updating display of the representation of the virtual shadow (e.g., first portion) to have the fourth visual appearance, continues displaying the representation of the virtual shadow (e.g., first portion) with the third visual appearance, and updates the preview mark to have the second visual appearance (e.g., a change in orientation, optionally without a change in degree of color and/or without a change in another second other characteristic of the preview mark, as optionally the distance between the tip and the surface has not changed because the tip of the first drawing implement has radial symmetry). In some embodiments, the electronic device detects rotational movement of the input device about the first axis in addition to detecting other movements of the input device (e.g., translational movement of the input device in within the threshold and/or other rotations of the input device about one or more other axes different from the first axis) corresponds to a change in pose of the input device from the first pose to a second pose, and in response, the electronic device displays the preview mark having the second visual appearance, based on the second pose and the second orientation of the input device about the first axis associated with the input device. In some embodiments, the second orientation is the same as the first orientation, such as when the rotational movement of the input device about the first axis is one or more full revolutions about the first axis. In some embodiments, when the second orientation is the same as the first orientation, the second visual appearance is the same as the first visual appearance and the fourth visual appearance is the same as the third visual appearance. Displaying a preview mark of the currently selected drawing implement for an input device having a first visual appearance and a virtual shadow, of the first drawing implement, including first portion corresponding to a tip of the first drawing implement, having a third visual appearance based on a pose and orientation of the input device and changing the visual appearance of the preview mark and of the virtual shadow based on rotation of the input device about an axis associated with the input device provides an additional indication of the pose and orientation of the currently selected drawing implement, a distance to the surface, and/or a distance to a target user interface element and enables the user to precisely place the input device relative to the surface, thereby reducing errors in the interaction between the input device and/or the surface and reducing inputs needed to correct such errors.

In some embodiments, the representation of the virtual shadow further includes a second portion corresponding to a barrel of the first drawing implement (e.g., a body or barrel of the pen, the pencil, the crayon, the eraser, the highlighter, the paint brush, or the other type of drawing implement that is the currently selected drawing implement for the input device), such as the portion 632a of the highlighter 610 in FIG. 6G. As such, the representation of the virtual shadow optionally includes the first portion corresponding to the tip of the first drawing implement and the second portion corresponding to the barrel of the first drawing implement. In some embodiments, when the representation of the virtual shadow has the third visual appearance, the representation of the virtual shadow includes both the first portion and the second portion having a first set of visual characteristics having first values, and when the representation of the virtual shadow has the fourth visual appearance, the representation of the virtual shadow includes both the first portion and the second portion having the first set of visual characteristics having second values, different from the first values. As such, the visual appearance of the first portion and the second portions optionally changes in response to the electronic device detecting the rotational movement. In some embodiments, the visual appearance of the first portion changes without the visual appearance of the second portion changing in response to the rotational movement of the input device, such as when the barrel of the currently selected drawing implement for the input device has radial symmetry, and the tip of the currently selected drawing implement for the input device does not have radial symmetry. When the input device is determined to be within the second threshold distance of the surface, the user interface optionally includes both an indication of the first portion corresponding to the tip of the currently selected drawing implement and an indication of the second portion corresponding to the barrel of the currently selected drawing implement. In some embodiments, the indication of the second portion corresponding to the barrel of the currently selected drawing implement indicates one or more of a distance of the input device relative to the surface, an orientation of the input device relative to the surface, and/or a tilt of the input device relative to the surface. In some embodiments, the indication of the first portion corresponding to the tip of the currently selected drawing implement indicates one or more of proximity of the input device to the surface and/or where a mark will be drawn (or rendered for display) by the user interface if and/or when the input device provides a marking input to the user interface (e.g., movement of the input device while the tip of the input device is in contact with the surface). In some embodiments, the representation of the virtual shadow including the first portion and the second portion is not shown (e.g., because a user interface of an application installed on the electronic device already presents a visual indication of the input device, because a user interface of an application installed on the electronic device does not support (e.g., is not configured to) present the representation of the virtual shadow, and/or because the input device is outside the threshold distance of the surface). In some embodiments, only a portion of the second portion corresponding to the barrel of the currently selected drawing implement for the input device is included in the user interface, and not the entire second portion corresponding to the barrel of the currently selected drawing implement for the input device. In some embodiments, the user interface includes the second portion corresponding to the barrel of the currently selected drawing implement for the input device but not the second portion. In some embodiments, the user interface includes the first portion corresponding to the tip of the currently selected drawing implement for the input device but not the second portion. In some embodiments, the representation of the virtual shadow fades out and/or blurs towards the end of the first drawing implement opposite the tip (e.g., shadow increasingly fades out and/or blurs as the distance between respective portions of the input device and the surface increases). In some embodiments, the electronic device displays the representation of the shadow being updated in accordance with the changes in orientation of the input device about the first axis during actual drawing/ writing, optionally without displaying the preview mark. By presenting a virtual shadow having two distinct portions, the electronic device enables the user to precisely place the input device relative to the surface and know the type and/or characteristics of the virtual drawing implement before providing input for a mark on the user interface, thereby reducing errors in the interaction between the input device and/or the surface and reducing inputs needed to correct such errors.

In some embodiments, displaying the representation of the virtual shadow with the third visual appearance includes displaying the representation of the virtual shadow with a first shape, such as the shape of either or both the portions 632a/632b in FIG. 6Q, and displaying the representation of the virtual shadow with the fourth visual appearance includes displaying the representation of the virtual shadow with a second shape, different from the first shape, such as the shape of either or both portions 632a/632b in FIG. 6R. As such, rotating the input device about the first axis optionally results in a change in shape of the virtual shadow (e.g., a change in shape of the first portion and/or the second portion of the virtual shadow), which optionally indicates to a user whether or not the currently selected implement for the input device has a tip that has radial symmetry and/or whether or not the currently selected implement for the input device has a barrel that has radial symmetry. For example, when the currently selected implement for the input device has a tip that does not have radial symmetry, in response to rotating the input device about the first axis, the first portion optionally changes in shape; when the currently selected implement for the input device has a barrel that does not have radial symmetry, in response to rotating the input device about the first axis, the second portion optionally changes in shape; when the currently selected implement for the input device has a tip and a barrel that does not have radial symmetry, in response to rotating the input device about the first axis, the first portion and the second portion optionally change in shape, optionally in different ways (e.g., to two different shapes), based on the characteristics of the currently selected drawing implement for the input device. Displaying a virtual shadow for the input device that changes in shape based on the rotation of the input device about the first axis associated with the input device provides an indication of an orientation of the currently selected drawing implement, and enables the user to precisely orient the input device to get a desired orientation of the currently selected drawing implement, thereby reducing errors in the interaction between the input device and/or the surface and reducing inputs needed to correct such errors.

In some embodiments, while displaying the user interface including the preview mark of the first drawing implement having the second visual appearance (e.g., based on the first pose of the input device and based on the second orientation of the input device about the first axis associated with the input device) and the representation of the virtual shadow of the first drawing implement having the fourth visual appearance (e.g., based on the first pose of the input device and based on the second orientation of the input device about the first axis associated with the input device) after detecting the rotational movement of the input device about the first axis associated with the input device, the electronic device detects, via the one or more sensors, a second movement of the input device, different from the rotational movement of the input device about the first axis associated with the input device, wherein the second movement of the input device changes a pose of the input device from the first pose to a second pose, different from the first pose, relative to the surface, such as the movement indicated by arrow 656 in FIG. 6J. For example, the second movement optionally includes a rotation of the input device about the tip of the input device or about another portion of the input device, a movement that changes an orientation of the first axis associated with the input device in the physical environment from a first respective orientation to a second respective orientation different from the first respective orientation, and/or a translational movement of input device parallel to a plane of the user interface that changes a position of the input device relative to the surface.

In some embodiments, in response to detecting the second movement of the input device, in accordance with a determination that the second pose relative to the surface includes the input device being within the second threshold distance of the surface, the electronic device updates display, via the display generation component, of the user interface to include the representation of the virtual shadow (e.g., the first and/or second portion) having a fifth visual appearance (e.g., based on the second pose of the input device relative to the surface), different from the third visual appearance (and optionally the same as or different from the fourth visual appearance). For example, as shown from FIG. 6J to 6K, in response to the movement input in FIG. 6J, device 500 optionally changes the orientation of the portions 632*a/*632*b* (e.g., changes the visual appearance of the portions 632*a/*632*b* on user interface 690) to correspond to the new pose of the input device 600 illustrated in FIG. 6K. In some embodiments, in response to detecting the second movement of the input device, the electronic device updates the user interface to include the preview mark of the first drawing implement changing in visual appearance, such as described with reference to step(s) 702, in addition to the representation of the virtual shadow changing in visual appearance. In some embodiments, the third visual appearance is of a first respective shape and the fifth visual appearance is of second respective shape different from the first respective shape. As such, the electronic device optionally changes the visual appearance of the representation of the virtual shadow (e.g., the first and/or second portion) in response to detecting movement that is different from rotational movement of input device about the first axis associated with the input device. Displaying a virtual shadow for the input device that changes in visual appearance based on movement of the input device that changes the pose of the input device relative to the surface provides an indication of an orientation of the currently selected drawing implement, and enables the user to precisely orient the input device to get a desired orientation of the currently selected drawing implement, thereby reducing errors in the interaction between the input device and/or the surface and reducing inputs needed to correct such errors.

In some embodiments, the tip of the first drawing implement, to which the first portion of the representation of the virtual shadow corresponds, does not have radial symmetry, and a difference in visual appearance between the third visual appearance and the fourth visual appearance visually indicates that the tip of the first drawing implement (e.g., the tip of the currently selected drawing implement for the input device) does not have radial symmetry, such as shown from FIG. 6G to 6H with the difference in visual appearance of the portion 632*b* of the highlighter 610 in accordance with rotational movement. For example, the tip of the first drawing implement is optionally a fan brush tip or a chisel tip, or another tip that does not have radial symmetry and the third visual appearance is of a different shape than the fourth visual appearance due to the tip of the first drawing implement not having radial symmetry. Therefore, as the input device is rotated about the first axis, the first portion optionally changes in visual appearance if the tip of the first drawing implement does not have radial symmetry. As such, changes in the visual appearance of the virtual shadow optionally visually indicate whether the currently selected drawing implement for the input device has radial symmetry (e.g., whether the tip and/or whether the barrel of the currently selected drawing implement for the input device has radial symmetry). In some embodiments, when the virtual shadow includes the second portion, the difference indicates whether the barrel of the currently selected drawing implement has radial symmetry. Displaying a virtual shadow for the input device that changes in visual appearance based on the rotation of the input device about the first axis associated with the input device provides an indication of whether the tip of the currently selected drawing implement has radial symmetry, and enables the user to precisely orient the input device to get a desired orientation of the tip of the currently selected drawing implement, thereby reducing errors in the interaction between the input device and/or the surface and reducing inputs needed to correct such errors.

In some embodiments, the electronic device detects, via the one or more sensors, an input corresponding to a request to change the currently selected drawing implement from the first drawing implement to a second drawing implement (e.g., a pen, a pencil, a crayon, an eraser, a highlighter, a paint brush, or another type of drawing implement), different from the first drawing implement, such as shown in FIG. 6P with the tip of the input device 600 being directed to fan brush 612 while the highlighter 610 is the currently selected drawing implement. In some embodiments, the input is a gesture detected on the input device (a tap or double tap on the surface of the input device as opposed to a tap of the input device on the surface associated with the user interface). In some embodiments, the input is a selection input (e.g., a tap) detected on the surface associated with the user interface (e.g., directed to a representation of the second drawing implement included in the user interface).

In some embodiments, in response to detecting the input corresponding to the request to change the currently selected drawing implement from the first drawing implement to the second drawing implement, the electronic device associates the currently selected drawing implement with the second drawing implement, such as shown from FIG. 6P to FIG. 6Q in the change from highlighter 610 as the selected drawing implement (e.g., as indicated by palette 644 in FIG. 6P) to the fan brush 612 (e.g., as indicated by palette 644 in FIG. 6Q). For example, the electronic device changes the currently selected drawing implement from the first drawing implement to the second drawing implement.

In some embodiments, in accordance with a determination that the input device has a third pose (e.g., optionally the same as or different from one or both of the first pose and second pose) relative to the surface and the third pose includes the input device being with a third threshold distance (that is optionally the first, second, or another threshold distance), and in accordance with a determination that the input device has a third orientation (e.g., optionally the same as or different from the first orientation and/or the second orientation) about the first axis associated with the input device, the electronic device updates display, via the display generation component, of the user interface to include a second preview mark of the second drawing implement, wherein the second preview mark has a fifth visual appearance (e.g., one or more or all of a fifth position on the user interface, fifth degree of coloring (e.g., corresponding to the color of the virtual ink or material corresponding to the first drawing implement), fifth shape, fifth orientation, fifth size, fifth degree of transparency, fifth degree of blur, and/or other characteristic of the second preview mark) in the user interface based on the third pose of the input device relative to the surface and based on the third orientation of the input device about the first axis associated with the input device, such as the preview mark 640 of the fan brush 612 in FIG. 6Q. The second preview mark is optionally different from the first preview mark of the drawing implement (e.g., because the second drawing implement is different from the first drawing implement).

In some embodiments, the user interface is updated to include a second representation of a virtual shadow of the second drawing implement, wherein the second representation of the virtual shadow is different from the second preview mark of the second drawing implement and is different from the representation of the virtual shadow of the first drawing implement, wherein the second representation of the virtual shadow of the second drawing implement has a sixth visual appearance (e.g., one or more or all of a sixth position on the user interface, sixth degree of coloring (e.g., a third degree of darkness or greyness or another color that corresponds to that of the shadow), sixth shape, a sixth orientation, sixth size, sixth degree of transparency, sixth degree of blur, and/or other characteristic of the virtual shadow), based on the third pose of the input device relative to the surface and based on the third orientation of the input device about the first axis associated with the input device, and wherein the second representation of the virtual shadow of the second drawing implement includes a first portion corresponding to a tip of the second drawing implement, such as the portion 632*b* of the fan brush 612 of FIG. 6Q (e.g., a chisel tip, bullet tip, fine point tip, the hair of a paint brush, or the nib including the shape and/or size of the nib of the first drawing implement, or another structural component of the first drawing implement that corresponds to the tip of the first drawing implement) and optionally a second portion corresponding to a barrel of the second implement, such as described above. The first portion of the shadow of the second drawing implement is optionally different from the first portion of the shadow of the first drawing implement optionally because the shadows correspond to different drawing implements. The respective behaviors (e.g., visual appearance and/or changes in visual appearance in response to rotational movement about the first axis of the input device, threshold distances for displaying the preview mark and/or virtual shadow, movements of the input device that changes a pose of the input device relative to the surface) described herein with reference to the preview mark of the first drawing implement and the representation of the virtual shadow of the first drawing implement are optionally likewise applicable (e.g., in a corresponding manner) to the second preview mark of the second drawing implement and the second representation of the virtual shadow of the second drawing implement. In some embodiments, the second preview mark of the second drawing implement and the second representation of the virtual shadow of the second drawing implement are the same in visual appearance as the preview mark of the first drawing implement and the representation of the virtual shadow of the first drawing implement. Applying similar (e.g., the same) behavior of a respective preview mark and/or a respective virtual shadow between different preview marks and/or different virtual shadows of different currently selected drawing implements for the input device provides consistency of functionality of the input device between different drawing implements and thereby reducing errors in the interaction between the input device and/or the surface and reducing inputs needed to correct such errors.

In some embodiments, when the preview mark has the first visual appearance based on the first pose of the input device and on the first orientation of the input device about the first axis, the preview mark is displayed at a first region on the user interface without being displayed at a second region on the user interface, and when the representation of the virtual shadow has the third visual appearance based on the first pose of the input device and on the first orientation of the input device about the first axis, the representation of the virtual shadow is displayed at the first region and at the second region on the user interface. For example, as shown in FIG. 6Q, a part of the portion 632*b* of the fan brush 612 overlays a portion of the preview mark 640 of the fan brush 612 in FIG. 6Q. As such, the representation of the virtual shadow optionally includes a portion that overlays the preview mark. In some embodiments, the overlay is changed in size and/or appearance based on detected changes in pose of the input device and/or detected changes in orientation of the input device relative to the first axis. In some embodiments, the first visual appearance of the preview mark includes a first color. In some embodiments, when the preview mark has the first visual appearance based on the first pose of the input device and on the first orientation of the input device about the first axis, the preview mark is displayed at the first region on the user interface and at a third region on the user interface, different from the second region of the interface. In some embodiments, when the representation of the virtual shadow has the third visual appearance based on the first pose of the input device and on the first orientation of the input device about the first axis, the representation of the virtual shadow is not displayed at the third region of the user interface. In some embodiments, the first region visually indicates the first color being of a first color density. In some embodiments, the third region visually indicates the first color being of a second color density less than the first color density. As such, when the representation of the shadow overlays the preview mark, the overlay is optionally denser in color (e.g., less bright and/or more opaque) than other portions of the preview mark that are not within the overlay. Displaying an overlay between the virtual shadow and the preview mark provides an indication of the pose and orientation of the currently selected drawing implement, especially of the tip of the currently selected drawing implement, a distance to the surface, and/or a distance to a target user interface element and enables the user to precisely place the input device relative to the surface, thereby reducing errors in the interaction between the input device and/or the surface and reducing inputs needed to correct such errors In some embodiments, the user interface includes a first area corresponding to a drawing area (e.g., region 690*a* of FIG. 6M), and a second area (e.g., region 690*b* of FIG. 6M), different from the first area, corresponding to a non-drawing area (e.g., a system UI, a dock, or another type of non-drawing area).

In some embodiments, while the currently selected drawing implement is a respective drawing implement and while displaying the preview mark of the first drawing implement and the representation of the virtual shadow of the respective drawing implement in at least the first area of the user interface, the electronic device detects, via the one or more sensors, third movement of the input device corresponding to movement of the tip of the currently selected drawing implement to the second area of the user interface while the input device is within the second threshold distance of the surface, such as the movement indicated by arrow 656 in FIG. 6M. For example, the electronic device optionally detects that the portion of the input device that corresponds to the tip of the currently selected drawing implement moves from being in contact with or hovering over/above the first area of the user interface to being in contact with or hovering over/above the second area of the user interface. In some embodiments, the representation of the virtual shadow of the respective drawing implement is displayed in the first area and the second area. In some embodiments, the first portion of the representation of the virtual shadow of the respective drawing implement is displayed in the first area and at least a part of the second portion of the representation of the virtual shadow of the respective drawing implement is displayed in the second area.

In some embodiments, in response to detecting the third movement of the input device, in accordance with a determination that the currently selected drawing implement is the first drawing implement and the first drawing implement is a default drawing implement (e.g., a default pen, or another type of drawing implement that is optionally made default by a user of the electronic device or the drawing application), the electronic device continues display, via the display generation component, of the preview mark of the first drawing implement and the representation of the virtual shadow of the first drawing implement. For example, if the default drawing implement was selected when the movement indicated by arrow 656 in FIG. 6M was detected, then the device 500 optionally continues displaying the preview mark of the default drawing implement and the shadow of the default drawing implement.

In some embodiments, in accordance with a determination that the currently selected drawing implement is the first drawing implement and the first drawing implement is not the default drawing implement, the electronic device updates display, via the display generation component, of the user interface to include a preview mark of the default drawing implement (e.g., without including a preview mark of the first drawing implement that is not the default drawing implement) and a representation of a virtual shadow of the default drawing implement (e.g., without including a preview mark of the first drawing implement that is not the default drawing implement), such as shown with the preview mark and shadow portions changing in visual appearance from corresponding to the highlighter 610, as shown in FIG. 6M, and to corresponding to the ball pen, as shown in FIG. 6N, in response to the movement input indicated by arrow 656 in FIG. 6M in FIG. 6M. As such, when the input device moves from being positioned over (e.g., above) the first area to being positioned over (e.g., above) the second area, if the default drawing implement was selected when the third movement input was detected, the electronic device optionally seamlessly continues displaying the preview and shadow of the default drawing implement in the second area, and if default drawing implement is not selected when the third movement is detected, the electronic device optionally displays a preview mark and shadow of the default drawing implement in the second area, instead of the preview mark and shadow of the currently selected drawing implement that is not the default drawing implement. In some embodiments, when the electronic device detects movement of the tip of the currently selected drawing implement from the second area to the first area and the currently selected drawing implement is not the default drawing implement, the electronic device optionally displays the preview mark and virtual shadow of the currently selected drawing implement in the first area. In some embodiments, the second area includes one or more selectable buttons, and when the tip of the input device hovers over a respective button of the one or more selectable buttons, the preview mark optionally conforms (e.g., morphs) to a shape of the respective button (e.g., thereby providing a highlighting effect over and/or around the respective button). In some embodiments, the second area includes one or more selectable buttons and one or more regions that do not include any selectable buttons, and when the tip of the input device hovers over/above a respective region of the one or more regions, the preview mark optionally maintains the shape of the default drawing implement. Displaying a preview mark and virtual shadow of a default drawing implement in the non-drawing area even if the currently selected drawing implement for the input device is not the default drawing implement provides consistency of interaction in the non-drawing area, and optionally reduces errors associated with interaction in the non-drawing area.

In some embodiments, the first threshold distance and the second threshold distance are equal, such as illustrated and described with reference to threshold distance 630 of FIG. 6G. Initiating display of a virtual shadow and preview mark at the same time when the input device is within a threshold distance of the surface reduces inconsistent feedback given to the user, thereby reducing errors in the interaction between the input device and/or the surface and reducing inputs needed to correct such errors.

In some embodiments, the first threshold distance and the second threshold distance are not equal, such as shown by threshold distance 602 and threshold distance 630 in FIG. 6F. For example, the first threshold distance is optionally greater than or less than the second threshold distance. Initiating display of a preview mark when the input device is within a first threshold distance of the surface and initiating display of a virtual shadow when the input device is within a second, different, threshold distance indicates the distance of the input device from the surface, thereby reducing errors in the interaction between the input device and/or the surface, and reducing inputs needed to correct such errors.

In some embodiments, the electronic device displays, via the display generation component, a user interface element (e.g., a toggle, a dial, a slider, the option for controlling whether to display a virtual shadow of the respective drawing implement described below with reference to displaying a preview mark of the respective drawing implement without displaying a virtual shadow of the respective drawing implement, or another type of selectable option) for enabling or disabling display of the representation of the virtual shadow of the first drawing implement, such as user interface element 671 in FIG. 6TT. In some embodiments, the user interface element is displayed in a settings menu and/or as part of a setup or initiation process for configuring, in accordance with user preferences, functionalities of the input device.

In some embodiments, while display of the representation of the virtual shadow of the first drawing implement is enabled and while displaying the user interface element, the electronic device detects, via the one or more sensors, an input directed at the user interface element, such as detecting touch contact (e.g., contact of input device 600 on display generation component 504) in FIG. 6TT directed at user interface element 671. For example, the input optionally includes contact of the tip of the input device with a portion of the surface (or the tip of the input device being within a threshold of the portion of the surface without contacting the surface) that corresponds to a request to display and/or a selection of the user interface element. It should be noted that when the input directed at the user interface element is detected, the display generation component is optionally displaying the virtual shadow or is not displaying the virtual shadow.

In some embodiments, in response to the input directed at the user interface element, the electronic device disables display of the representation of the virtual shadow of the first drawing implement. For example, the first drawing implement is optionally highlighter 610 in FIG. 6X, and shadow portions 632a/632b of highlighter 610 in FIG. 6X would not be displayed in response to the input directed at the user interface element 671 of FIG. 6TT. In some embodiments, when display of the virtual shadow is disabled, the preview mark is also disabled in display. In some embodiments, when display of the virtual shadow is disabled, the preview mark continues to be displayed. In some embodiments, enablement or disablement of display of the preview mark is independent of enablement or disablement of display of the virtual shadow. In some embodiments, the electronic device displays a respective user interface element (e.g., a toggle, a dial, a slider, or another type of selectable option) for enabling or disabling display of the preview mark. In some embodiments, when the display of the virtual shadow is disabled, the electronic device displays the preview mark without displaying the shadow. Additionally, while display of the representation of the virtual shadow of the first drawing implement is disabled and while displaying the user interface element, the electronic device optionally detects, via the one or more sensors, an input directed at the user interface element, and in response to the input, the electronic device enables display of the representation of the virtual shadow of the first drawing implement. In some embodiments, when display of the virtual shadow is enabled, the electronic device displays the virtual shadow with the preview mark. Displaying the user interface element for enabling or disabling display of the representation of the virtual shadow of the first drawing implement provides user control of visual feedback of the virtual shadow and reduces errors associated with interaction with and between the input device and the electronic device.

In some embodiments, in response to detecting the rotational movement of the input device about the first axis associated with the input device (e.g., about the roll axis or longitudinal axis of the input device), in accordance with a determination that the rotational movement of the input device about the first axis associated with the input device is a first amount of roll, such as indicated by and described with reference to glyph 654*d* of FIG. 6R, the second visual appearance of the preview mark of the first drawing implement includes a first visual characteristic, such as the orientation of the preview mark 640 of the fan brush 612 in FIG. 6R (and optionally, the fourth visual appearance of the virtual shadow includes a fourth visual characteristic). In some embodiments, the first visual characteristic is a respective orientation of the preview mark having a first value on the user interface (e.g., a preview mark without radial symmetry on the user interface being oriented at 0, 5, 10, 15, 20, 50, 60 degrees, or another orientation relative to an axis on the user interface, or another type of visual characteristic), and in response to the electronic device detecting the first amount of roll, the electronic device displays the preview mark having the respective orientation of the preview mark having the first value, different from an orientation of the preview mark before the first amount of roll was detected. In some embodiments, the first visual characteristic is a first size or first shape, and in response to the electronic device detecting the first amount of roll, the electronic device displays the preview mark with the first size and/or first shape, different from a size or shape of the preview mark before the first amount of roll was detected.

In some embodiments, in accordance with a determination that the rotational movement of the input device about the first axis associated with the input device is a second amount of roll, such as indicated by and described with reference to glyph 654*e* of FIG. 6S, different from the first amount of roll, the second visual appearance of the preview mark of the first drawing implement includes a second visual characteristic without including the first visual characteristic, such as the orientation of the preview mark 640 of the fan brush 612 in FIG. 6S (and optionally, the fourth visual appearance of the virtual shadow includes a fifth visual characteristic without including the fourth visual characteristic). In some embodiments, the second visual characteristic is the respective orientation of the preview mark having a second value on the user interface (e.g., a preview mark without radial symmetry on the user interface being oriented at 0, 5, 10, 12, 15, 20, 50, 60, 70 degrees, or another orientation relative to an axis on the user interface, or another type of visual characteristic, different from the respective orientation of the preview mark having the first value), and in response to the electronic device detecting the second amount of roll, the electronic device displays the preview mark having the respective orientation of the preview mark having the second value, different from an orientation of the preview mark before the second amount of roll was detected. In some embodiments, the second visual characteristic is a second size or second shape, and in response to the electronic device detecting the second amount of roll, the electronic device displays the preview mark with the second size and/or second shape, different from a size or shape of the preview mark before the second amount of roll was detected. As such, the electronic device optionally changes the visual appearances of the preview mark and the virtual shadow by amounts that reflect the change in orientation of the input device about the first axis, as the change in orientation of the input device about the first axis, causes a change (e.g., optionally an equal change) in orientation of the currently selected drawing implement for the input device. Displaying the preview mark with different visual characteristics indicates an orientation of the currently selected drawing implement for the input device and further provides guidance to the user of the electronic device for how to orient the input device to acquire a desire orientation of the currently selected drawing implement for providing a corresponding desired mark on the user interface using the input device.

In some embodiments, displaying the preview mark of the first drawing implement with the first visual appearance includes displaying the preview mark with a first respective orientation relative to a reference (e.g., a reference line or object, a horizontal, a vertical, or another type of reference, such as gravity) in the user interface, such as the preview mark 640 of the highlighter 610 having a respective orientation relative to palette 644 in FIG. 6G, and displaying the preview mark of the first drawing implement with the second visual appearance includes displaying the preview mark with a second respective orientation, different from the first respective orientation, relative to the reference in the user interface, such as the preview mark 640 of the highlighter 610 having a respective orientation relative to palette 644 in FIG. 6H. As such, the electronic device optionally rotates (e.g., by 2, 5, 10, 16, 30, 45, 60, 75, 120 degrees, or another by another amount) the preview mark on the user interface in response to detecting the rotational movement of the input device about the first axis. In some embodiments, the direction of rotation of the preview mark corresponds to the direction of rotation of the input device about the first axis. For example, when the input device rotates in a first direction about the first axis, the electronic device causes the preview mark to rotation in a corresponding first direction (e.g., clockwise or counterclockwise) on the user interface, and when the input device rotates in a second direction about the first axis (e.g., opposite the first direction about the first axis), the electronic device causes the preview mark to rotate in a corresponding second direction on the user interface (e.g., opposite the first direction on the user interface). In some embodiments, the amount of rotation of the preview mark is the same as the amount of rotation of the input device. For example, a 50-degree rotation of the input device about the first axis optionally results in a 50-degree rotation of the preview mark (e.g., the second visual appearance is the first visual appearance rotated by 50 degrees or the second respective orientation is the first respective orientation rotated by 50 degrees). Displaying the preview mark rotated in response to the rotational movement of the input device about the first axis indicates an orientation of the currently selected drawing implement for the input device and further provides guidance to the user of the electronic device for how to orient the input device to acquire a desire orientation of the currently selected drawing implement for providing a corresponding desired mark on the user interface using the input device.

In some embodiments, while displaying the preview mark of the first drawing implement in the user interface (and while the input device is within the relevant threshold distance (e.g., of the user interface and/or of the surface)), in accordance with a determination that the input device is at a first distance from the surface, the preview mark of the first drawing implement is displayed at a first size on the user interface, and in accordance with a determination that the input device is at a second distance, different from the first distance, from the surface, the preview mark of the first drawing implement is displayed at a second size, different from the first size, on the user interface, such as shown in the difference of size of the preview mark 640 of the highlighter 610 in FIGS. 6E and 6F due to the difference in distance between surface of touch screen 504 and input device 600 in FIGS. 6E and 6F (e.g., as indicated in glyphs 604 in FIGS. 6E and 6F). In some embodiments, the electronic device increases a size of the preview mark (e.g., and/or increases a color density of the preview mark) as the distance between the input device and the surface decreases. In some embodiments, the electronic decreases a size of the preview mark (and/or decreases a color density of the preview mark) as the distance between the input device and the surface increases. In some embodiments, the electronic device increases a size of the preview mark (e.g., and/or increases a color density of the preview mark) as the distance between the input device and the surface increases. In some embodiments, the electronic decreases a size of the preview mark (and/or decreases a color density of the preview mark) as the distance between the input device and the surface decreases. As such, the electronic device optionally changes the size of the preview mark when the electronic device detects a change in distance between the input device and the surface. Displaying the preview mark of the first drawing implement having different sizes at different distances between the input device and the surface visually indicates to the user a distance between the input device and the surface, thereby reducing errors in the interaction between the input device and/or the surface and reducing inputs needed to correct such errors.

In some embodiments, the user interface includes a first area corresponding to a drawing area (e.g., region 690a of FIG. 6M), and the currently selected drawing implement for the input device is a respective drawing implement, such as the highlighter 610 in FIG. 6D.

In some embodiments, while displaying the user interface via the display generation component, the electronic device detects, via the one or more sensors, the input device within the first threshold distance (e.g., at 0 cm or in contact with the surface, or hovering over (and not in contact with the surface at 0.01, 0.05, 0.1, 0.2, 0.5, 0.8, 1, 3, 5, 10, 30, 50 or 100 cm, or another threshold distance) of the surface, such as with threshold distance 602 of surface of touch screen 504 in FIG. 6F.

In some embodiments, in response to detecting the input device within the first threshold distance of the surface, in accordance with a determination that the input device is positioned at least partially over the first area, the electronic device updates display, via the display generation component, of the user interface to include a respective preview mark of the respective drawing implement in the first area, without displaying a respective representation of a virtual shadow of the respective drawing implement, based on one or more user-defined settings for the first area, such as shown in FIG. 6D with the user interface 690 including the preview mark 640 of the highlighter 610 without including a simulated shadow of the highlighter 610. For example, the electronic device optionally displays the preview mark without displaying the shadow based on settings set to display the preview mark while the input device is in (e.g., in contact with or hovering over/above) the drawing area of the user interface without displaying the shadow while the input is in the drawing area. In some embodiments, the electronic device displays the preview mark without displaying the virtual shadow based on settings (e.g., user configurable settings). For example, the electronic device optionally presents an option (e.g., a user interface element, a toggle, a dial, a slider, or another type of selectable option) for controlling whether to display a virtual shadow of the respective drawing implement, and in accordance with a determination that the option is in a state corresponding to display of the virtual shadow in the drawing area, the electronic device optionally displays the virtual shadow, and in accordance with a determination that the option is in a state corresponding to a forgoing of display of the virtual shadow, the electronic device optionally forgoes display of the virtual shadow in the drawing area. For example, the user interface optionally includes the first area corresponding to the drawing area and a second area corresponding to a non-drawing area, and the electronic device optionally detects settings (e.g., user configurable settings) set to display the preview mark while the input device is in the drawing area (e.g., while a portion of the input device corresponding to a tip of the input device is in contact with or hovering over the drawing area) without displaying the shadow while the input device is in the drawing area. In some embodiments, the electronic device displays a preview mark and a virtual shadow of the currently selected drawing implement while detecting a marking input (e.g., a drawing input based on the pose and orientation of the input device). For example, while the marking input is being received (e.g., at the surface), the electronic device optionally displays both the preview mark and the virtual shadow of the currently selected drawing implement. In some embodiments, the electronic device displays a virtual shadow of the currently selected drawing implement without displaying a preview mark of the currently selected drawing implement while detecting a marking input (e.g., a drawing input based on the pose and orientation of the input device). Displaying the preview mark of the first drawing implement without displaying a virtual shadow of the first drawing implement reduces an amount of user interface elements on the user interface thus reducing cluttering of user interface elements on the user interface and errors associated with cluttering a user interface.

In some embodiments, while the input device has the first pose and the second orientation about the first axis associated with the input device (and, optionally, while the preview mark of the first drawing implement has the second visual appearance based on the first pose of the input device and the second orientation of the input device about the first axis associated with the input device), such as the pose and orientation of the input device 600 in FIG. 6GG, and while the user interface indicates that the first drawing implement currently has a first respective orientation with respect to the user interface (e.g., with respect to a reference in the user interface and/or with respect to a portion of the surface that corresponds to the user interface) based on the second orientation of the input device about the first axis associated with the input device, such as the user interface 690 in FIG. 6GG the electronic device detects, via the one or more sensors, an event (e.g., a gesture (e.g., performed via a hand of the user directed to the input device), such as a squeeze gesture or double tap gesture on the input device or an input detected at the electronic device, or another type of event or input) corresponding to a request (or trigger) to maintain display, independent of change in orientation of the input device about the first axis associated with the input device, of the user interface that indicates that the first drawing implement currently has the first respective orientation with respect to the user interface, such as the squeeze gesture indicated by arrows 670*a* in FIG. 6GG. For example, the electronic device detects that a squeeze gesture (e.g., a pressure or force on the housing of the input device exceeding a threshold pressure or force) has been detected on a housing of input device, and corresponds that detection to the event. In some embodiments, the orientation of the first drawing implement is indicated via the one or more of the respective appearances of the virtual shadow and/or preview mark of the first drawing implement.

In some embodiments, in response to detecting the event corresponding to the request (or trigger) to maintain display, independent of change in orientation of the input device about the first axis associated with the input device, of the user interface that indicates that the first drawing implement currently has the first respective orientation with respect to the user interface, the electronic device maintains display, via the display generation component, of the user interface that indicates that the first drawing implement currently has the first respective orientation with respect to the user interface, independent of change in orientation of the input device about the first axis associated with the input device, such as shown with the user interface 690 indicating the same orientation of the highlighter 610 from FIG. 6GG to FIG. 6HH.

In some embodiments, while maintaining display, via the display generation component, of the user interface that indicates that the first drawing implement currently has the first respective orientation with respect to the user interface independent of change in orientation of the input device about the first axis associated with the input device, the electronic device detects, via the one or more sensors, a respective rotational movement of the input device about the first axis associated with the input device (e.g., about the roll axis or longitudinal axis of the input device) from the second orientation to a third orientation, different from the second orientation, such as the detecting the roll of input device 600 indicated by arrow 652*g* in FIG. 6HH.

In some embodiments, in response detecting the respective rotational movement of the input device about the first axis associated with the input device from the second orientation to the third orientation, the electronic device continues display, via the display generation component, of the user interface that indicates that the first drawing implement currently has the first respective orientation with respect to the user interface, such as user interface 690 in FIG. 6JJ indicating that the highlighter 610 has the same orientation as in FIG. 6HH, such as via the appearance of shadow portion 632*b* in FIG. 6HH being the same as the appearance of shadow portion 632*b* in FIG. 6JJ. For example, the electronic device optionally maintains the orientation of the first drawing implement by way of maintaining the one or more of the respective appearances of the virtual shadow of the first drawing implement, preview mark of the first drawing implement, and/or orientation of a mark of the first drawing implement that is generated in response to a marking input detected while the user interface that indicates that the first drawing implement currently has the first respective orientation with respect to the user interface is maintained in display, independent of a change in orientation of the input device. Further, if a marking input is detected while maintaining display of the user interface that indicates that the first drawing implement currently has the first respective orientation with respect to the user interface independent of the change in orientation of the input device about its roll axis, then the resulting mark would optionally have an appearance that is based on the maintained (e.g., locked) orientation of the first drawing implement. For example, the resulting mark would optionally be maintained in one or more visual characteristics (e.g., color, thickness, orientation relative to a reference in the user interface, and/or another visual characteristic). Additionally or alternatively, in some embodiments, the resulting mark is (or is a part of) the indication that the first drawing implement currently has the first respective orientation with respect to the user interface independent of the change in orientation of the input device about its roll axis. For example, if the event corresponding to the request (or trigger) to maintain display, independent of change in orientation of the input device about the first axis associated with the input device, of the user interface that indicates that the first drawing implement currently has the first respective orientation with respect to the user interface is detected while detecting a marking input (e.g., while the electronic device is generating a mark in response to the marking input), then the appearance of the resulting mark that results in response to further detection of the marking input and the event would optionally be based on the maintained (e.g., locked) orientation of the first drawing implement that is due to the event. As such, the electronic device optionally maintains display of the first drawing implement having in the first respective orientation, which is the orientation of the input device when the event was detected, even if change in orientation of the input device is detected in response to the event. Alternatively, in some embodiments, the event optionally corresponds to a request to update display of the user interface to indicate that the first drawing implement has a default orientation that is independent of the orientation of the first drawing implement when the event is detected, and in response to detecting the event, the electronic device updates the display of the user interface to indicate that the first drawing implement has the default orientation, including changing the orientation of the first drawing implement to the default orientation and maintaining display of the user interface that indicates that the first drawing implement has the default orientation, even if the electronic device detects change in orientation of the input device. As such, the electronic device optionally locks to display of a specific orientation of the first drawing implement in response to the event. Maintaining display of a user interface that indicates that the first drawing implement has the first respective orientation with respect to the user interface independent of change in orientation of the input device improves user interaction with the electronic device because the user can provide different marking inputs optionally in different directions (e.g., different angles relative to the user interface) but the resulting orientation of the mark would be the same and forgoes devoting power resources for corresponding different orientations of the input device to different orientations of the first drawing implement, thus conserving power and computing resources for the electronic device.

In some embodiments, after continuing display of the user interface that indicates that the first drawing implement currently has the first respective orientation with respect to the user interface in response detecting the respective rotational movement of the input device about the first axis associated with the input device from the second orientation to the third orientation, such as the user interface 690 in FIG. 6II, (and optionally, while the input device has the third orientation), the electronic device detects, via the one or more sensors, an event (e.g., a gesture, such as a squeeze gesture or double tap gesture on the input device or an input detect at the electronic device, or another type of event) corresponding to a request (or trigger) to cease maintaining display, independent of change in orientation of the input device about the first axis associated with the input device, of the user interface that indicates that the first drawing implement currently has the first respective orientation with respect to the user interface, such as the squeeze gesture indicated by arrows 670*b* in FIG. 6KK. For example, the electronic device optionally corresponds a squeeze gesture (e.g., a pressure or force on the housing of the input device exceeding a threshold pressure or force) detected on a housing of input device, and corresponds that squeeze gesture to the event. In some embodiments, the event corresponding to a request (or trigger) to cease maintaining display, independent of change in orientation of the input device about the first axis associated with the input device, of the user interface that indicates that the first drawing implement currently has the first respective orientation with respect to the user interface is a second event detected after the event described with reference to claim 17. In some embodiments, the orientation of the first drawing implement is indicated via one or more of the respective appearances of the virtual shadow of the first drawing implement, preview mark of the first drawing implement, and/or orientation of a mark of the first drawing implement that is generated in response to a marking input.

In some embodiments, in response to detecting the event corresponding to the request (or trigger) to cease maintaining display, independent of change in orientation of the input device about the first axis associated with the input device, of the user interface that indicates that the first drawing implement currently has the first respective orientation with respect to the user interface, the electronic device ceases maintaining display, independent of change in orientation of the input device about the first axis associated with the input device, of the user interface that indicates that the first drawing implement currently has the first respective orientation with respect to the user interface. For example, if the input device 600 in FIG. 6LL changes in orientation (e.g., rolls about its roll axis) after the squeeze gesture in FIG. 6KK is detected, then the electronic device updates the user interface 690 of FIG. 6LL to indicate the highlighter 610 as having a changed orientation due to the rolling of the input device 600 about its roll axis (e.g., shadow portion 632*b* in FIG. 6LL would change in shape), such as shown with the change of orientation of the highlighter 610 indicated from FIG. 6DD to FIG. 6EE. In some embodiments, in response to detecting the event, the electronic device continues display of the user interface that indicates that the first drawing implement currently has the first respective orientation with respect to the user interface. For example, the electronic device optionally corresponds the orientation of the input device when the event is detected to be a respective orientation of the input device that is mapped to the first respective orientation of the first drawing implement with respect to the user interface. Alternatively, in some embodiments, in response to detecting the event, the electronic device updates display of the user interface to indicate that the first drawing implement currently has a default orientation, different from the first respective orientation, with respect to the user interface. For example, the electronic device optionally does not correspond the orientation of the input device when the event is detected to be a respective orientation of the input device that is mapped to the first respective orientation of the first drawing implement with respect to the user interface, and instead corresponds the orientation of the input device when the event is detected to be a respective orientation of the input device that is mapped to the default orientation, different from the first respective orientation of the first drawing implement, optionally such that the input device would need to be oriented differently than the orientation of the input device with respect to the user interface when the event is detected in order for the user interface to indicate again that the first drawing implement has the first respective orientation with respect to the user interface.

In some embodiments, after ceasing maintaining display, independent of change in orientation of the input device about the first axis associated with the input device, of the user interface that indicates that the first drawing implement currently has the first respective orientation with respect to the user interface, the electronic device detects, via the one or more sensors, a second respective rotational movement of the input device about the first axis associated with the input device (e.g., about the roll axis or longitudinal axis of the input device) from the third orientation to a fourth orientation, different from the third orientation, such as the rotational movement of the input device 600 about its roll axis, as indicated by the arrow 652*g* of FIG. 6II.

In some embodiments, in response detecting the second respective rotational movement of the input device about the first axis associated with the input device (e.g., about the roll axis or longitudinal axis of the input device) from the third orientation to the fourth orientation, the electronic device updates display, via the display generation component, of the user interface to indicate that the first drawing implement currently has a respective orientation that is different from the first respective orientation, based on the fourth orientation of the input device about the first axis associated with the input device. For example, if the input device 600 in FIG. 6LL changes in orientation (e.g., rolls about its roll axis) after the squeeze gesture in FIG. 6KK is detected, then the electronic device updates the user interface 690 of FIG. 6LL to indicate the highlighter 610 as having a changed orientation due to the rolling of the input device 600 about its roll axis (e.g., shadow portion 632*b* in FIG. 6LL would change in shape), such as shown with the change in orientation of the highlighter 610 indicated from FIG. 6DD to FIG. 6EE. For example, the electronic device indicates the orientation of the first drawing implement by way of displaying one or more of the respective appearances of the virtual shadow and/or preview mark of the first drawing implement, and in response to detecting the second respective rotational movement, the electronic device optionally updates the respective appearances of the virtual shadow and/or preview mark of the first drawing implement. As such, in response to the event, the electronic device optionally maps different orientations of the input device to different orientations of the first drawing implement instead of maintaining display of the user interface that indicates a specific orientation of the first drawing implement independent of change in orientation of the input device. As another example, when the event is detected, the electronic device optionally resets the correspondence (or mapping) of the orientation of the input device to the orientation of the first drawing implement, and in response, if the input device changes in orientation to the second orientation (e.g., the orientation of the input device when the event corresponding to the request (or trigger) to maintain display, independent of change in orientation of the input device about the first axis associated with the input device, of the user interface that indicates that the first drawing implement currently has the first respective orientation with respect to the user interface was detected), the orientation of the first drawing implement that corresponds to the second orientation of the input device would be a different orientation than the orientation of the first drawing implement when the event corresponding to the request (or trigger) to maintain display, independent of change in orientation of the input device about the first axis associated with the input device, of the user interface that indicates that the first drawing implement currently has the first respective orientation with respect to the user interface was detected. Further, if a marking input is detected after ceasing maintaining display, independent of change in orientation of the input device about the first axis associated with the input device, of the user interface indicating that the first drawing implement currently has the first respective orientation with respect to the user interface, then the resulting mark would optionally have an appearance that is based on the unmaintained (e.g., unlocked) orientation of the first drawing implement (e.g., the resulting mark could optionally have different characteristics based on changes in orientation of the input device detected while detecting the marking input. Additionally or alternatively, in some embodiments, the resulting mark is (or is a part of) the indication that the first drawing implement can change in orientation in response to changes in orientation of the input device about its roll axis. For example, if the event corresponding to the request (or trigger) to cease maintaining display, independent of change in orientation of the input device about the first axis associated with the input device, of the user interface that indicates indicating that the first drawing implement currently has the first respective orientation with respect to the user interface is detected while detecting a marking input (e.g., while the electronic device is generating a mark in response to the marking input), and change in orientation of the input device is detected, then the appearance of the resulting mark that results in response to the event, further detection of the marking input, and change in orientation of the input device (during the further detection of the marking input) would optionally be based on the change in orientation of first drawing implement that is due to the change in orientation of the input device. Updating the user interface to indicate a different orientation of the first drawing implement in response to detecting rotational movement of the input device about the first axis associated with the input device in response to detection of the event provides a visual confirmation that the orientation of the input device is no longer fixed, provides visual feedback of change in orientation of the input device with respect to the user interface, reduces errors in the interaction between the input device and the user interface, and reduces inputs involved with correcting such errors.

In some embodiments, while the input device has the first pose and the second orientation about the first axis associated with the input device (and while the preview mark of the first drawing implement has the second visual appearance based on the first pose of the input device and the second orientation of the input device about the first axis associated with the input device), and while the user interface indicates that the first drawing implement currently has a first respective orientation with respect to the user interface based on the second orientation about the first axis associated with the input device, such as user interface 690 of FIG. 6MM indicating the highlighter 610 having a first orientation (e.g., via the appearances of the preview mark 640 of highlighter 610 and/or the shadow portion 632b), the electronic device detects, via the one or more sensors, an event corresponding to a request (or trigger) to set (or reset) the orientation of the first drawing implement to a default orientation (e.g., a predefined or predetermined orientation), different from the first respective orientation, with respect to the user interface, such as the event described herein with reference to FIGS. 6MM through 6OO. Different examples of events that could correspond to the request (or trigger) to set (or reset) the orientation of the first drawing implement to the default orientation are provided below and are not intended to be exhaustive, as other events are contemplated as within the scope of this disclosure. In some embodiments, the orientation of the first drawing implement is indicated via one or more of the respective appearances of the virtual shadow of the first drawing implement, preview mark of the first drawing implement, and/or orientation of a mark of the first drawing implement that is generated in response to a marking input. For example, the user interface that indicates that the first drawing implement currently has the first respective orientation with respect to the user interface based on the second orientation about the first axis associated with the input device optionally includes the virtual shadow and/or preview mark of the first drawing implement having respective visual appearances that indicate the first drawing implement having the first respective orientation with respect to the user interface.

In some embodiments, in response to detecting the event corresponding to the request (or trigger) to set (or reset) the orientation of the first drawing implement to the default orientation, the electronic device updates display, via display generation component, of the user interface to indicate that the first drawing implement has the default orientation with respect to the user interface, such as shown by user interface 690 of FIG. 6OO which is updated to indicate the highlighter 610 having a default orientation (e.g., via the appearances of the preview mark 640 of highlighter 610 and/or the shadow portion 632b). For example, in response to the event, the electronic device optionally changes the respective visual appearances of the virtual shadow and/or preview mark of the first drawing implement to have respective particular visual appearances that indicate that the first drawing implement has the default orientation with respect to the user interface, optionally independent of the first respective orientation and/or independent of an indicated orientation of the first drawing implement before the user interface is updated to indicate that the first drawing implement has the default orientation with respect to the user interface. Further, as another example, in response to the event, the electronic device optionally changes the respective visual appearances of the virtual shadow and/or preview mark of the first drawing implement to have respective particular visual appearances that indicate that the first drawing implement has the default orientation with respect to the user interface optionally independent of changes in orientation of the input device that occurs prior to and/or during detection of the event. Updating the user interface to indicate that the first drawing implement has the default orientation with respect to the user interface in response to detecting the event provides consistency of visual feedback of the currently selected drawing implement for the input device corresponding to interaction between the input device and the electronic device when the event is detected, thereby reducing errors involved with interaction between the input device and the electronic device.

In some embodiments, the event corresponding to the request (or trigger) to set (or reset) the orientation of the first drawing implement to the default orientation includes (optionally while hovering over or in contact with the surface) movement of the input device between a first area (e.g., a drawing area) of the user interface and a second area (e.g., a non-drawing area), different from the first area, of the user interface, such as movement of the input device 600 between the location of the preview mark 640 of the highlighter 610, which is in the first area, and the content entry palette 644 in FIG. 6PP, which is optionally the second area. For example, the electronic device optionally updates the user interface to indicate that the first drawing implement has switched to having the default orientation in response detecting movement of the input device from the first area to the second area, or in response to detecting movement from the second area to the first area. Updating the user interface to indicate that the first drawing implement has the default orientation with respect to the user interface in response to detecting movement of the input device between different areas of the user interface provides consistency of visual feedback of the currently selected drawing implement for the input device corresponding to interaction between the input device and the electronic device when movement of the input device between different areas of the user interface is detected, thereby reducing errors involved with interaction between the input device and the electronic device.

In some embodiments, the movement of the input device between the first area of the user interface and the second area of the user interface corresponds to (optionally while hovering over or in contact with the surface) movement of the input device from the first area to the second area, followed by (optionally while hovering over or in contact with the surface) movement of the input device from the second area back to the first area, such as the input device 600 moving from the location of the preview mark 640 of the highlighter 610 in FIG. 6PP, which is in the first area, to the content entry palette 644 in FIG. 6QQ, which is optionally the second area, followed by movement of the input device 600 to its location in FIG. 6QQ and back to the first area, such as shown with the location of the preview mark 640 of highlighter 610 in FIG. 6RR. For example, the electronic device optionally updates the user interface to indicate the first drawing implement switching to the default orientation in response detecting the movement indicated above. In some embodiments, the movement must satisfy a time criterion, such as the input device hovering over or in contact with the surface corresponding to the second area of the user interface for a predetermined amount of time (e.g., 0.1, 0.3, 0.5, 1, 3, 5 or 10 seconds, or another time threshold before the input device hovers over or is in contact with the surface corresponding to the first area of the user interface, in order for the movement to correspond to the event corresponding to the request (or trigger) to set (or reset) the orientation of the first drawing implement to the default orientation. In some embodiments, the movement of the input device does not need to satisfy the time criterion. Further, as another example, in response to the event, the electronic device optionally changes the respective visual appearances of the virtual shadow and/or preview mark of the first drawing implement to have respective particular visual appearances that indicate that the first drawing implement has the default orientation with respect to the user interface optionally independent of changes in orientation of the input device that may occur during the movement of the input device between the first and second areas of the user interface, including while the input device is at position corresponding to the second area of the user interface. Updating the user interface to indicate that the first drawing implement has the default orientation with respect to the user interface in response to detecting movement of the input device from a first area of the user interface to a second area, and then movement of the input device from the second area to the first area provides consistency of visual feedback of the currently selected drawing implement for the input device corresponding to interaction between the input device and the electronic device when the input device is back in the first area, thereby reducing errors involved with interaction between the input device and the electronic device.

In some embodiments, the event corresponding to the request (or trigger) to set (or reset) the orientation of the first drawing implement to the default orientation includes (optionally while hovering over or in contact with the surface) movement of the input device to more than a threshold distance (e.g., optionally being equal or similar in magnitude as the first threshold distance, the second threshold distance, or is another threshold distance) away from the display generation component (e.g., surface), such as shown with the movement of input device 600 from FIG. 6MM to FIG. 6NN causing the input device 600 to being to more than the threshold 630 away from the display generation component, followed by (optionally while hovering over or in contact with the surface) movement of the input device back to within the threshold distance of the display generation component, such as shown with the movement of input device 600 from FIG. 6NN to FIG. 6OO being to less than the threshold 630 of the display generation component. In some embodiments, the movement must satisfy a time criterion, such as the input device hovering at a position that is more than the threshold distance away from the display generation component before the input device returns to a position that is within the threshold distance of the display generation component in order for the movement to correspond to the event corresponding to the request (or trigger) to set (or reset) the orientation of the first drawing implement to the default orientation. In some embodiments, the movement of the input device does not need to satisfy the time criterion. Further, as another example, in response to the event, the electronic device optionally changes the respective visual appearances of the virtual shadow and/or preview mark of the first drawing implement to have respective particular visual appearances that indicate that the first drawing implement has the default orientation with respect to the user interface optionally independent of changes in orientation of the input device that may occur during while the input device is more than the threshold distance away from the display generation component, during the movement of the input device to more than the threshold distance away, and/or during the movement of the input device to being within the threshold distance of the display generation component. Updating the user interface to indicate that the first drawing implement has the default orientation with respect to the user interface in response to detecting movement of the input device to a position that is greater than a threshold distance from the display generation component followed by movement of the input device to a position that is within the threshold distance provides consistency of visual feedback of the currently selected drawing implement for the input device corresponding to interaction between the input device and the electronic device based on movement of input device relative to the display generation component, thereby reducing errors involved with interaction between the input device and the electronic device.

In some embodiments, the event corresponding to the request (or trigger) to set (or reset) the orientation of the first drawing implement to the default orientation includes selection of a second drawing implement, different from the first drawing implement, such as shown in FIG. 6QQ with input device 600 selecting a highlighter 610 that is of a different color than the highlighter 610 of FIG. 6PP. For example, the second drawing implement is optionally the first drawing implement having a different color or a different size tip, or is a different type of drawing implement than the first drawing implement, such as the first drawing implement being the highlighter 610 of FIG. 6PP and the second drawing implement being the fan brush 612 of FIG. 6Q, and response to selection of the second drawing implement, the electronic device updates the user interface to indicate the second drawing implement having the default orientation with respect to the user interface. Selection of the second drawing implement is optionally detected in response to detection of selection of a user interface element that includes different selections corresponding to different colors and sizes of the first drawing implement, and/or different drawing implements altogether. In some embodiments, selection of the second drawing implement is detected in a second area of the user interface or is detected via a gesture applied to the input device, such a squeeze gesture or a tap or double tap gesture. Updating the user interface to indicate that the first drawing implement has the default orientation with respect to the user interface in response to detecting selection of a different drawing implement provides consistency of visual feedback between different currently selected drawing implements for the input device, thereby reducing errors involved with interaction between the input device and the electronic device.

In some embodiments, when the event corresponding to the request (or trigger) to set (or reset) the orientation of the first drawing implement to the default orientation is detected, the input device has (optionally the first pose, such as the pose of the input device 600 in FIG. 6PP and) the second orientation about the first axis associated with the input device, such as the orientation of the input device 600 in FIG. 6PP, and the user interface indicates that the first drawing implement currently has the first respective orientation with respect to the user interface based on the second orientation about the first axis associated with the input device, such as the user interface 690 in FIG. 6PP indicating the orientation of the highlighter 610 in FIG. 6PP.

In some embodiments, updating display of the user interface to indicate that the first drawing implement has the default orientation in response to detecting the event corresponding to the request (or trigger) to set (or reset) the orientation of the first drawing implement to the default orientation includes in accordance with a determination that the second orientation of the input device about the first axis associated with the input device is a second respective orientation of the input device about the first associated with the input device when the event corresponding to the request (or trigger) to set (or reset) the orientation of the first drawing implement to the default orientation is detected, such as the orientation of the input device 600 in FIG. 6MM, the updated user interface indicates that the first drawing implement has the default orientation, such as the orientation of the highlighter 610 in FIG. 6OO, and in accordance with a determination that the second orientation of the input device about the first axis associated with the input device is a third respective orientation, different from the second respective orientation, of the input device about the first associated with the input device, such as the orientation of the input device 600 in FIG. 6PP, when the event corresponding to the request (or trigger) to set (or reset) the orientation of the first drawing implement to the default orientation is detected, the updated user interface indicates that the first drawing implement has the default orientation, such as the orientation of the highlighter 610 in FIG. 6OO. As such, in response to the event, the electronic device optionally updates the user interface to indicate the first drawing implement having the default orientation, and the default orientation is optionally independent of the orientation of the first drawing implement when the event is detected, such that regardless of the orientation of the first drawing implement when the event is detected, the updated user interface indicates the same default orientation of the first drawing implement. Updating the user interface to indicate the same default orientation of the first drawing implement independent of an indicated orientation of the first drawing implement when the event is detected provides consistency in visual feedback in response to the event, thereby reducing errors involved with interaction between the input device and the electronic device.

In some embodiments, setting (or resetting) the orientation of the first drawing implement to the default orientation includes setting (or resetting) an orientation of the input device to correspond to the default orientation of the first drawing implement. For example, before the user interface indicated orientation of the first drawing implement is set (e.g., updated or changed) to the default orientation, the current orientation of the input device corresponds to the user interface indicated orientation of the first drawing implement, and when the orientation of the first drawing implement is set to the default orientation in response to detecting the event corresponding to the request (or trigger) to set (or reset) the orientation of the first drawing implement to the default orientation, the electronic device optionally corresponds the current orientation of the input device to the default orientation of the first drawing implement.

In some embodiments, while the user interface indicates that the first drawing implement has the default orientation in response to detecting the event corresponding to the request (or trigger) to set (or reset) the orientation of the first drawing implement to the default orientation, the electronic device detects, via the one or more sensors, a marking input from the input device, such as the marking input described with reference to FIG. 6SS that results in generation of mark 662 in FIG. 6SS.

In some embodiments, in response to detecting the marking input, the electronic device updates display of the user interface to include a mark having an appearance (e.g., a size, a shape, a color, thickness or other orientation indicator, and/or another visual appearance characteristic) based at least on the default orientation of the first drawing implement, such as shown in FIG. 6SS with the mark 662 having an appearance that is based at least on the highlighter 610 being in the default orientation during detection of the marking input that result in the generation of the mark 662. For example, the appearance is optionally based on the default orientation of the first drawing implement, optionally in addition to a direction associated with the marking input. For example, if the marking input from the input device was detected while the user interface indicated that the first drawing implement had an orientation different from the default orientation, then the electronic device would optionally update the user interface to include a mark having a different appearance than the appearance that is based at least on the default orientation of the first drawing implement. As such, detecting a marking input while the user interface indicates that the first drawing implement has the default orientation in response to detecting of the event would result in a marking input having an appearance that is based at least on the default orientation of the first drawing implement. Updating display of the user interface to include a mark that has an appearance based at least on the default orientation of the first drawing implement in response to detecting a marking input from the input device while the user interface indicates that the first drawing implement has the default orientation in response to detection of the event to set the orientation of the first drawing implement to the default orientation provides consistency of interaction between the input device and the electronic device in that the appearance of the mark is based on the default orientation of the first drawing implement, thereby reducing errors involved with interaction between the input device and the electronic device.

It should be understood that the particular order in which the operations in FIG. 7 have been described, optionally including the additional and/or alternatives operations to the illustrated operations in FIG. 7 described herein, is merely exemplary and is not intended to indicate that the described order is the only order in which the operations could be performed. One of ordinary skill in the art would recognize various ways to reorder the operations described herein.

The operations in the information processing methods described above are, optionally, implemented by running one or more functional modules in an information processing apparatus such as general purpose processors (e.g., as described with respect to FIGS. 1A-1B, 3, 5A-5I) or application specific chips. Further, the operations described above with reference to FIG. 7 are, optionally, implemented by components depicted in FIGS. 1A-1B. For example, displaying operations 702*a*, updating display operations 702*e* and 702*g*, and detecting operations 702*b*-702*d* and 702*f*, are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

As described above, one aspect of the present technology potentially involves the gathering and use of data available from specific and legitimate sources to facilitate correspondence of a pose and orientation of a drawing implement for the input device to the manner in which a user interacts with the input device (e.g., how a user holds the input device relative to the surface) or other interactions with the electronic device. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information, usage history, and/or handwriting styles.

The present disclosure recognizes that the use of such personal information data, in the present technology, can be used to the benefit of users. For example, the personal information data can be used to automatically perform operations with respect to interacting with the electronic device using a stylus (e.g., recognition of handwriting as text). Accordingly, use of such personal information data enables users to enter fewer inputs to perform an action with respect to handwriting inputs. Further, other uses for personal information data that benefit the user are also contemplated by the present disclosure. For instance, handwriting styles may be used to identify valid characters within handwritten content.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the user is able to configure one or more electronic devices to change the discovery or privacy settings of the electronic device. For example, the user can select a setting that only allows an electronic device to access certain of the user's handwriting entry history when analyzing handwritten content.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, handwriting can be recognized based on aggregated non-personal information data or a bare minimum amount of personal information, such as the handwriting being handled only on the user's device or other non-personal information.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A method comprising:

at an electronic device in communication with a display generation component, one or more sensors, and an input device:

displaying, via the display generation component, a user interface;

while displaying the user interface via the display generation component, detecting, via the one or more sensors:

a first pose of the input device relative to a surface; and a first orientation of the input device about a first axis associated with the input device;

in response to detecting the first pose of the input device relative to the surface and the first orientation of the input device about the first axis associated with the input device, in accordance with a determination that the first pose of the input device relative to the surface includes the input device being within a first threshold distance of the surface and that a currently selected drawing implement for the input device is a first drawing implement, updating display, via the display generation component, of the user interface to include:

a preview mark of the first drawing implement, wherein the preview mark has a first visual appearance in the user interface based on the first pose of the input device relative to the surface and based on the first orientation of the input device about the first axis associated with the input device;

while displaying, via the display generation component, the user interface including the preview mark of the first drawing implement having the first visual appearance, and while the input device has the first pose relative to the surface, detecting, via the one or more sensors, rotational movement of the input device about the first axis associated with the input device, the rotational movement of the input device corresponding to a change in orientation of the input device about the first axis associated with the input device from the first orientation to a second orientation, different from the first orientation; and in response to detecting the rotational movement of the input device about the first axis associated with the input device, updating display, via the display generation component, of the user interface to include:

the preview mark of the first drawing implement having a second visual appearance, different from the first visual appearance, based on the first pose of the input device and based on the second orientation of the input device about the first axis associated with the input device.

2. The method of claim 1, comprising:

in response to detecting the first pose of the input device relative to the surface and the first orientation of the input device about the first axis associated with the input device, in accordance with the determination that the first pose of the input device relative to the surface includes the input device being within a second threshold distance of the surface and that the currently selected drawing implement for the input device is the first drawing implement, updating display, via the display generation component, of the user interface to include:

the preview mark of the first drawing implement, wherein the preview mark has the first visual appearance in the user interface; and a representation of a virtual shadow of the first drawing implement, wherein the representation of the virtual shadow is different from the preview mark, the representation of the virtual shadow having a third visual appearance, in the user interface based on the first pose of the input device relative to the surface and based on the first orientation of the input device about the first axis associated with the input device, and wherein the representation of the virtual shadow includes a first portion corresponding to a tip of the first drawing implement; and in response to detecting the rotational movement of the input device about the first axis associated with the input device, updating display, via the display generation component, of the user interface to include:

the preview mark of the first drawing implement having the second visual appearance; and the representation of the virtual shadow of the first drawing implement having a fourth visual appearance, different from the third visual appearance, based on the first pose of the input device and based on the second orientation of the input device about the first axis associated with the input device.

3. The method of claim 2, wherein the representation of the virtual shadow further includes:

a second portion corresponding to a barrel of the first drawing implement.

4. The method of claim 2, wherein:

displaying the representation of the virtual shadow with the third visual appearance includes displaying the representation of the virtual shadow with a first shape; and displaying the representation of the virtual shadow with the fourth visual appearance includes displaying the representation of the virtual shadow with a second shape, different from the first shape.

5. The method of claim 2, comprising:

while displaying the user interface including the preview mark of the first drawing implement having the second visual appearance and the representation of the virtual shadow of the first drawing implement having the fourth visual appearance after detecting the rotational movement of the input device about the first axis associated with the input device, detecting, via the one or more sensors, a second movement of the input device, different from the rotational movement of the input device about the first axis associated with the input device, wherein the second movement of the input device changes a pose of the input device from the first pose to a second pose, different from the first pose, relative to the surface; and in response to detecting the second movement of the input device, in accordance with a determination that the second pose relative to the surface includes the input device being within the second threshold distance of the surface, updating display, via the display generation component, of the user interface to include:

the representation of the virtual shadow having a fifth visual appearance, different from the third visual appearance.

6. The method of claim 2, wherein:

the tip of the first drawing implement, to which the first portion of the representation of the virtual shadow corresponds, does not have radial symmetry; and a difference in visual appearance between the third visual appearance and the fourth visual appearance visually indicates that the tip of the first drawing implement does not have radial symmetry.

7. The method of claim 2, comprising:

detecting, via the one or more sensors, an input corresponding to a request to change the currently selected drawing implement from the first drawing implement to a second drawing implement, different from the first drawing implement; and in response to detecting the input corresponding to the request to change the currently selected drawing implement from the first drawing implement to the second drawing implement:

associating the currently selected drawing implement with the second drawing implement; and in accordance with a determination that the input device has a third pose relative to the surface and the third pose includes the input device being with a third threshold distance, and in accordance with a determination that the input device has a third orientation about the first axis associated with the input device, updating display, via the display generation component, of the user interface to include:

a second preview mark of the second drawing implement, wherein the second preview mark has a fifth visual appearance in the user interface based on the third pose of the input device relative to the surface and based on the third orientation of the input device about the first axis associated with the input device; and a second representation of a virtual shadow of the second drawing implement, wherein the second representation of the virtual shadow is different from the second preview mark of the second drawing implement and is different from the representation of the virtual shadow of the first drawing implement, wherein the second representation of the virtual shadow of the second drawing implement has a sixth visual appearance, based on the third pose of the input device relative to the surface and based on the third orientation of the input device about the first axis associated with the input device, and wherein the second representation of the virtual shadow of the second drawing implement includes a first portion corresponding to a tip of the second drawing implement.

8. The method of claim 2, wherein:

when the preview mark has the first visual appearance based on the first pose of the input device and on the first orientation of the input device about the first axis, the preview mark is displayed at a first region on the user interface without being displayed at a second region on the user interface; and when the representation of the virtual shadow has the third visual appearance based on the first pose of the input device and on the first orientation of the input device about the first axis, the representation of the virtual shadow is displayed at the first region and at the second region on the user interface.

9. The method of claim 2, wherein:

the user interface includes:

a first area corresponding to a drawing area; and a second area, different from the first area, corresponding to a non-drawing area; and the method comprises:

while the currently selected drawing implement is a respective drawing implement and while displaying the preview mark of the first drawing implement and the representation of the virtual shadow of the respective drawing implement in at least the first area of the user interface:

detecting, via the one or more sensors, third movement of the input device corresponding to movement of the tip of the currently selected drawing implement to the second area of the user interface while the input device is within the second threshold distance of the surface; and in response to detecting the third movement of the input device:

in accordance with a determination that the currently selected drawing implement is the first drawing implement and the first drawing implement is a default drawing implement, continuing display, via the display generation component, of:

the preview mark of the first drawing implement; and the representation of the virtual shadow of the first drawing implement; and in accordance with a determination that the currently selected drawing implement is the first drawing implement and the first drawing implement is not the default drawing implement, updating display, via the display generation component, of the user interface to include:

a preview mark of the default drawing implement; and a representation of a virtual shadow of the default drawing implement.

10. The method of claim 2, wherein the first threshold distance and the second threshold distance are equal.

11. The method of claim 2, wherein the first threshold distance and the second threshold distance are not equal.

12. The method of claim 2, comprising:

displaying, via the display generation component, a user interface element for enabling or disabling display of the representation of the virtual shadow of the first drawing implement;

while display of the representation of the virtual shadow of the first drawing implement is enabled and while displaying the user interface element, detecting, via the one or more sensors, an input directed at the user interface element; and in response to the input directed at the user interface element, disabling display of the representation of the virtual shadow of the first drawing implement.

13. The method of claim 1, wherein:

in response to detecting the rotational movement of the input device about the first axis associated with the input device:

in accordance with a determination that the rotational movement of the input device about the first axis associated with the input device is a first amount of roll, the second visual appearance of the preview mark of the first drawing implement includes a first visual characteristic; and in accordance with a determination that the rotational movement of the input device about the first axis associated with the input device is a second amount of roll, different from the first amount of roll, the second visual appearance of the preview mark of the first drawing implement includes a second visual characteristic without including the first visual characteristic.

14. The method of claim 1, wherein:

displaying the preview mark of the first drawing implement with the first visual appearance includes displaying the preview mark with a first respective orientation relative to a reference in the user interface; and displaying the preview mark of the first drawing implement with the second visual appearance includes displaying the preview mark with a second respective orientation, different from the first respective orientation, relative to the reference in the user interface.

15. The method of claim 1, wherein while displaying the preview mark of the first drawing implement in the user interface:

in accordance with a determination that the input device is at a first distance from the surface, the preview mark of the first drawing implement is displayed at a first size on the user interface; and in accordance with a determination that the input device is at a second distance, different from the first distance, from the surface, the preview mark of the first drawing implement is displayed at a second size, different from the first size, on the user interface.

16. The method of claim 1, wherein the user interface includes a first area corresponding to a drawing area, and the currently selected drawing implement for the input device is a respective drawing implement, the method comprising:

while displaying the user interface via the display generation component, detecting, via the one or more sensors, the input device within the first threshold distance of the surface; and in response to detecting the input device within the first threshold distance of the surface, in accordance with a determination that the input device is positioned at least partially over the first area, updating display, via the display generation component, of the user interface to include a respective preview mark of the respective drawing implement in the first area, without displaying a respective representation of a virtual shadow of the respective drawing implement, based on one or more user-defined settings for the first area.

17. The method of claim 1, comprising:

while the input device has the first pose and the second orientation about the first axis associated with the input device, and while the user interface indicates that the first drawing implement currently has a first respective orientation with respect to the user interface based on the second orientation of the input device about the first axis associated with the input device:

detecting, via the one or more sensors, an event corresponding to a request to maintain display, independent of change in orientation of the input device about the first axis associated with the input device, of the user interface that indicates that the first drawing implement currently has the first respective orientation with respect to the user interface;

in response to detecting the event corresponding to the request to maintain display, independent of change in orientation of the input device about the first axis associated with the input device, of the user interface that indicates that the first drawing implement currently has the first respective orientation with respect to the user interface, maintaining display, via the display generation component, of the user interface that indicates that the first drawing implement currently has the first respective orientation with respect to the user interface, independent of change in orientation of the input device about the first axis associated with the input device;

while maintaining display, via the display generation component, of the user interface that indicates that the first drawing implement currently has the first respective orientation with respect to the user interface independent of change in orientation of the input device about the first axis associated with the input device, detecting, via the one or more sensors, a respective rotational movement of the input device about the first axis associated with the input device from the second orientation to a third orientation, different from the second orientation; and in response detecting the respective rotational movement of the input device about the first axis associated with the input device from the second orientation to the third orientation, continuing display, via the display generation component, of the user interface that indicates that the first drawing implement currently has the first respective orientation with respect to the user interface.

18. The method of claim 17, comprising:

after continuing display of the user interface that indicates that the first drawing implement currently has the first respective orientation with respect to the user interface in response detecting the respective rotational movement of the input device about the first axis associated with the input device from the second orientation to the third orientation:

detecting, via the one or more sensors, an event corresponding to a request to cease maintaining display, independent of change in orientation of the input device about the first axis associated with the input device, of the user interface that indicates that the first drawing implement currently has the first respective orientation with respect to the user interface;

in response to detecting the event corresponding to the request to cease maintaining display, independent of change in orientation of the input device about the first axis associated with the input device, of the user interface that indicates that the first drawing implement currently has the first respective orientation with respect to the user interface, ceasing maintaining display, independent of change in orientation of the input device about the first axis associated with the input device, of the user interface that indicates that the first drawing implement currently has the first respective orientation with respect to the user interface;

after ceasing maintaining display, independent of change in orientation of the input device about the first axis associated with the input device, of the user interface that indicates that the first drawing implement currently has the first respective orientation with respect to the user interface, detecting, via the one or more sensors, a second respective rotational movement of the input device about the first axis associated with the input device from the third orientation to a fourth orientation, different from the third orientation; and in response detecting the second respective rotational movement of the input device about the first axis associated with the input device from the third orientation to the fourth orientation, updating display, via the display generation component, of the user interface to indicate that the first drawing implement currently has a respective orientation that is different from the first respective orientation, based on the fourth orientation of the input device about the first axis associated with the input device.

19. The method of claim 1, comprising:

while the input device has the first pose and the second orientation about the first axis associated with the input device, and while the user interface indicates that the first drawing implement currently has a first respective orientation with respect to the user interface based on the second orientation about the first axis associated with the input device:

detecting, via the one or more sensors, an event corresponding to a request to set the orientation of the first drawing implement to a default orientation, different from the first respective orientation, with respect to the user interface; and in response to detecting the event corresponding to the request to set the orientation of the first drawing implement to the default orientation, updating display, via display generation component, of the user interface to indicate that the first drawing implement has the default orientation with respect to the user interface.

20. The method of claim 19, wherein the event corresponding to the request to set the orientation of the first drawing implement to the default orientation includes movement of the input device between a first area of the user interface and a second area, different from the first area, of the user interface.

21. The method of claim 20, wherein the movement of the input device between the first area of the user interface and the second area of the user interface corresponds to:

movement of the input device from the first area to the second area, followed by movement of the input device from the second area back to the first area.

22. The method of claim 19, wherein the event corresponding to the request to set the orientation of the first drawing implement to the default orientation includes:

movement of the input device to more than a threshold distance away from the display generation component, followed by movement of the input device back to within the threshold distance of the display generation component.

23. The method of claim 19, wherein the event corresponding to the request to set the orientation of the first drawing implement to the default orientation includes selection of a second drawing implement, different from the first drawing implement.

24. The method of claim 19, wherein:

when the event corresponding to the request to set the orientation of the first drawing implement to the default orientation is detected:

the input device has the second orientation about the first axis associated with the input device; and the user interface indicates that the first drawing implement currently has the first respective orientation with respect to the user interface based on the second orientation about the first axis associated with the input device; and updating display of the user interface to indicate that the first drawing implement has the default orientation in response to detecting the event corresponding to the request to set the orientation of the first drawing implement to the default orientation includes:

in accordance with a determination that the second orientation of the input device about the first axis associated with the input device is a second respective orientation of the input device about the first axis associated with the input device when the event corresponding to the request to set the orientation of the first drawing implement to the default orientation is detected, the updated user interface indicates that the first drawing implement has the default orientation; and in accordance with a determination that the second orientation of the input device about the first axis associated with the input device is a third respective orientation, different from the second respective orientation, of the input device about the first axis associated with the input device when the event corresponding to the request to set the orientation of the first drawing implement to the default orientation is detected, the updated user interface indicates that the first drawing implement has the default orientation.

25. The method of claim 19, wherein setting the orientation of the first drawing implement to the default orientation includes setting an orientation of the input device to correspond to the default orientation of the first drawing implement, the method comprising:

while the user interface indicates that the first drawing implement has the default orientation in response to detecting the event corresponding to the request to set the orientation of the first drawing implement to the default orientation:

detecting, via the one or more sensors, a marking input from the input device; and in response to detecting the marking input:

updating display of the user interface to include a mark having an appearance based at least on the default orientation of the first drawing implement.

26. An electronic device, comprising:

one or more processors;

memory; and one or more programs, wherein the one or more programs are stored in the memory and configured to be executed by the one or more processors, the one or more programs including instructions for:

displaying, via a display generation component, a user interface;

while displaying the user interface via the display generation component, detecting, via one or more sensors:

a first pose of an input device relative to a surface; and a first orientation of the input device about a first axis associated with the input device;

in response to detecting the first pose of the input device relative to the surface and the first orientation of the input device about the first axis associated with the input device, in accordance with a determination that the first pose of the input device relative to the surface includes the input device being within a first threshold distance of the surface and that a currently selected drawing implement for the input device is a first drawing implement, updating display, via the display generation component, of the user interface to include:

a preview mark of the first drawing implement, wherein the preview mark has a first visual appearance in the user interface based on the first pose of the input device relative to the surface and based on the first orientation of the input device about the first axis associated with the input device;

while displaying, via the display generation component, the user interface including the preview mark of the first drawing implement having the first visual appearance, and while the input device has the first pose relative to the surface, detecting, via the one or more sensors, rotational movement of the input device about the first axis associated with the input device, the rotational movement of the input device corresponding to a change in orientation of the input device about the first axis associated with the input device from the first orientation to a second orientation, different from the first orientation; and in response to detecting the rotational movement of the input device about the first axis associated with the input device, updating display, via the display generation component, of the user interface to include:

the preview mark of the first drawing implement having a second visual appearance, different from the first visual appearance, based on the first pose of the input device and based on the second orientation of the input device about the first axis associated with the input device.

27. The electronic device of claim 26, wherein the one or more programs further include instructions for:

in response to detecting the first pose of the input device relative to the surface and the first orientation of the input device about the first axis associated with the input device, in accordance with the determination that the first pose of the input device relative to the surface includes the input device being within a second threshold distance of the surface and that the currently selected drawing implement for the input device is the first drawing implement, updating display, via the display generation component, of the user interface to include:

the preview mark of the first drawing implement, wherein the preview mark has the first visual appearance in the user interface; and a representation of a virtual shadow of the first drawing implement, wherein the representation of the virtual shadow is different from the preview mark, the representation of the virtual shadow having a third visual appearance, in the user interface based on the first pose of the input device relative to the surface and based on the first orientation of the input device about the first axis associated with the input device, and wherein the representation of the virtual shadow includes a first portion corresponding to a tip of the first drawing implement; and in response to detecting the rotational movement of the input device about the first axis associated with the input device, updating display, via the display generation component, of the user interface to include:

the preview mark of the first drawing implement having the second visual appearance; and the representation of the virtual shadow of the first drawing implement having a fourth visual appearance, different from the third visual appearance, based on the first pose of the input device and based on the second orientation of the input device about the first axis associated with the input device.

28. The electronic device of claim 27, wherein:

displaying the representation of the virtual shadow with the third visual appearance includes displaying the representation of the virtual shadow with a first shape; and displaying the representation of the virtual shadow with the fourth visual appearance includes displaying the representation of the virtual shadow with a second shape, different from the first shape.

29. The electronic device of claim 26, wherein:

in response to detecting the rotational movement of the input device about the first axis associated with the input device:

in accordance with a determination that the rotational movement of the input device about the first axis associated with the input device is a first amount of roll, the second visual appearance of the preview mark of the first drawing implement includes a first visual characteristic; and in accordance with a determination that the rotational movement of the input device about the first axis associated with the input device is a second amount of roll, different from the first amount of roll, the second visual appearance of the preview mark of the first drawing implement includes a second visual characteristic without including the first visual characteristic.

30. The electronic device of claim 26, wherein:

displaying the preview mark of the first drawing implement with the first visual appearance includes displaying the preview mark with a first respective orientation relative to a reference in the user interface; and displaying the preview mark of the first drawing implement with the second visual appearance includes displaying the preview mark with a second respective orientation, different from the first respective orientation, relative to the reference in the user interface.

31. The electronic device of claim 26, wherein while displaying the preview mark of the first drawing implement in the user interface:

in accordance with a determination that the input device is at a first distance from the surface, the preview mark of the first drawing implement is displayed at a first size on the user interface; and in accordance with a determination that the input device is at a second distance, different from the first distance, from the surface, the preview mark of the first drawing implement is displayed at a second size, different from the first size, on the user interface.

32. The electronic device of claim 26, wherein the user interface includes a first area corresponding to a drawing area, and the currently selected drawing implement for the input device is a respective drawing implement, and the one or more programs further include instructions for:

while displaying the user interface via the display generation component, detecting, via the one or more sensors, the input device within the first threshold distance of the surface; and in response to detecting the input device within the first threshold distance of the surface, in accordance with a determination that the input device is positioned at least partially over the first area, updating display, via the display generation component, of the user interface to include a respective preview mark of the respective drawing implement in the first area, without displaying a respective representation of a virtual shadow of the respective drawing implement, based on one or more user-defined settings for the first area.

33. The electronic device of claim 26, wherein the one or more programs further include instructions for:

while the input device has the first pose and the second orientation about the first axis associated with the input device, and while the user interface indicates that the first drawing implement currently has a first respective orientation with respect to the user interface based on the second orientation of the input device about the first axis associated with the input device:

detecting, via the one or more sensors, an event corresponding to a request to maintain display, independent of change in orientation of the input device about the first axis associated with the input device, of the user interface that indicates that the first drawing implement currently has the first respective orientation with respect to the user interface;

in response to detecting the event corresponding to the request to maintain display, independent of change in orientation of the input device about the first axis associated with the input device, of the user interface that indicates that the first drawing implement currently has the first respective orientation with respect to the user interface, maintaining display, via the display generation component, of the user interface that indicates that the first drawing implement currently has the first respective orientation with respect to the user interface, independent of change in orientation of the input device about the first axis associated with the input device;

while maintaining display, via the display generation component, of the user interface that indicates that the first drawing implement currently has the first respective orientation with respect to the user interface independent of change in orientation of the input device about the first axis associated with the input device, detecting, via the one or more sensors, a respective rotational movement of the input device about the first axis associated with the input device from the second orientation to a third orientation, different from the second orientation; and in response detecting the respective rotational movement of the input device about the first axis associated with the input device from the second orientation to the third orientation, continuing display, via the display generation component, of the user interface that indicates that the first drawing implement currently has the first respective orientation with respect to the user interface.

34. The electronic device of claim 26, wherein the one or more programs further include instructions for:

while the input device has the first pose and the second orientation about the first axis associated with the input device, and while the user interface indicates that the first drawing implement currently has a first respective orientation with respect to the user interface based on the second orientation about the first axis associated with the input device:

detecting, via the one or more sensors, an event corresponding to a request to set the orientation of the first drawing implement to a default orientation, different from the first respective orientation, with respect to the user interface; and in response to detecting the event corresponding to the request to set the orientation of the first drawing implement to the default orientation, updating display, via display generation component, of the user interface to indicate that the first drawing implement has the default orientation with respect to the user interface.

35. The electronic device of claim 34, wherein the event corresponding to the request to set the orientation of the first drawing implement to the default orientation includes:

movement of the input device to more than a threshold distance away from the display generation component, followed by movement of the input device back to within the threshold distance of the display generation component.

36. A non-transitory computer readable storage medium storing one or more programs, the one or more programs comprising instructions, which when executed by one or more processors of an electronic device, cause the electronic device to perform a method comprising:

displaying, via a display generation component, a user interface;

while displaying the user interface via the display generation component, detecting, via one or more sensors:

a first pose of an input device relative to a surface; and a first orientation of the input device about a first axis associated with the input device;

in response to detecting the first pose of the input device relative to the surface and the first orientation of the input device about the first axis associated with the input device, in accordance with a determination that the first pose of the input device relative to the surface includes the input device being within a first threshold distance of the surface and that a currently selected drawing implement for the input device is a first drawing implement, updating display, via the display generation component, of the user interface to include:

a preview mark of the first drawing implement, wherein the preview mark has a first visual appearance in the user interface based on the first pose of the input device relative to the surface and based on the first orientation of the input device about the first axis associated with the input device;

while displaying, via the display generation component, the user interface including the preview mark of the first drawing implement having the first visual appearance, and while the input device has the first pose relative to the surface, detecting, via the one or more sensors, rotational movement of the input device about the first axis associated with the input device, the rotational movement of the input device corresponding to a change in orientation of the input device about the first axis associated with the input device from the first orientation to a second orientation, different from the first orientation; and in response to detecting the rotational movement of the input device about the first axis associated with the input device, updating display, via the display generation component, of the user interface to include:

the preview mark of the first drawing implement having a second visual appearance, different from the first visual appearance, based on the first pose of the input device and based on the second orientation of the input device about the first axis associated with the input device.

37. The non-transitory computer readable storage medium of claim 36, wherein the method further comprises:

in response to detecting the first pose of the input device relative to the surface and the first orientation of the input device about the first axis associated with the input device, in accordance with the determination that the first pose of the input device relative to the surface includes the input device being within a second threshold distance of the surface and that the currently selected drawing implement for the input device is the first drawing implement, updating display, via the display generation component, of the user interface to include:

the preview mark of the first drawing implement, wherein the preview mark has the first visual appearance in the user interface; and a representation of a virtual shadow of the first drawing implement, wherein the representation of the virtual shadow is different from the preview mark, the representation of the virtual shadow having a third visual appearance, in the user interface based on the first pose of the input device relative to the surface and based on the first orientation of the input device about the first axis associated with the input device, and wherein the representation of the virtual shadow includes a first portion corresponding to a tip of the first drawing implement; and in response to detecting the rotational movement of the input device about the first axis associated with the input device, updating display, via the display generation component, of the user interface to include:

the preview mark of the first drawing implement having the second visual appearance; and the representation of the virtual shadow of the first drawing implement having a fourth visual appearance, different from the third visual appearance, based on the first pose of the input device and based on the second orientation of the input device about the first axis associated with the input device.

38. The non-transitory computer readable storage medium of claim 37, wherein:

displaying the representation of the virtual shadow with the third visual appearance includes displaying the representation of the virtual shadow with a first shape; and displaying the representation of the virtual shadow with the fourth visual appearance includes displaying the representation of the virtual shadow with a second shape, different from the first shape.

39. The non-transitory computer readable storage medium of claim 36, wherein:

in response to detecting the rotational movement of the input device about the first axis associated with the input device:

in accordance with a determination that the rotational movement of the input device about the first axis associated with the input device is a first amount of roll, the second visual appearance of the preview mark of the first drawing implement includes a first visual characteristic; and in accordance with a determination that the rotational movement of the input device about the first axis associated with the input device is a second amount of roll, different from the first amount of roll, the second visual appearance of the preview mark of the first drawing implement includes a second visual characteristic without including the first visual characteristic.

40. The non-transitory computer readable storage medium of claim 36, wherein while displaying the preview mark of the first drawing implement in the user interface:

in accordance with a determination that the input device is at a first distance from the surface, the preview mark of the first drawing implement is displayed at a first size on the user interface; and in accordance with a determination that the input device is at a second distance, different from the first distance, from the surface, the preview mark of the first drawing implement is displayed at a second size, different from the first size, on the user interface.

41. The non-transitory computer readable storage medium of claim 36, wherein:

displaying the preview mark of the first drawing implement with the first visual appearance includes displaying the preview mark with a first respective orientation relative to a reference in the user interface; and displaying the preview mark of the first drawing implement with the second visual appearance includes displaying the preview mark with a second respective orientation, different from the first respective orientation, relative to the reference in the user interface.

42. The non-transitory computer readable storage medium of claim 36, wherein the user interface includes a first area corresponding to a drawing area, and the currently selected drawing implement for the input device is a respective drawing implement, and the method further comprises:

while displaying the user interface via the display generation component, detecting, via the one or more sensors, the input device within the first threshold distance of the surface; and in response to detecting the input device within the first threshold distance of the surface, in accordance with a determination that the input device is positioned at least partially over the first area, updating display, via the display generation component, of the user interface to include a respective preview mark of the respective drawing implement in the first area, without displaying a respective representation of a virtual shadow of the respective drawing implement, based on one or more user-defined settings for the first area.

43. The non-transitory computer readable storage medium of claim 36, wherein the method further comprises:

while the input device has the first pose and the second orientation about the first axis associated with the input device, and while the user interface indicates that the first drawing implement currently has a first respective orientation with respect to the user interface based on the second orientation of the input device about the first axis associated with the input device:

detecting, via the one or more sensors, an event corresponding to a request to maintain display, independent of change in orientation of the input device about the first axis associated with the input device, of the user interface that indicates that the first drawing implement currently has the first respective orientation with respect to the user interface;

in response to detecting the event corresponding to the request to maintain display, independent of change in orientation of the input device about the first axis associated with the input device, of the user interface that indicates that the first drawing implement currently has the first respective orientation with respect to the user interface, maintaining display, via the display generation component, of the user interface that indicates that the first drawing implement currently has the first respective orientation with respect to the user interface, independent of change in orientation of the input device about the first axis associated with the input device;

while maintaining display, via the display generation component, of the user interface that indicates that the first drawing implement currently has the first respective orientation with respect to the user interface independent of change in orientation of the input device about the first axis associated with the input device, detecting, via the one or more sensors, a respective rotational movement of the input device about the first axis associated with the input device from the second orientation to a third orientation, different from the second orientation; and in response detecting the respective rotational movement of the input device about the first axis associated with the input device from the second orientation to the third orientation, continuing display, via the display generation component, of the user interface that indicates that the first drawing implement currently has the first respective orientation with respect to the user interface.

44. The non-transitory computer readable storage medium of claim 36, wherein the method further comprises:

while the input device has the first pose and the second orientation about the first axis associated with the input device, and while the user interface indicates that the first drawing implement currently has a first respective orientation with respect to the user interface based on the second orientation about the first axis associated with the input device:

detecting, via the one or more sensors, an event corresponding to a request to set the orientation of the first drawing implement to a default orientation, different from the first respective orientation, with respect to the user interface; and in response to detecting the event corresponding to the request to set the orientation of the first drawing implement to the default orientation, updating display, via display generation component, of the user interface to indicate that the first drawing implement has the default orientation with respect to the user interface.

45. The non-transitory computer readable storage medium of claim 44, wherein the event corresponding to the request to set the orientation of the first drawing implement to the default orientation includes:

movement of the input device to more than a threshold distance away from the display generation component, followed by movement of the input device back to within the threshold distance of the display generation component.

* * * * *